(12) United States Patent
Thurman et al.

(10) Patent No.: US 9,339,710 B2
(45) Date of Patent: May 17, 2016

(54) SPORT PERFORMANCE SYSTEM WITH BALL SENSING

(71) Applicant: Wilson Sporting Goods Co., Chicago, IL (US)

(72) Inventors: Robert T. Thurman, Plainfield, IL (US);
Kevin L. Krysiak, Chicago, IL (US);
David J. Proeber, New Berlin, WI (US);
Bradley L. Gaff, Woodridge, IL (US)

(73) Assignee: Wilson Sporting Goods Co., Chicago, IL (US)

( * ) Notice: Subject to any disclaimer, the term of this patent is extended or adjusted under 35 U.S.C. 154(b) by 0 days.

(21) Appl. No.: 14/071,544

(22) Filed: Nov. 4, 2013

(65) Prior Publication Data

US 2014/0135959 A1     May 15, 2014

Related U.S. Application Data

(60) Provisional application No. 61/724,668, filed on Nov. 9, 2012, provisional application No. 61/798,738, filed on Mar. 15, 2013, provisional application No. 61/788,304, filed on Mar. 15, 2013, provisional application No. 61/800,972, filed on Mar. 15, 2013, provisional application No. 61/891,487, filed on Oct. 16, 2013.

(51) Int. Cl.
*A63F 9/24*     (2006.01)
*A63F 13/00*     (2014.01)
(Continued)

(52) U.S. Cl.
CPC .......... *A63B 69/002* (2013.01); *G09B 19/0038* (2013.01); *G06Q 10/0639* (2013.01)

(58) Field of Classification Search
USPC .......... 463/13, 20, 25, 39; 473/438; 434/247, 434/251, 252, 258
See application file for complete search history.

(56) References Cited

U.S. PATENT DOCUMENTS

| | | | |
|---|---|---|---|
| 2,020,484 A | 11/1935 | Turner | 240/6.4 |
| 2,307,362 A | 1/1943 | Dupler | 240/2 |

(Continued)

FOREIGN PATENT DOCUMENTS

WO     2007084850 A2     7/2007

OTHER PUBLICATIONS

Anonymous: "94Fifty Sensor Basketball", Mar. 4, 2013, pp. 1-6, XP055134703, Retrieved from the Internet: URL: https://web.archive.org/web/20130304204531/http://www.infomotionsports.com/products/94fifty-sensor-basketball/[retrieved on Aug. 13, 2014] * pp. 2-5 *.

(Continued)

*Primary Examiner* — Adetokunbo O Torimiro
(74) *Attorney, Agent, or Firm* — Terence P. O'Brien; Todd A. Rathe

(57) ABSTRACT

A apparatus for use with a portable performance system. The portable performance system includes a processor, a memory and a display. The training apparatus includes an American-style football, at least one sensor coupled to the football, at least one transmitter coupled to the football and operably coupled to the sensor, and a non-transient computer-readable medium containing code. The code directs the processor to: determine at least one football event by comparing the at least one attribute of the football to one or more predetermined signature characteristics of different football events; and an output device to present output to a person based on the determination of the at least one football event.

24 Claims, 69 Drawing Sheets

(51) Int. Cl.
  *G06F 17/00* (2006.01)
  *G06F 19/00* (2011.01)
  *A63B 69/00* (2006.01)
  *G09B 19/00* (2006.01)
  *G06Q 10/06* (2012.01)

(56) References Cited

U.S. PATENT DOCUMENTS

| | | | |
|---|---|---|---|
| 2,849,819 A | 9/1958 | Murphy et al. | 46/230 |
| 2,871,343 A | 1/1959 | Whitney | 240/10 |
| 2,903,820 A | 9/1959 | Bodell | 46/228 |
| 3,011,048 A | 11/1961 | O'Brien | 240/6.4 |
| 3,229,976 A | 1/1966 | Allen, Jr. | 273/58 |
| 3,304,651 A | 2/1967 | Deyerl | 46/228 |
| 3,351,347 A | 11/1967 | Smith et al. | 273/213 |
| 3,458,205 A | 7/1969 | Smith et al. | 273/213 |
| 3,521,886 A | 7/1970 | Bosco | 273/138 |
| 3,580,575 A | 5/1971 | Speeth | 273/58 |
| 3,610,916 A | 10/1971 | Meehan | 240/6.4 |
| 3,745,677 A | 7/1973 | Moran | 40/126 |
| 3,786,246 A | 1/1974 | Johnson et al. | 240/6.4 |
| 3,804,411 A | 4/1974 | Hendry | 273/58 |
| 3,935,669 A | 2/1976 | Potrzuski et al. | 46/228 |
| 4,002,893 A | 1/1977 | Newcomb et al. | 240/6.4 |
| 4,133,528 A | 1/1979 | Koblick | 273/65 |
| 4,479,649 A | 10/1984 | Newcomb et al. | 273/61 |
| 4,542,445 A | 9/1985 | Marletta | 362/96 |
| 4,563,160 A | 1/1986 | Lee | 446/47 |
| 4,607,850 A | 8/1986 | O'Riley | 273/424 |
| 4,701,146 A | 10/1987 | Swenson | 446/130 |
| 4,776,589 A | 10/1988 | Yang | 273/58 |
| 4,801,141 A | 1/1989 | Rumsey | 273/1 |
| 4,963,117 A | 10/1990 | Gualdoni | 446/219 |
| 4,967,596 A | 11/1990 | Rilling et al. | 73/492 |
| 4,997,403 A | 3/1991 | Akman | 446/220 |
| 4,999,603 A | 3/1991 | Mele et al. | |
| 5,039,977 A | 8/1991 | Mele et al. | |
| 5,054,778 A | 10/1991 | Maleyko | 273/58 |
| 5,066,011 A | 11/1991 | Dykstra et al. | 273/58 |
| 5,066,012 A | 11/1991 | Stark | 273/65 |
| 5,071,122 A | 12/1991 | Messina | 273/26 |
| 5,080,359 A | 1/1992 | Thill | 273/60 |
| 5,102,131 A | 4/1992 | Remington et al. | 273/58 |
| 5,170,664 A | 12/1992 | Hirsh et al. | 73/493 |
| 5,186,458 A | 2/1993 | Redondo | 273/65 |
| 5,228,686 A | 7/1993 | Maleyko | 273/58 |
| 5,236,383 A | 8/1993 | Connelly | 446/219 |
| 5,319,531 A | 6/1994 | Kutnyak | 362/184 |
| 5,388,825 A | 2/1995 | Myers et al. | 273/58 |
| 5,403,000 A | 4/1995 | Woosley | 273/1.5 |
| 5,564,702 A | 10/1996 | Meffert | 273/153 |
| 5,609,411 A | 3/1997 | Wang | 362/234 |
| 5,639,076 A | 6/1997 | Cmiel et al. | 473/570 |
| 5,683,316 A | 11/1997 | Campbell | 473/570 |
| 5,694,340 A | 12/1997 | Kim | |
| 5,725,445 A | 3/1998 | Kennedy et al. | 473/570 |
| 5,820,484 A | 10/1998 | Terry | 473/356 |
| 5,833,549 A | 11/1998 | Zur et al. | |
| 5,882,204 A * | 3/1999 | Iannazo et al. | 434/251 |
| 5,888,156 A | 3/1999 | Cmiel et al. | 473/570 |
| 6,073,086 A | 6/2000 | Marinelli | 702/141 |
| 6,142,894 A | 11/2000 | Lee | 473/570 |
| 6,148,271 A | 11/2000 | Marinelli | 702/141 |
| 6,151,563 A | 11/2000 | Marinelli | 702/141 |
| 6,157,898 A | 12/2000 | Marinelli | 702/141 |
| 6,224,493 B1 | 5/2001 | Lee et al. | 473/223 |
| 6,251,035 B1 | 6/2001 | Fa | 473/570 |
| 6,428,432 B1 | 8/2002 | Kachel | 473/570 |
| 6,482,071 B1 | 11/2002 | Wilgosz | 446/486 |
| 6,547,623 B1 | 4/2003 | Collado | 446/47 |
| 6,572,492 B2 | 6/2003 | Tinsman | |
| 6,722,889 B1 * | 4/2004 | Page et al. | 434/251 |
| 6,725,719 B2 | 4/2004 | Cardarelli | |
| 6,726,580 B2 | 4/2004 | Peterson | 473/570 |
| 6,780,130 B1 | 8/2004 | Monochello | 473/570 |
| 7,014,581 B2 | 3/2006 | Ng | 473/570 |
| 7,021,140 B2 | 4/2006 | Perkins | 73/493 |
| 7,140,248 B1 | 11/2006 | Brundage | 73/492 |
| 7,148,583 B1 | 12/2006 | Shau et al. | |
| 7,179,181 B2 | 2/2007 | Ko | 473/570 |
| 7,234,351 B2 | 6/2007 | Perkins | 73/493 |
| 7,288,037 B2 | 10/2007 | Myers | 473/613 |
| 7,487,045 B1 | 2/2009 | Vieira | |
| 7,674,195 B2 | 3/2010 | Romcevich | |
| 7,719,469 B2 | 5/2010 | Englert et al. | 342/418 |
| 7,727,097 B2 | 6/2010 | Siegel et al. | 473/577 |
| 7,740,551 B2 | 6/2010 | Nurnberg et al. | 473/570 |
| 7,795,861 B2 | 9/2010 | Englert et al. | 324/207.17 |
| 7,811,163 B2 | 10/2010 | Ratcliffe | |
| 7,867,115 B2 | 1/2011 | Zawitz | 473/570 |
| 7,891,666 B2 | 2/2011 | Kuenzler et al. | 273/317 |
| 7,915,887 B2 | 3/2011 | Englert et al. | 324/207.16 |
| 7,927,253 B2 | 4/2011 | Vincent et al. | 482/9 |
| 8,010,105 B2 | 8/2011 | Buckley et al. | |
| 8,036,826 B2 | 10/2011 | MacIntosh et al. | 701/213 |
| 8,057,328 B2 | 11/2011 | Englert | 473/479 |
| 8,070,620 B2 | 12/2011 | Rankin | 473/222 |
| 8,079,925 B2 | 12/2011 | Englert et al. | 473/570 |
| 8,172,722 B2 | 5/2012 | Molyneux et al. | 482/1 |
| 8,221,290 B2 | 7/2012 | Vinvent et al. | 482/8 |
| 8,228,056 B2 | 7/2012 | Bucher | 324/207.16 |
| 8,231,487 B2 | 7/2012 | Nurnberg et al. | 473/570 |
| 8,231,506 B2 | 7/2012 | Molyneux et al. | 482/1 |
| 8,340,740 B2 | 12/2012 | Holzer et al. | |
| 8,353,791 B2 | 1/2013 | Holthouse et al. | 473/415 |
| 8,439,773 B2 | 5/2013 | Silagy | 473/447 |
| 8,506,430 B2 | 8/2013 | Von Der Gruen et al. | 473/570 |
| 8,512,177 B2 | 8/2013 | Krysiak et al. | 473/570 |
| 8,517,870 B2 | 8/2013 | Crowley et al. | 473/570 |
| 8,535,185 B2 | 9/2013 | Englert | |
| 8,562,487 B2 | 10/2013 | Berggren et al. | 482/1 |
| 8,579,632 B2 | 11/2013 | Crowley | |
| 8,597,095 B2 | 12/2013 | Crowley et al. | |
| 8,617,008 B2 | 12/2013 | Marty et al. | 473/447 |
| 8,622,832 B2 | 1/2014 | Marty et al. | 463/36 |
| 8,678,897 B2 | 3/2014 | Englert et al. | |
| 8,725,452 B2 | 5/2014 | Han | |
| 8,758,172 B2 | 6/2014 | Creuger | |
| 8,781,610 B2 | 7/2014 | Han | |
| 8,903,521 B2 | 12/2014 | Goree et al. | |
| 8,905,855 B2 | 12/2014 | Fitzpatrick et al. | |
| 8,941,723 B2 | 1/2015 | Bentley et al. | |
| 8,944,928 B2 | 2/2015 | Kaps et al. | |
| 8,944,939 B2 | 2/2015 | Clark et al. | |
| 8,951,106 B2 | 2/2015 | Crowley et al. | |
| 8,989,441 B2 | 3/2015 | Han et al. | |
| 2002/0123386 A1 | 9/2002 | Perlmutter | 473/223 |
| 2002/0137582 A1 | 9/2002 | Yu | 473/570 |
| 2003/0054905 A1 | 3/2003 | King, Jr. | |
| 2003/0224885 A1 | 12/2003 | Leal et al. | 473/570 |
| 2004/0219964 A1 * | 11/2004 | Bleckley et al. | 463/13 |
| 2005/0288133 A1 | 12/2005 | Rudell | |
| 2005/0288134 A1 | 12/2005 | Smith | 473/570 |
| 2007/0026975 A1 | 2/2007 | Marty et al. | |
| 2007/0074752 A1 | 4/2007 | Shau et al. | |
| 2007/0167266 A1 | 7/2007 | Devall | |
| 2007/0178967 A1 | 8/2007 | Rosenberg | |
| 2007/0281811 A1 | 12/2007 | Wang | 473/570 |
| 2007/0299625 A1 | 12/2007 | Englert et al. | |
| 2008/0088303 A1 | 4/2008 | Englert | 324/226 |
| 2008/0174281 A1 | 7/2008 | Shau | |
| 2008/0312010 A1 | 12/2008 | Marty et al. | |
| 2009/0029754 A1 | 1/2009 | Slocum et al. | |
| 2009/0040761 A1 | 2/2009 | Huang et al. | 362/253 |
| 2009/0062033 A1 | 3/2009 | Harada | 473/353 |
| 2009/0191990 A1 | 7/2009 | Smith | 473/570 |
| 2009/0210078 A1 | 8/2009 | Crowley | 700/91 |
| 2009/0298588 A1 | 12/2009 | Gopinath et al. | |
| 2009/0325739 A1 | 12/2009 | Gold | |
| 2010/0035710 A1 | 2/2010 | Smith | 473/570 |
| 2010/0036753 A1 | 2/2010 | Harvill et al. | |
| 2010/0069181 A1 | 3/2010 | Lin | 473/570 |
| 2010/0130314 A1 | 5/2010 | Von der Gruen et al. | |
| 2010/0130315 A1 | 5/2010 | Steidle | 473/570 |

(56) References Cited

U.S. PATENT DOCUMENTS

| | | | |
|---|---|---|---|
| 2010/0184563 A1 | 7/2010 | Molyneux et al. | 482/1 |
| 2010/0198043 A1 | 8/2010 | Holzer et al. | 600/388 |
| 2010/0261557 A1 | 10/2010 | Joseph et al. | |
| 2011/0118062 A1 | 5/2011 | Krysiak et al. | |
| 2011/0118064 A1 | 5/2011 | Krysiak et al. | 473/603 |
| 2011/0118065 A1 | 5/2011 | Krysiak et al. | 473/603 |
| 2011/0119022 A1 | 5/2011 | Kuenzler et al. | 702/145 |
| 2011/0136603 A1 | 6/2011 | Lin et al. | 473/570 |
| 2011/0212798 A1 | 9/2011 | Zawitz | |
| 2011/0269517 A1 | 11/2011 | Englert et al. | 463/7 |
| 2011/0304497 A1 | 12/2011 | Molyneux et al. | |
| 2011/0316529 A1 | 12/2011 | Stancil et al. | |
| 2012/0029666 A1 | 2/2012 | Crowley et al. | |
| 2012/0040785 A1 | 2/2012 | DeSort | 473/570 |
| 2012/0058845 A1 | 3/2012 | Crowley et al. | 473/604 |
| 2012/0071282 A1 | 3/2012 | Smith | 473/570 |
| 2012/0094787 A1* | 4/2012 | Weiss | 473/438 |
| 2012/0139493 A1 | 6/2012 | Sakurai et al. | |
| 2012/0169589 A1 | 7/2012 | Albano et al. | |
| 2012/0172129 A1 | 7/2012 | Vaananen | |
| 2012/0206234 A1 | 8/2012 | Case, Jr. | |
| 2012/0212505 A1 | 8/2012 | Burroughs et al. | |
| 2012/0244969 A1 | 9/2012 | Binder | |
| 2012/0262329 A1 | 10/2012 | Molyneux | |
| 2012/0277890 A1 | 11/2012 | Han | 700/91 |
| 2012/0278023 A1 | 11/2012 | Han | 702/87 |
| 2013/0005512 A1 | 1/2013 | Joseph et al. | |
| 2013/0023365 A1 | 1/2013 | Idoni-Matthews et al. | 473/570 |
| 2013/0068017 A1 | 3/2013 | Perkins et al. | 73/504.02 |
| 2013/0073247 A1 | 3/2013 | Perkins et al. | 702/141 |
| 2013/0073248 A1 | 3/2013 | Perkins et al. | 702/141 |
| 2013/0085006 A1 | 4/2013 | Nilwong et al. | 473/125 |
| 2013/0090750 A1 | 4/2013 | Herrman et al. | 700/92 |
| 2013/0167290 A1 | 7/2013 | Ben Ezra | 2/425 |
| 2013/0316772 A1 | 11/2013 | Kong | |
| 2014/0009258 A1 | 1/2014 | Case, Jr. | |
| 2014/0018181 A1 | 1/2014 | Blake et al. | 473/277 |
| 2014/0031151 A1 | 1/2014 | Crowley et al. | |
| 2014/0039651 A1 | 2/2014 | Crowley | |
| 2014/0081436 A1 | 3/2014 | Crowley et al. | |
| 2014/0120960 A1 | 5/2014 | Hohteri | 455/466 |
| 2014/0125806 A1 | 5/2014 | Kemppainen et al. | 348/157 |
| 2014/0128182 A1 | 5/2014 | Hohteri | 473/570 |
| 2014/0228155 A1 | 8/2014 | Hohteri | |
| 2014/0295874 A1 | 10/2014 | Hohteri et al. | |
| 2014/0303759 A1 | 10/2014 | Hohteri et al. | |
| 2014/0342329 A1 | 11/2014 | Debendetto et al. | |
| 2014/0375817 A1 | 12/2014 | Mescheter et al. | |
| 2015/0011343 A1 | 1/2015 | Krysiak et al. | |
| 2015/0112464 A1 | 4/2015 | Crowley et al. | |
| 2015/0165294 A1 | 6/2015 | Wackerly | |

OTHER PUBLICATIONS

Mike Crowley: "94Fifty: Freakishly Smart Sensor Basketballs", Mar. 14, 2013, pp. 1-12, XP055134700, Retrieved from the Internet: URL: https://web.archive.org/web/20130314184718/http:www/kickstarter.com/projects/490228395/94fifty-freakishly-smart-sensor-basketballs [retrieved on Aug. 13, 2014] * p. 1-p. 8 *.

* cited by examiner

| ATTEMPT | KICK | LAUCH ANGLE | SPEED | SPIN | ATTEMPT | DIRECTION | DISTANCE |
|---|---|---|---|---|---|---|---|
| | 1 | 60 | 80 mph | 220 rpm | MAKE | CENTER | 20 yds |
| | 2 | 65 | 85 mph | 240 rpm | MAKE | LEFT | 35 yds |
| | 3 | 75 | 84 mph | 230 rpm | MISS | RIGHT | 30 yds |
| | 4 | 72 | 82 mph | 225 rpm | MISS | LEFT | 40 yds |
| | 5 | 76 | 83 mph | 235 rpm | MAKE | CENTER | 30 yds |
| | 1-5 | 6-10 | 11-15 | 16-20 | 21-25 | 26-30 | |

DAVID P.
ABC:10,245

| THROW # | INITIAL SPIRAL ABOUT LONG AXIS ($\omega_y$) SPIRAL RPM | INITIAL NOSE PRECESSION ABOUT L VECTOR ($\omega_p$) WOBBLE RPM | RATIO OF WOBBLE TO SPIRAL ($\omega_p/\omega_y$) % | FOOTBALL NOSE ANGLE TO L VECTOR (q) DEGREE |
|---|---|---|---|---|
| 1 | 280 | 179 | 63.9% | 15.9 |
| 2 | 266 | 168 | 63.2% | 13.5 |
| 3 | 329 | 217 | 66.0% | 20.7 |
| 4 | 294 | 183 | 62.2% | 7.8 |
| 5 | 281 | 181 | 64.4% | 16.4 |
| 6 | 283 | 180 | 63.6% | 13.7 |
| 7 | 263 | 172 | 65.4% | 19.7 |
| 8 | 239 | 149 | 62.3% | 8.2 |
| 9 | 294 | 215 | 73.1% | 32.7 |
| 10 | 280 | 183 | 65.4% | 19.2 |

BACK  PLAYER PROFILE

DAVID P.
GOLF, VOLLEYBALL, FOOTBALL, SOFTBALL
HOMETOWN: MILWAUKEE WI
CURRENT LOCATION: CHICAGO IL
AGE: OVER 21
CURRENT TEAMS: PLAYER FLAG FOOTBALL, SERIOUSLY SAND VOLLEYBALL
PAST TEAMS: COLLEGE GOLF TEAM, HIGH SCHOOL GOLF TEAM

| 8/6: FINAL | | 8/14: 7:00 NEW STATE HOUSE | 8/15: 7:00 PM T. FIELD | |
|---|---|---|---|---|
| ☐ PLAYERS | 28 | ☆ US TEAM | ♞ F-TEAM | |
| ○ GAMERS | 10 | ♡ SERIOUSLY | ☐ PLAYERS | |

ACTIVITY

PLAYERS WIN 28-10 AGAINST THE GAMERS!

DAVID P. JUST PURCHASED THE PERFORMANCED FOOTBALL!

DAVID P JUST JOINED THE PLAYERS TEAM!

STATS

CATCHES
 30 CATCHES-ALL TIME
 3 CATCHES- VS GAMERS
ALL TIME WINS LOSSES
 VOLLEYBALL: 40-12
 SOFTBALL: 12-20
 FLAG FOOTBALL: 8-13

EXPERIENCE BUILDERS

PERFORMANCE FOOTBALL   PERFORMANCE BASEBALL

FANS

SEARCH COMMUNITY   🔍 SEARCH FRIENDS/PLAYERS

ALS ON MERCHANDISE! LOGO SHOP .COM ENTER PRONO CODE FOR DEALS ON MERCH   LOGO

FIG. 76

SPORT PERFORMANCE SYSTEM WITH BALL SENSING

RELATED U.S. APPLICATION DATA

The present invention claims the benefit of the filing date under 35 U.S.C. §119(e) of U.S. Provisional Patent Application Ser. No. 61/724,668, filed on Nov. 9, 2012, which is hereby incorporated by reference in its entirety. The present invention also claims the benefit of the filing date under 35 U.S.C. §119(e) of U.S. Provisional Patent Application Ser. Nos. 61/788,304, 61/798,738 and 61/800,972, filed on Mar. 15, 2013, which are hereby incorporated by reference in their entirety. The present invention also claims the benefit of the filing date under 35 U.S.C. §119(e) of U.S. Provisional Patent Application Ser. No. 61/891,487, filed on Oct. 16, 2013, which is hereby incorporated by reference in its entirety. The present application is related to co-pending U.S. patent application Ser. No. 14/071,384, Ser. No. 14/071,431, Ser. No. 14/071,473 and Ser. No. 14/071,515 filed on the same day herewith, the full disclosure of which is hereby incorporated by reference.

BACKGROUND

Many sports, such as football, basketball, golf, soccer and baseball, involve imparting motion to the physical ball. To improve performance, one must improve the manner in which motion is imparted to the ball. What is needed is a sports performance system with ball sensing that can be used to enable users, players, teams, coaches and organizations to improve their performance or their player's performance.

BRIEF DESCRIPTION OF THE DRAWINGS

FIGS. 25 through 35 illustrate example screenshots of an example implementation of the sport performance system of FIG. 5 in which the perform tab option of kick is selected including data relating to current and historical field goal attempts.

FIG. 38 illustrates an example screenshot of an example implementation of the sport performance system of FIG. 5 in which the perform tab option of kick selected including information comparing the user to other users or celebrities.

FIG. 42 illustrates an example screenshot of an example implementation of the sport performance system of FIG. 5 in which the perform tab option of pass is selected including a presentation of football travel parameters.

FIG. 52 illustrates an example screenshot of an example implementation of the sport performance system of FIG. 5 in which the perform tab option of pass selected including information comparing the user to other users or celebrities.

FIGS. 71-76 are diagrams of example screenshots presented by the system of FIG. 4 for managing a sports team.

DETAILED DESCRIPTION OF THE EXAMPLE EMBODIMENTS

Figure 1:
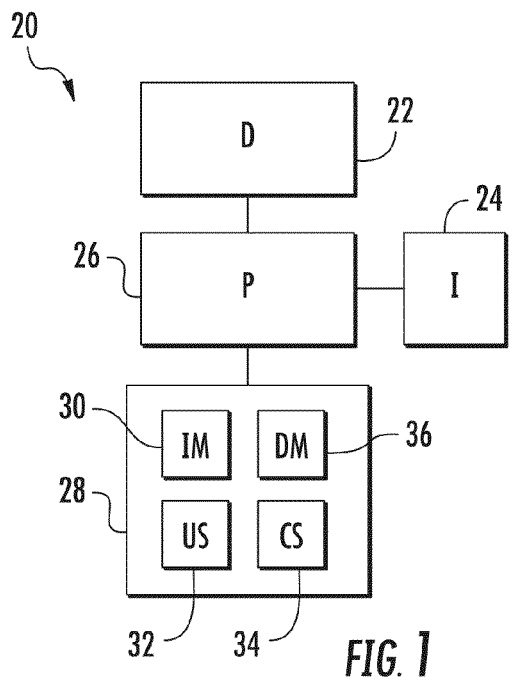
FIG. 1 is a schematic diagram of an example sport performance system.

FIG. 1 schematically illustrates an example a sport performance system 20. Sport performance system 20 utilizes information pertaining to travel or motion of a ball of a sport to provide assistance and motivation to a person endeavoring to improve his or her performance in the sport. Sport performance system 20 comprises a display 22, an input 24, a processor 26 and a memory 28.

Display 22 comprises a screen, monitor, or other device by which data and information may be presented. Input 24 comprises a device by which signals and/or data pertaining to the travel, movement and/or rotation of the ball of a sport may be received. In one implementation, input 24 may comprise a device by which data pertaining to travel of the ball of a sport may be input into system 20. In such an implementation, input 24 may comprise a keyboard, a keypad, a touch screen (possibly incorporated as part of display 22), a stylus, a mouse, a touchpad or a microphone with associated speech recognition software. In another implementation, input 24 may comprise a device by which signals may be received. For example, input 24 may comprise a port or an antenna (possibly incorporated as part of a wireless card). In one implementation, input 24 may receive signals or data pertaining to travel of the ball of the sport from an external or remote server or data source. In one implementation, input 24 may receive signals directly from a transmitter carried by the ball and in communication with one or more sensors also carried by the ball. In one implementation, input 24 may comprise a memory card reader, wherein a memory card may be connected to the ball to receive a sensed data pertaining to travel of the ball and wherein the memory card is removed or separated from the ball and inserted into the memory card reader of input 24 to input such data to system 20. In such an implementation, the memory card may receive sensed data from the one or more sensors carried by the ball while the ball is in motion and in use or the memory card may receive sensed data that is been stored by a memory carried by the ball, allowing the memory card to be connected to the ball for receiving such sensed data when the ball is not in use.

Processor 26 comprises one or more processing units configured to carry out instructions contained in one or more instruction modules of memory 28. For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, memory 28 may be embodied as part of one or more application-specific integrated circuits (ASICs). Unless otherwise specifically noted, the controller is not limited to any specific combination of hardware circuitry and software, nor to any particular source for the instructions executed by the processing unit.

Memory 28 comprises a persistent storage device or non-transient computer-readable medium storing data and code. In the example illustrated, processor 26 comprises an input module 30, a user storage 32, a celebrity storage 34 and a display module 36. Input module 30 comprises software or code stored in memory 28 that is configured to instruct or direct memory 28 to receive or obtain signals or data through input 24 pertaining to travel of a ball of a sport. Examples of sports from which signal or data may be obtained for travel of a ball associated with the sport include, but are not limited to, football, basketball, golf, soccer, baseball, volleyball, tennis, archery, and hockey (for purposes of this disclosure, the term "ball" includes any projectile upon which motion is imparted as part of a sport).

User storage 32 comprises that portion of processor 26 in which the input data or signals received under the direction of input module 30 are stored for subsequent retrieval and/or analysis. Celebrity storage 34 comprises that portion of processor 26 in which data pertaining to travel of the ball imparted by a celebrity in the sport is stored. For purposes of this disclosure, a "celebrity" shall mean a person who has attained notoriety for his or her performance in the sport. Examples of such celebrities include professional athletes, college athletes, Olympians and athletes who have acquired notoriety due to their skill level. Although celebrity storage 34 is illustrated as being part of processor 26 which also includes user storage 32 for storing user data pertaining to travel of the ball, in other implementations, celebrity storage 34 may be located remote of processor 26. For example, celebrity storage 34 may be alternatively provided at a remote server which may be accessed across a local or wide area network.

Display module 36 comprises code or software stored in processor 26 configured to direct memory 28 to retrieve data pertaining to travel of the ball by the celebrity in the sport from celebrity storage 34 and to display a comparison of the input signals and/or data pertaining to travel of the ball imparted by the user to the retrieved data pertaining to travel of the ball by the celebrity. Display module 36 may direct memory 28 to retrieve specific user data from user storage 32, may direct memory 28 to retrieve celebrity data from celebrity storage 34 and may direct memory 28 to present a comparison on display 22.

For example, in one implementation, the data or signals received may pertain to travel of a football. In such an implementation, display module 36 may present a comparison on display 22 of the user's throwing of the football with a celebrity's throwing of the football. For example, display 22 may present a comparison of a user's throwing of the football to the throwing of a football by a well known football celebrity such as Aaron Rodgers of the Green Bay Packers or Tom Brady of the New England Patriots. Such a comparison may comprise one or more graphs depicting various parameters relating to travel the football such as distance, speed, trajectory, target accuracy, quarterback passing release time, snap to pass time, spin, rotation and the like. Such a comparison may comprise side-by-side or concurrent lines or arcs representing a trajectory of the football, wherein colors, line types, line thicknesses, brightness levels, flashing rates, different symbols and the like forming the concurrent lines or arcs may be used to simultaneously present information regarding more than one parameter on the display 22. As a result, system 20 provides a user with a motivational tool by allowing the user to compare his or her individual parameters pertaining to travel of the football to the same individual parameters of a celebrity having above-average skills in the sport. Similar implementations may be made with respect to other sports.

Figure 2:
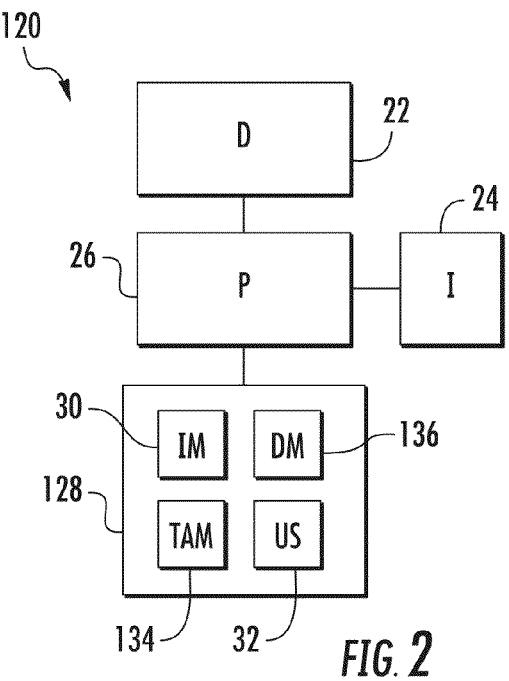
FIG. 2 is a schematic diagram of another example implementation of the sport performance system of FIG. 1.

FIG. 2 schematically illustrates a sport performance system 120. Sport performance system 120 comprises display 22, input 24, processor 26 and a memory 128. Memory 128 is similar to memory 28 except that memory 128 comprises a target accuracy module 134 and a display module 136. Target accuracy module 134 comprises code or software stored in memory 128 configured to direct processor 26 to determine a target accuracy based upon the data and signals received through input 24. Display module 136 comprises code or software contained on memory 128 that is configured to direct processor 26 to display or present the determined target accuracy on display 22.

For example, in one implementation, with respect to travel of a football, the target may comprise a field goal. Target accuracy module 134 may determine, predict or estimate whether or not such a field goal would be successful given the football travel parameter values received through input 24 such as the speed of the football, the launch angle of the football, the trajectory or distance of the football, the spin or rotation of the football and the like. In one implementation, target accuracy module 134 predicts such accuracy independent of the existence of actual field goal posts or crossbars. As a result, a person may practice field goal kicks and receive predicted results on any field or in any park despite the field or the park not having such goal posts or crossbars.

In one implementation, target accuracy module 134 may additionally use additional input such as the placement of the football (the hashmark) prior to the kick and the distance from the goalposts (the yard line or yard marker) as part of its determination of whether a field goal target would be successful for a particular sample of data taken from a particular kick of the football. In one implementation, target accuracy module 134 may additionally base its determination of target accuracy on environmental factors such as air temperature, wind speed, wind direction, barometric, humidity, air density, altitude, pressure and the like. In one implementation, the starting point of the football and/or one or more the environmental factors may be manually input. In another implementation, the starting point of football and/or one or more environmental factors may be sensed by sensor that communicates such data directly to processor 26 or may be retrieved from a remote data source (a weather data web site). In one implementation, the starting point of football and/or the one or more environmental factors may be actual conditions for the sample kick. In another implementation, the starting point of football and/or the one or more environmental factors may be hypothetical, wherein the target accuracy is a hypothetical target accuracy based upon hypothetical conditions.

In other implementations, the accuracy for other targets may be determined by target accuracy module 134 and displayed by display model 136. For example, other targets in football include, not limited to, a receiver to catch the football at a particular location on the football field and at a particular distance from the person throwing the ball or a region on the field at which the ball lands following a kick or punt. In some implementations, such predictions may be determined without a receiver actually catching the football or prior to the ball actually landing at the region on the field. For example, a person may throw, kick or punt the football into a wall, screen, net or other obstruction, wherein target accuracy module 134, using signals from sensor 252 carried by the football, to predict the ultimate travel path such as distance, height, spin and/or trajectory of the football in the hypothetical absence of the obstruction to predict whether or not the passing, kicking or punting objectives or target would be met. As a result, target accuracy module 134 allows a person to practice passing, kicking and/or punting in a relatively confined area, yet see predicted results as if the person had been practicing on a complete football field, with goalposts and with receivers. Other targets in other sports include, but are not limited to, the basket net in basketball, the goal in hockey, the goal in soccer, a strike zone for a pitcher in baseball, a region of a court during a spike or a serve in volleyball and a hole or region of a course (a region of the fairway or a region of the green) in golf.

Figure 3:
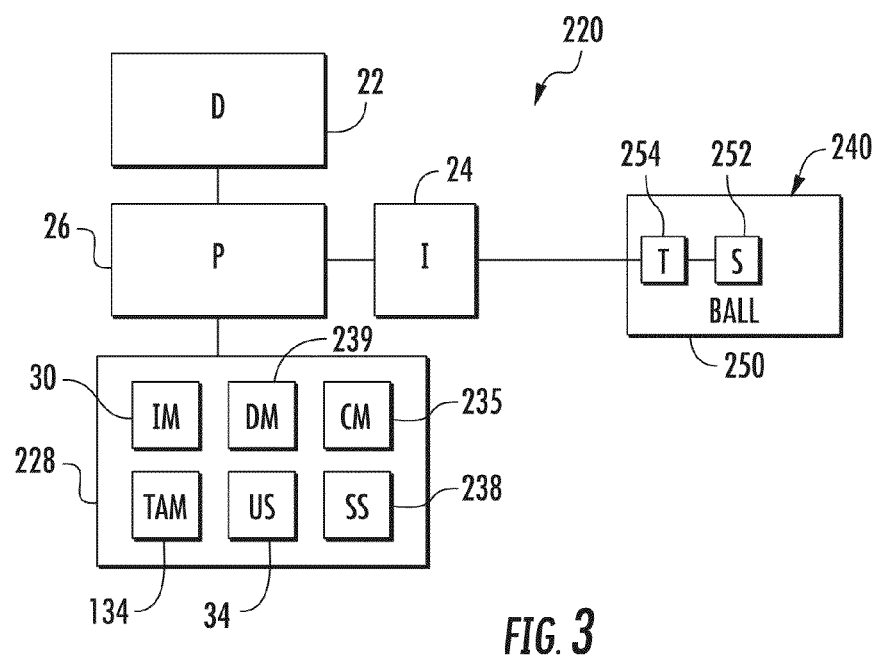
FIG. 3 is a schematic diagram of another example implementation of the sport performance system of FIG. 1.

FIG. 3 schematically illustrates an example sport performance system 220. Sport performance system 220 comprises display 22, input 24, processor 26, a memory 228, and a ball sensing system 240. Memory 228 is similar to memory 28 and memory 128 in that memory 228 comprises a persistent storage device or non-transient computer-readable medium. Memory 228 comprises input module 30, user storage 32, target accuracy module 134, a comparison module 235, a suggestion storage 238 and a display module 239. Comparison module 235 comprises code or software stored on memory 228 configured to direct processor 26 to compare target accuracy (from target accuracy module 134) or individual ball travel parameter values to one or more predefined threshold values for target accuracy or for the individual ball travel parameter values. Based upon the comparison, comparison module 235 instructs processor 26 to retrieve one or more stored sport instructional packages stored on suggestion storage 238. Such instructional packages may comprise text, videos, slides, photos, graphics and the like which are stored in suggestion storage 238 of memory 228 for instructing a person or user how to address a particular mechanics issue with respect to imparting motion to the ball or how to improve upon the mechanics by which a person imparts motion to the ball. Display module 239 comprises software or code that directs processor 26 to retrieve the instructional package from suggestions storage 238 and directs processor 26 display or present the instructional package. In one implementation, display module 239 further displays the users actual parameters that resulted in the particular instructional package being presented. In some implementations, memory 228 may additionally include one or more of celebrity storage 34, display module 36 or display module 136 described above.

Ball sensing system 240 provides signals or data through input 24 regarding one or more parameters pertaining to travel imparted to a ball by the user. Ball sensing system 240 comprises a ball 250, a sensor 252 and a transmitter 254. Ball 250 comprises a physical ball to which travel or motion is imparted directly or indirectly by the user. Examples of ball 250 include, but are not limited to, footballs, basketballs, golf balls, volleyballs, arrows, hockey pucks, baseballs, soccer balls, bowling balls, kick balls, tennis balls and the like.

Sensor 252 comprises one or more sensors carried by ball 250 to sense one or more travel parameters of ball 250. Examples of sensor 252 include, not limited to, micro-electromechanical sensors (MEMS), an accelerometer, a magnetometer, a gyro, a 9 degrees of freedom or motion sensor, a 6 degrees of freedom or motion sensor, pressure sensor, active RFID, passive RFID, temperature sensor, near field sensor, strain gauge, load sensor, and the like, and combinations thereof. In some implementations, sensors 252 and include a global positioning system (GPS) sensor or other presently known or future developed sensors. Examples of travel parameters that may be sensed by the one or more sensors 252 include, but are not limited to, the speed (velocity and acceleration/deceleration) of the ball as it travels, the launch angle of the ball, the trajectory of the ball, the distance traveled by the ball, the spin or rotation of the ball, and the like.

Transmitter 254 transmits information pertaining to travel of the ball to input 24. In one implementation, transmitter 254 comprises a wireless antenna wireless transmitter. In another implementation, transmitter 254 comprises an optical transmitter or a radiofrequency transmitter. In one implementation, transmitter 254 may comprise a port to receive a wired connection or transmitting data. In yet other implementations, transmitter 254 comprises other presently known or future developed technology for transmitting or communicating data. Such information may be in the form of raw signals from sensor 252 or may comprise processed signals based upon the raw signals from sensor 252. In some implementations, ball 250 may additionally include one or more processors and/or memories for processing and/or storing the raw signals from sensor 252 prior to their transmission to input 24 via transmitter 254.

In one implementation, sensor 252 and transmitter 254 are embedded or mounted within ball 250. In other implementations, sensor 252 and transmitter 254 are mounted to an exterior of ball 250. In some implementations, sensor 252 and transmitter 254 are releasably or removably attached or mounted to an exterior of or within ball 250. In yet other implementations, travel parameters of ball 250 may be obtained from sensors not carried by ball 250.

Figure 4:
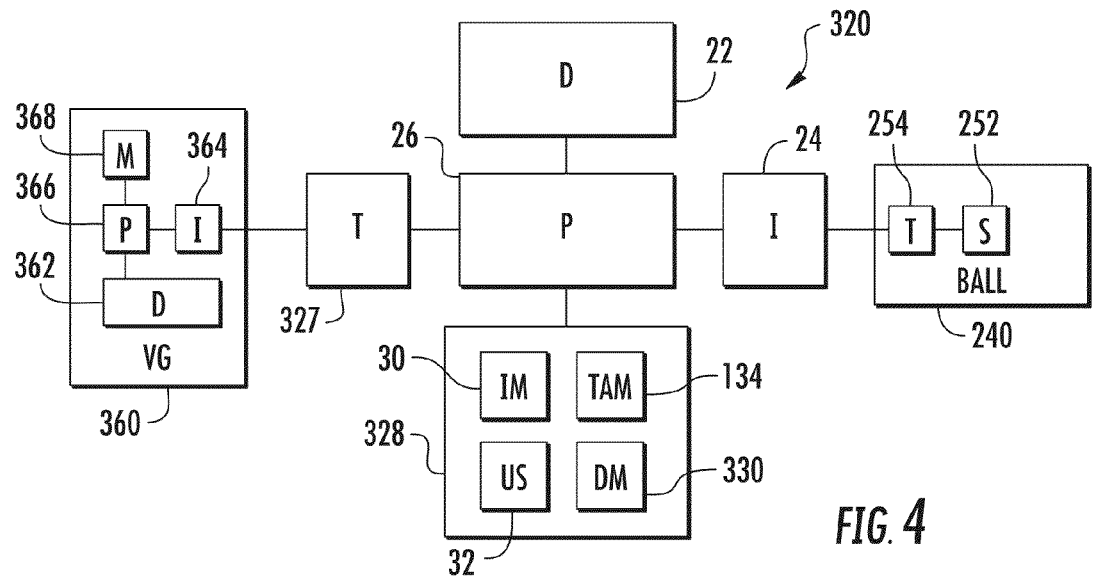
FIG. 4 is a schematic diagram of another example implementation of the sport performance system of FIG. 1.

FIG. 4 schematically illustrates a sport performance system 320. Sport performance system 320 comprises display 22, input 24, processor 26, a transmitter 327, a memory 328, ball sensing system 240 and a videogame 360. Transmitter 327 is in communication with processor 26 and communicates data and signals from processor 26 to videogame 360. In one implementation, transmitter 327 may comprise a wireless transmitter. In another implementation, transmitter 327 may comprise a wired connection or port by which data may be transmitted to videogame 360. In some implementations, transmitter 327 may be omitted where videogame 360 is incorporated as part of a single unit with processor 26 and other components of system 320.

Memory 328 comprises a persistent storage device or non-transient computer-readable medium configured to store data and to store code for directing the operation of processor 26. Memory 328 comprises input module 30, user storage 32, target accuracy module 134 and an output module 330. Output module 330 comprises a module of code or computer programming configured to direct processor 26 to interact with videogame 360 and to provide one or both of ball travel parameter values or target accuracy values to videogame 360 for use by videogame 360.

Videogame 360 comprises a game which simulates a sporting game or sporting competition in which a user participates by providing one or more inputs to one or more processors using voice inputs, manual inputs (using a game controller) or camera captured inputs. Examples sporting games or competitions which are simulated by videogame 360 include, but are not limited to, a basketball game, the football game, a baseball game, a tennis match, hockey game, the bowling game, and archery match and the like. Videogame 360 may comprise a game dedicated to a particular sport or a particular group of sports or may comprise a portable game cartridge, disk, card or unit which is removably received by a system. Videogame 360 may be part of a stationary system or may be part of a portable electronic device. Videogame 360 may be stored on a server which is accessible to multiple users through wide area network or local area network.

Videogame 360 comprises a display 362, an input 364, a processor 366, and a memory 368. Display 362 comprises a screen, monitor or the like by which the game is visually presented to a player. Input 364 comprises a device by which data comprising either target accuracy data and/or ball travel parameter values may be received from transmitter 327. Processor 366 comprise one or more processing units to carry out instructions contained in memory 368 for presenting graphical images upon display 362 and for altering the graphical images based upon input from the player and data received through input 364 to simulate a sporting game, match or competition. Memory 368 comprise a persistent storage device or non-transient computer-readable medium containing instructions for directing processor 366 to carry out the videogame. Although illustrated as a single unit, in other implementations, one or more of the components of videogame 360 may be located remote with respect to one another, such as across one or more servers and the like which communicate with one another across a wide area network or local area network.

According to one implementation, system 320 stores in user storage 32 target accuracy based upon ball travel parameters received through input 24. The stored target accuracy values or results may be utilized as part of videogame 360. In one implementation, the stored accuracy values may be presented on display 22 (or display 362) by processor 26 or processor 366 for selection by the player of videogame 360 that particular moment during the game being simulated on videogame 360. In another implementation, the stored accuracy values serve as a source of possible values from which videogame 360 randomly picks an accuracy value for use in videogame 360 so as to alter an outcome or graphical display of videogame 360. In one implementation, one or more individual ball travel parameters may either be selected by the player of videogame 360 at a particular moment or may be randomly chosen for use in videogame 360.

For example, in one implementation in which videogame 360 comprises a football game, a player may have previously punted, kicked or thrown a football which resulted in signals or data from travel of the ball being provided to system 320 through input 24. Target accuracy results or individual ball travel parameters (speed, distance, direction, launch angle, trajectory, spin or rotation and the like) are stored in user storage 32. During the game, such values may be selected for use by the player or randomly chosen for use in the videogame 360. For example, at a point in the game when a field-goal kick is to be simulated, the player may choose (using an input device associated with videogame 360) a particular target accuracy result from a stored pool of results displayed on display 22 or 362, wherein the stored pool results are obtained using a real physical football in the performance of a football play, act or event by the player for use in the football game. Alternatively, the player may provide input indicating that the particular field-goal to be tried in the videogame 360 is to utilize one of the actual stored target results from the kicking of a real physical football, wherein the particular target result (good, wide left, wide right, short) is randomly chosen from the stored pool of results. Similar inputs of real-world target accuracy results or real-world ball travel parameters into the simulated football videogame may be provided for other aspects of the football game such as a pass, a punt or a kickoff.

In other implementations, instead of importing real-world target accuracy results into videogame 360, individual real world ball travel parameters may be imported into videogame 360. For example, the player may have previously "recorded" a multitude of throws of a real-world football. During a simulated football game on videogame 360, the player may import previously recorded throws into videogame 360. The player may utilize a stored short throw in circumstances where a short pass to receiver is desired in videogame 360 or may utilize a stored deep throw in circumstances where a long pass to receiver is desired in videogame 360. In other implementations, other types of passes or events may be used. In one implementation, stored ball travel parameters may be used more than once during a particular videogame. In another implementation, stored ball travel parameters may be withdrawn from a bank, wherein once a stored ball travel parameters used in a particular videogame, it cannot be reused. As a result, a player of videogame 360 is provided an enhanced experience by implementing actual real-world results into videogame 360. In addition, the player may be encouraged to build up and store a pool or bank of real-world target accuracy values or for subsequent import into a videogame. Such an implementation may motivate youth to participate in actual real-world sport activities in association with videogames. Similar implementations may be made to other sports.

In some implementations, system 320 may incorporate a handicapping system based upon the player skill level, age, size, weight and the like. For example, target accuracy values or ball travel parameters stored on user storage 32 may be enhanced or upgraded for particular players in videogame 360 based upon a selected skill level or characteristics of the player or characteristics of the competition presented on videogame 360. For example, a videogame 360 simulating a professional football game may automatically upgrade the target result of one or more ball travel parameters of the football retrieved from user storage 32. By way of example, stored distance results for field-goal kick may be upgraded from the stored 20 yards to 30 yards for use in the videogame as an option selectable by the player. If videogame 360 involves individuals of different skill levels or different ages, the player with a lesser skill or younger age may be provided with an enhancement or upgrade to his or her stored target accuracy values or ball travel parameter values. By way of example, a younger player competing against an older player in videogame 360 may have stored field-goal kick values enhancer upgraded from 15 yards to 25 yards to level the playing field for the younger player against the older player and provide a more competitive videogame 360. Similar implementations may be made to other sports.

Figure 5:
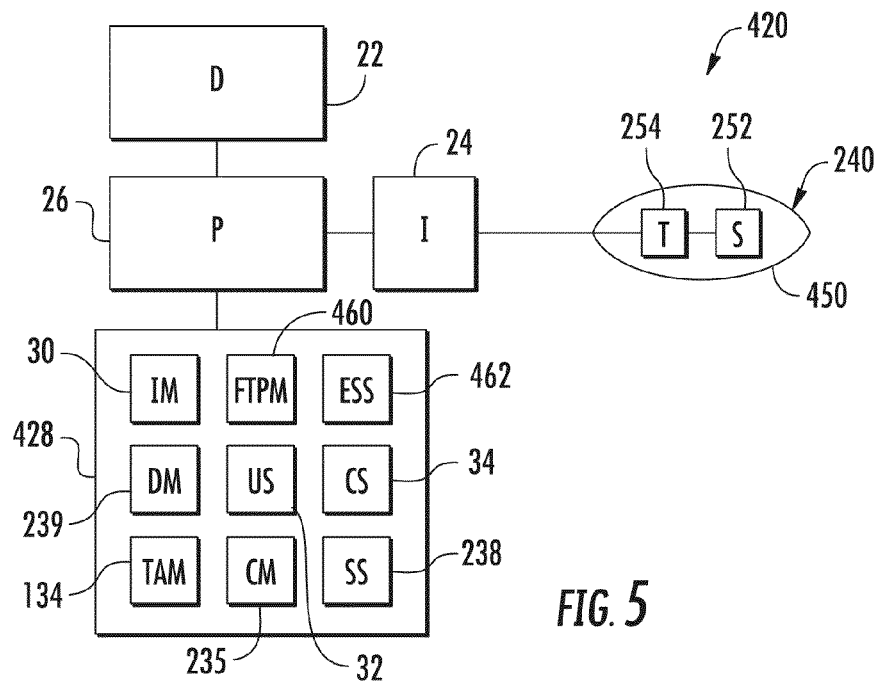
FIG. 5 is a schematic diagram of another example implementation of the sport performance system of FIG. 1.

FIG. 5 schematically illustrates a sport performance system 420. Sport performance system 420 is similar to systems 20, 120 and 220 combined except that ball sensing system 240 specifically employs a ball 450 comprising a football and receives data from ball sensing system 420 in the form of football travel parameters. Sport performance system 420 is specifically illustrated as comprising a memory 428. Those remaining components of system 420 which correspond to components of systems 20, 120 and 220 are numbered similarly.

Similar to memory 28, 228 and 328, memory 428 is a non-transitory or non-transient computer-readable medium or persistent storage device in which executable programs and data are stored. In one implementation, memory 428 is embodied as part of a memory contained on a portable electronic device. In other implementations, memory 428 is embodied in a remote server or "cloud" in communication with the portable electronic device. In yet other implementations, portions of memory 428 reside in a portable electronic device while other portions of memory 428 reside in a remote server or in the "cloud" which is in communication with a portable electronic device.

In the example illustrated, memory 428 of sport performance system 420 specifically comprises a football travel parameter module 460 and a football event signature storage 462. As noted above, in some implementations, football travel parameter module 460 and football event signature storage 462 reside as part of a non-transitory or non-transient memory in a portable electronic device. In other implementations, module 460 and storage 462 reside as part of a non-transitory memory on a remote server or cloud in communication with a portable electronic device. In yet other implementations, one of module 460, storage 462 may reside on a non-transitory or non-transient memory on a remote server or cloud while the other of module 460, storage 462 may reside as part of a non-transitory or non-transient memory on a portable electronic device.

Football travel parameter module 460 contains or comprises code to direct processor 26 to analyze and/or present signals or data received from ball 450. Module 460 utilizes signals or data received from ball 450 to determine and display parameters of ball travel on display 22. For example, module 460 may display a speed of the football 450, a launch angle of the football, a spin of the football, a direction in which the football is moving or has moved, the spiral efficiency (as described below) of the football, an orientation of the football, a trajectory of the football, a maximum trajectory height of the football, a positioning of the football on a football field or with respect to a goalpost and the like.

In one implementation, input module 30 additionally receives input from ball sensing system 240 indicating an orientation or angle of the football on a tee. As a result, football travel parameter module 460 may direct processor 26 to cause display 22 to present or display a trajectory or other travel parameter (launch angle, distance, height, loft time) of the football or football travel parameters of the football as a function of the sensed football orientation or angle on the tee. Such correlation may be presented either graphically or textually using tables and the like. As a result, system 420 may assist in enhancing performance with respect to kickoffs.

In one implementation, input module 30 direct processor 26 to receive input from ball sensing system 240 sensing impacts upon football 450. Such impacts may be the result of the football striking the ground or impacting a person's hands such as a quarterback, running back or receiver. Display module 239 may utilize such information to display bounces of the football (for enhancing on-side kick performance) or may display the time consumed prior to handoff or while the ball travels through the air to being caught by a receiver or by a kick/punt returner. In each case, display module 239 may cause such data to be displayed on display 22. Such information may be further stored in a memory such as storage 238.

In one implementation, football travel parameter module 460 directs processor 26 to determine or identify at least one football event by comparing at least one attribute of the football, based upon signals received from sensor 252 or derived from such signals, to one or more predetermined signature characteristics of different football events. For purpose of this disclosure, a "football event" is one or more particular action of the football with respect to one or more of a playing field, a player or goalpost. Examples of different individual "football events" include but are not limited to, an under center snap of the football; a shotgun/quick snap of the football; a multi-step drop back with the football; a handoff of the football; a pass release of the football; pass flight of the football; a catch of the football; a drop of the football; a fumble of the football; an initiation of a pass of the football; a run with the football; a punt of the football; initial ground impact of the football; a kickoff of the football; and an onside kick of the football.

In one implementation, the one or more predetermined signature characteristics of different football events are stored in event signal storage 462. Such football event signatures comprise distinct sets of ball travel parameters or characteristics associated with each different football event. For example, an under center snap of a football may be associated with one or more distinct acceleration characteristics over time as compared to acceleration characteristics over time of the steps taken by a quarterback during a multi-step drop following the snap, as compared to acceleration characteristics over time of the initiation of a pass (when the quarterback or thrower begins to cock his or her arm prior to a throw), and the like. In some implementations, signature characteristics for an event may comprise unique sets or groups of multiple football travel parameters. For example, different football events may be distinguished from one another based upon a combination of two or more of a sensed acceleration of the football, a sensed internal pressure of the football, a sensed height of the football, a sensed speed/velocity of the football, a sensed spin of the football, a sensed rotation of the football using gyro sensed information, a sensed movement of the football using magnetometer sensed information, and combinations thereof.

Pattern recognition through the use of a neural network or a machine learning techniques can be employed to determine complicated motion or timing events involving the football and an act or event with the football, such as football event signatures. In one implementation, such football event signatures are obtained by sports performance system 420 through use of a "neural network" in which the football event signatures are identified or learned through the analysis of multiple calibration football events. For example, multiple football events with football 450 may be sensed and stored, wherein processor 26, following instructions contained in football travel parameters module 460 or another set of computer code, compares one or more of the sensed ball travel parameters (acceleration values, spin, orientation, height, velocity composition over a period of time) with the known identity of each football event to associate each known football event with a specific football event signature comprising a group of one or more of the sensed ball travel parameters. Such football event signatures are stored for subsequent use in identifying subsequent football events. Neural network can also be referred to as machine learning. A neural network is a form of pattern recognition, and can involve analysis of multiple events or variables occurring over time.

In one implementation, module 460 may utilize the identification of the initiation of a football pass (the cocking of the arm) and the identification of a pass release to track a quarterback pass release time (a quick release) for display, comparison or coaching. For display or communication purposes, the term "pass release" includes the upward and/or rearward movement of the player's arm in "cocking" or drawing back his or her arm to initiate a pass and the forward and/or upward movement and/or extension of the player's arm to launch or impart acceleration and/or spin onto the ball as it releases from the player's throwing hand. In yet another implementation, module 460 may utilize the identification of a punt of the football and an identification of either a catch of the football or a ground impact of the football to determine, display and/or record hang time of the football for the punt. In one implementation, module 460 may utilize the identification of football drops and football catches to track, display and store pass completion percentages for analysis, comparison between players, training and game use (as described above).

In one implementation, module 460 directs processor 26 to receive or obtain signals from ball 450 during a continuous series of football events and to determine or identify each of the multiple football events of the continuous series. Examples of continuous series of football events, such as might occur during a single play or "down" of a football scrimmage, or game include, but are not limited to, (1) snap, 3 step drop, pass release; (2) snap, 3 step drop, pass release, catch; (3) snap, 3 step drop, pass release, drop; (4) snap, 5 step drop, pass release; (5) snap, 5 step drop, pass release, catch; (6) snap, 5 step drop, pass release, drop; (7) snap, 5 step drop, pass release; (8) snap, 7 step drop, pass release, catch; (9) snap, 7 step drop, pass release, drop; (10) shotgun/quick snap, pass release; (11) shotgun/quick snap, pass release, catch; (12) shotgun/quick snap, pass release, drop; (13) pass release, catch; (14) pass release, drop; (15) snap, catch, step, punt; (16) snap, two steps, punt; (17) snap, catch, punt; (18) catch, step, punt; (20) catch, two steps, punt; (21) catch, punt; (22) punt, hang time, catch; (23) punt, hang time, ground impact; (24) punt, hang time, ground impact, subsequent ground impact, ball stop; (25) snap, hold, kick; (26) hold, kick; and (27) other combinations of one or more of the above-listed events. Using such signals, module 460 determines or identifies each of the distinct individual events of the series.

In one implementation, module 460 additionally tracks the timing at each of the identified football events using the time at which different ball travel parameters or signals were generated by sensor 252 and/or received from ball 450. For example, module 460 may identify the time at which each individual event began, the duration of each individual event and the time which each individual event ended. Module 460 may identify elapsed time between different events, whether they be consecutive events in a series of events or non-consecutive events separated by one or more intervening events.

In one implementation, sensor 252 comprises accelerometers carried by football 450 sensing acceleration of football 450. In one such implementation, module 450 identifies football events and also tracks the timing of such football events by comparing signals received from football 450 indicating acceleration of football 450 over time to corresponding football event acceleration signatures. FIGS. 6-12 illustrate example football event acceleration signatures for comparison with acceleration signals received by module 460 from ball 452 identify and time track different football events.

Figure 6:
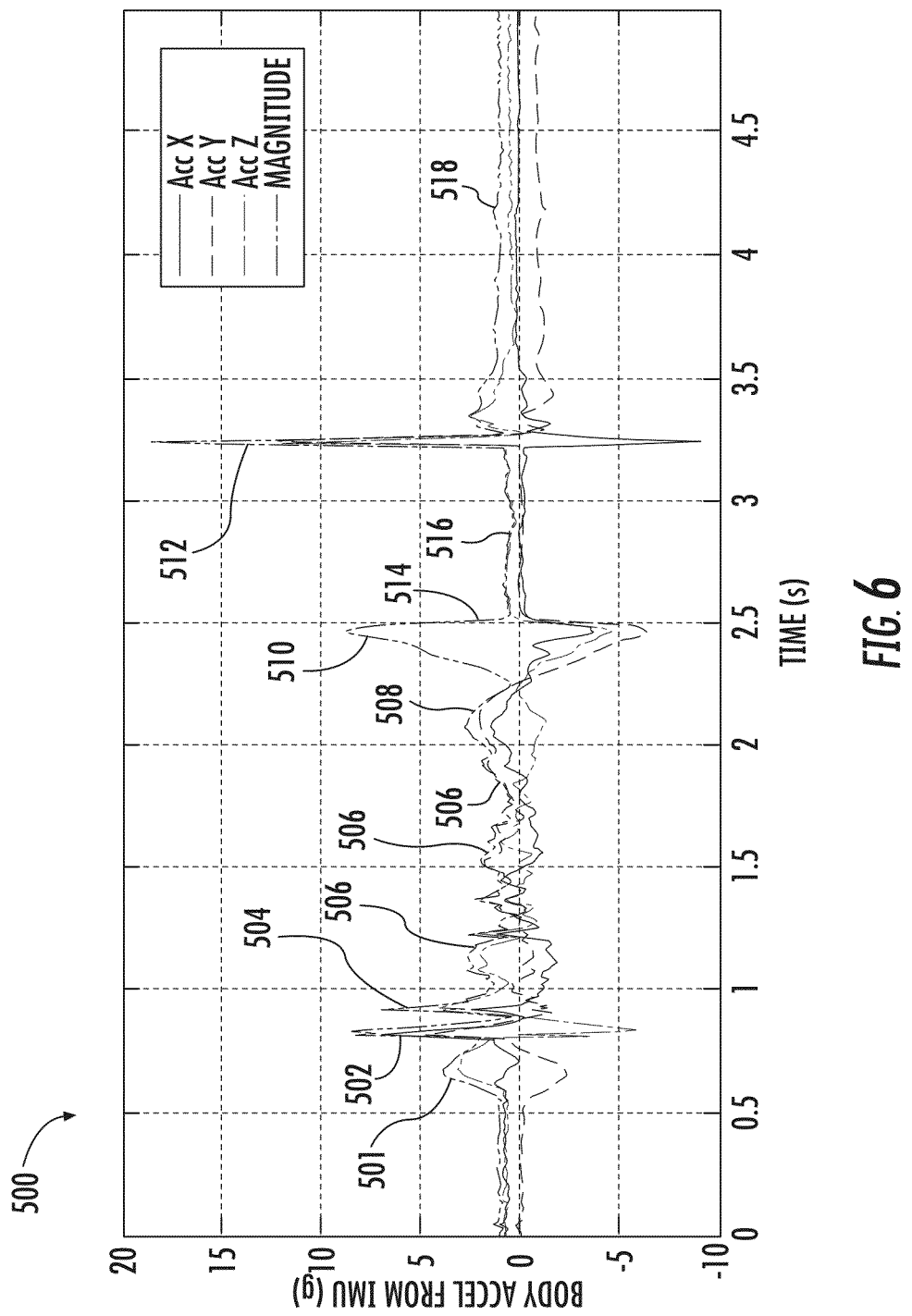
FIG. 6 is a diagram of an example American football event acceleration trace signature for a continuous series of football events utilized by the sport performance system of FIG. 5.

FIG. 6 illustrates an example football event acceleration trace signature for a continuous series of football events. In particular, FIG. 6 illustrates signals output for acceleration along X, Y and Z orthogonal axes along with a magnitude tracing. FIG. 6 illustrates an example football acceleration trace signature for an under center snap, a three step quarterback drop, pass and catch. As shown by FIG. 6, trace 500 of acceleration comprises amplitude spikes that occur in response to the ball being snapped (spike 501), in response to the ball being received under center by impacting the quarterback's hands (spike 502), in response to the ball being withdrawn from beneath the center by the quarterback (spike 504), in response to each of the rearward drop back steps taken by the quarterback (spikes 506), in response to the drawback (cocking or drawback) of the quarterback's arm carrying the ball (the initiation of a pass) (spike 508), in response to the forward motion of the arm in the launch of the ball (spike 510), in response to impact of the ball with the receivers hands, chest or the like during a catch (spike 512). As shown by FIG. 6, at completion of the launch indicated by spike 510, forces no longer being applied to the ball such that acceleration drops as indicated by portion 514. While in flight, acceleration remains substantially constant or declines as indicated by portion 516 of trace 500. As indicated by portion 518 of trace 500, the ball remains generally static while in the receiver's hands after a catch, reflected by the fact that no acceleration spikes take place. Although portion 516 of trace 500 is illustrated as lasting 0.6 seconds, the length of this portion will vary depending upon the length, acceleration, speed, launch angle, and environmental conditions at the time of a throw/pass. Utilizing this length and a detected acceleration or speed of football 450, a distance of a throw/pass may be calculated by module 460. Should a fumble occur after a catch, acceleration spikes would be exhibited and identified.

Although trace 500 illustrates a continuous series of events, football event signatures may comprise distinct events not part of a series of events. In some implementations, the database forming event signature storage 462 is established by sensing multiple calibration samples of a single known or pre-identified event or multiple calibration samples of few known or pre-identified consecutive football events and storing their associated acceleration traces. In some implementations, the database forming event signature storage 462 is established by sensing several continuous series of known events and subsequent parsing out the individual events and storing the individual football events as separate items. In yet another implementation, event signature 462 may be established by storing multiple continuous series or sequences of known events. In some implementations, statistical procedures, such as averaging, cropping, normalizing and the like may be applied to the captured calibration traces when establishing the football event signature acceleration traces.

Figure 7:
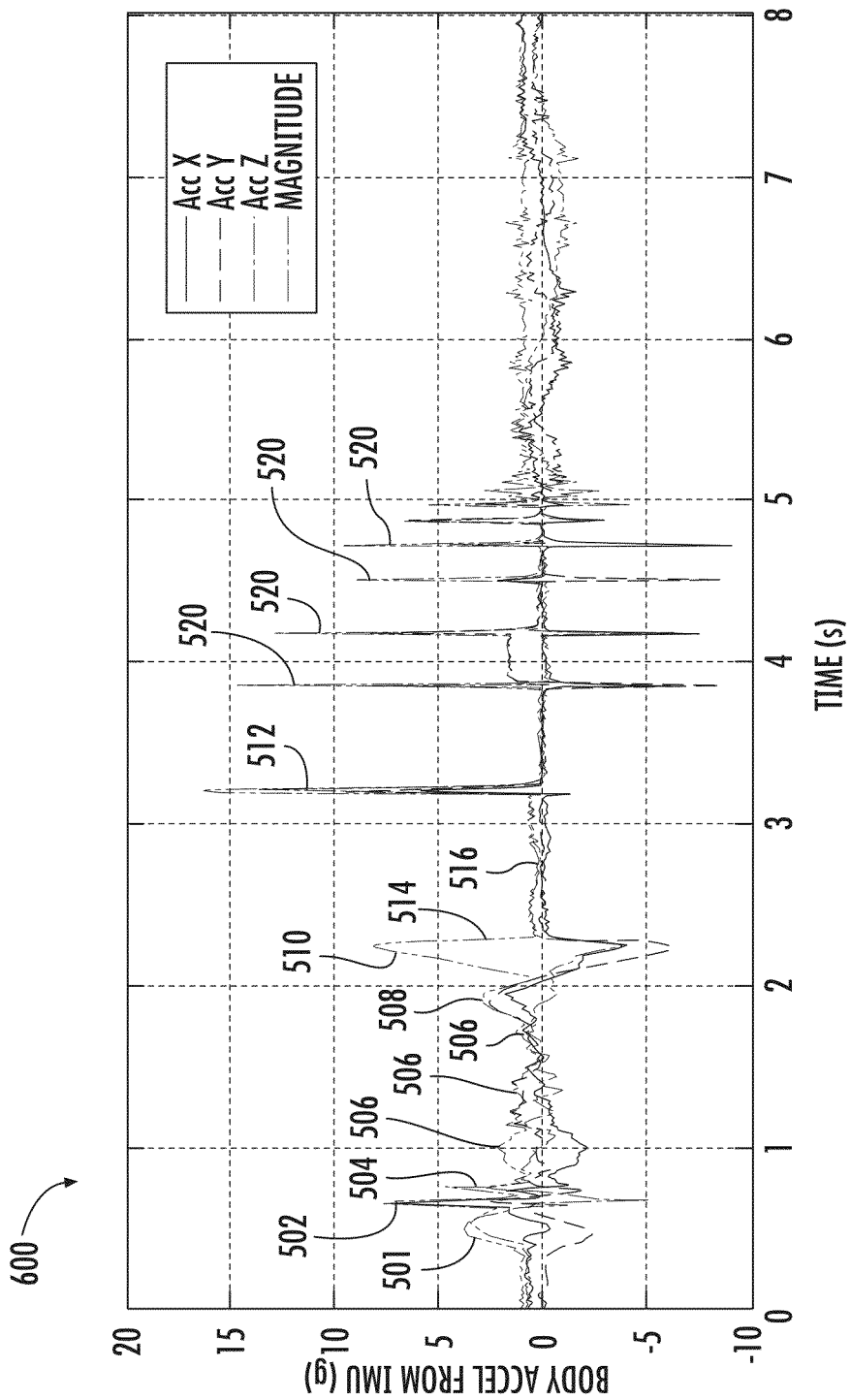
FIG. 7 is a diagram of another example American football event acceleration trace signature for a continuous series of football events utilized by the sport performance system of FIG. 5.

FIG. 7 illustrates a second example football event acceleration trace signature for a continuous series of football events. FIG. 7 illustrates an example football event acceleration signature trace 600 for a three step quarterback drop, pass and drop. As shown by FIG. 7, signature 600, depicting multiple football events, corresponds to signature 500 up until the time that the football impacts a receiver's (or defenders) body (hands, chest or the like) indicated by acceleration spike 612, but wherein football 450 is subsequently dropped as reflected by the acceleration spikes 620 at each impact of football 450 with the ground, following impacts 612 in close time proximity. The same football events indicated by their corresponding similarly portions of traces 500, 600 are numbered similarly. As reflected by FIGS. 6 and 7, the acceleration spikes portions of traces 500, 600 corresponding to the same individual football events correspond to one another in shape such that such shapes serve as signatures or fingerprints for the football particular events. Should the time delay between impact 612 and the next consecutive identified ground impact 620 be sufficiently long to exceed a predefined time threshold, module 460 may alternatively identify acceleration spike 612 as indicating a catch of the football with the next subsequent acceleration spike 620 being identified as a fumble of the football. In such a manner, not always the shape of the portion of the trace utilize in identifying a football event, but also its proximity and time to adjacent portions of the trace and the shapes of such adjacent portions of the trace.

Figure 8:
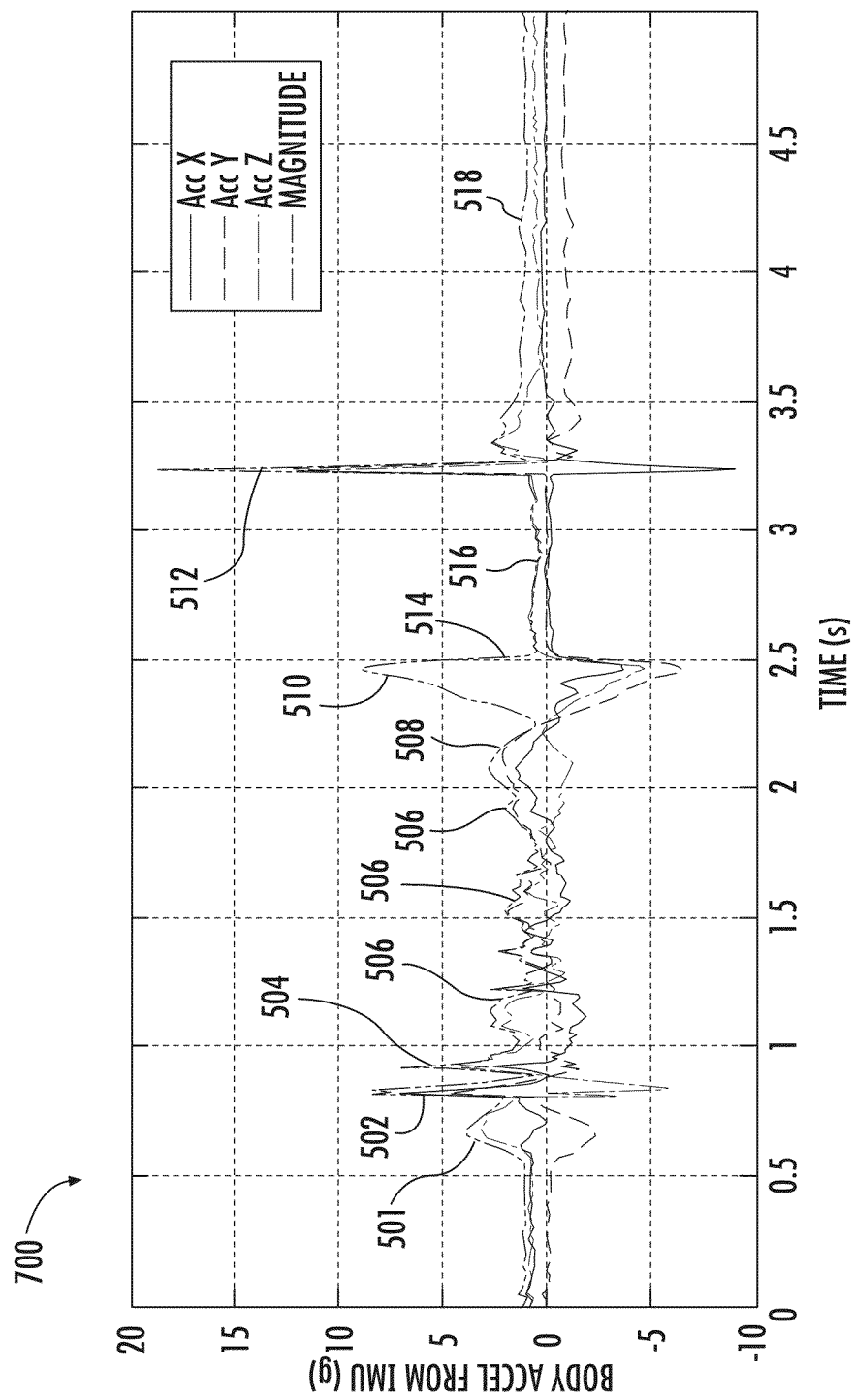
FIG. 8 is a diagram of another example American football event acceleration trace signature for a continuous series of football events utilized by the sport performance system of FIG. 5.
Figure 9:
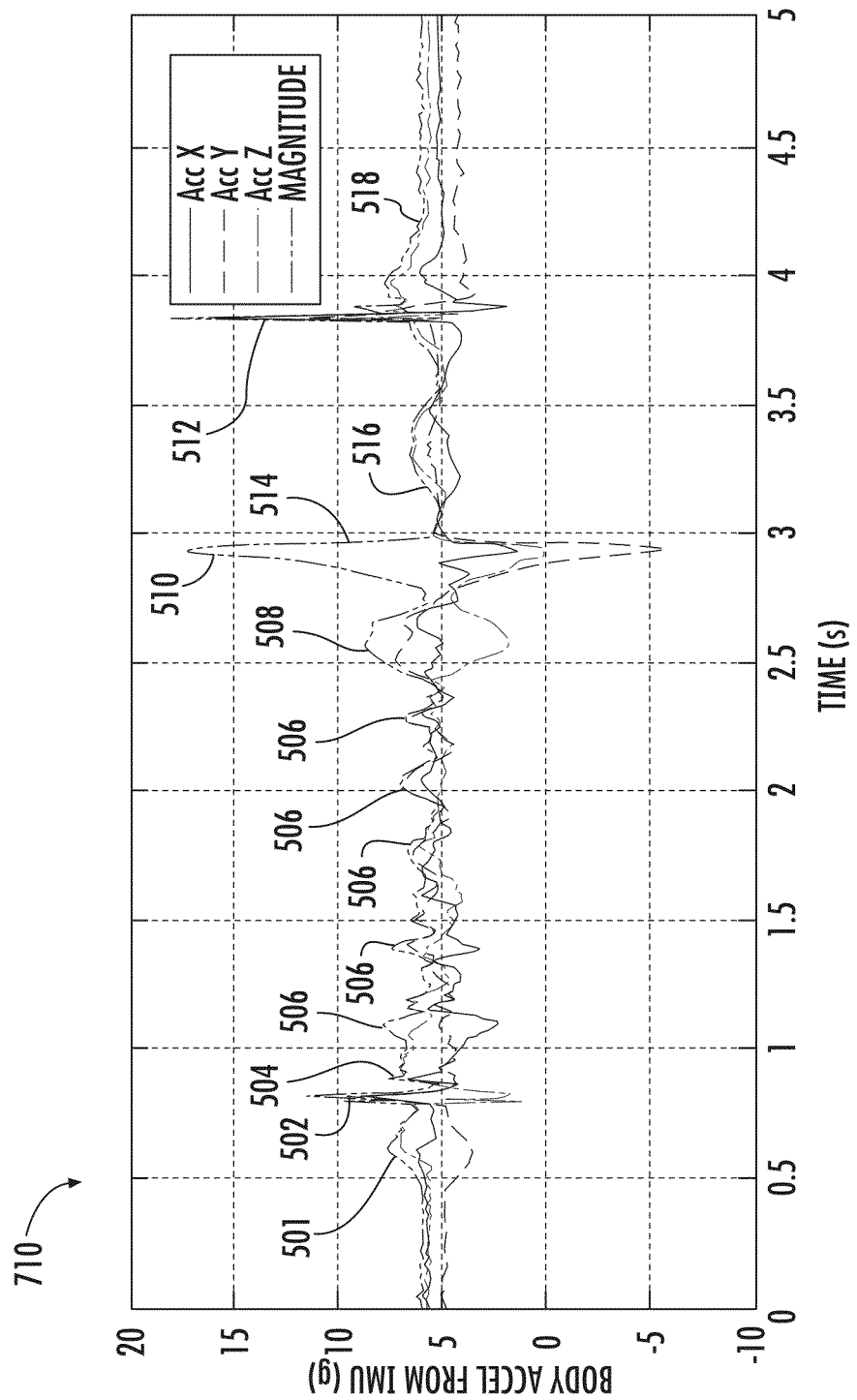
FIG. 9 is a diagram of another example American football event acceleration trace signature for a continuous series of football events utilized by the sport performance system of FIG. 5.
Figure 10:
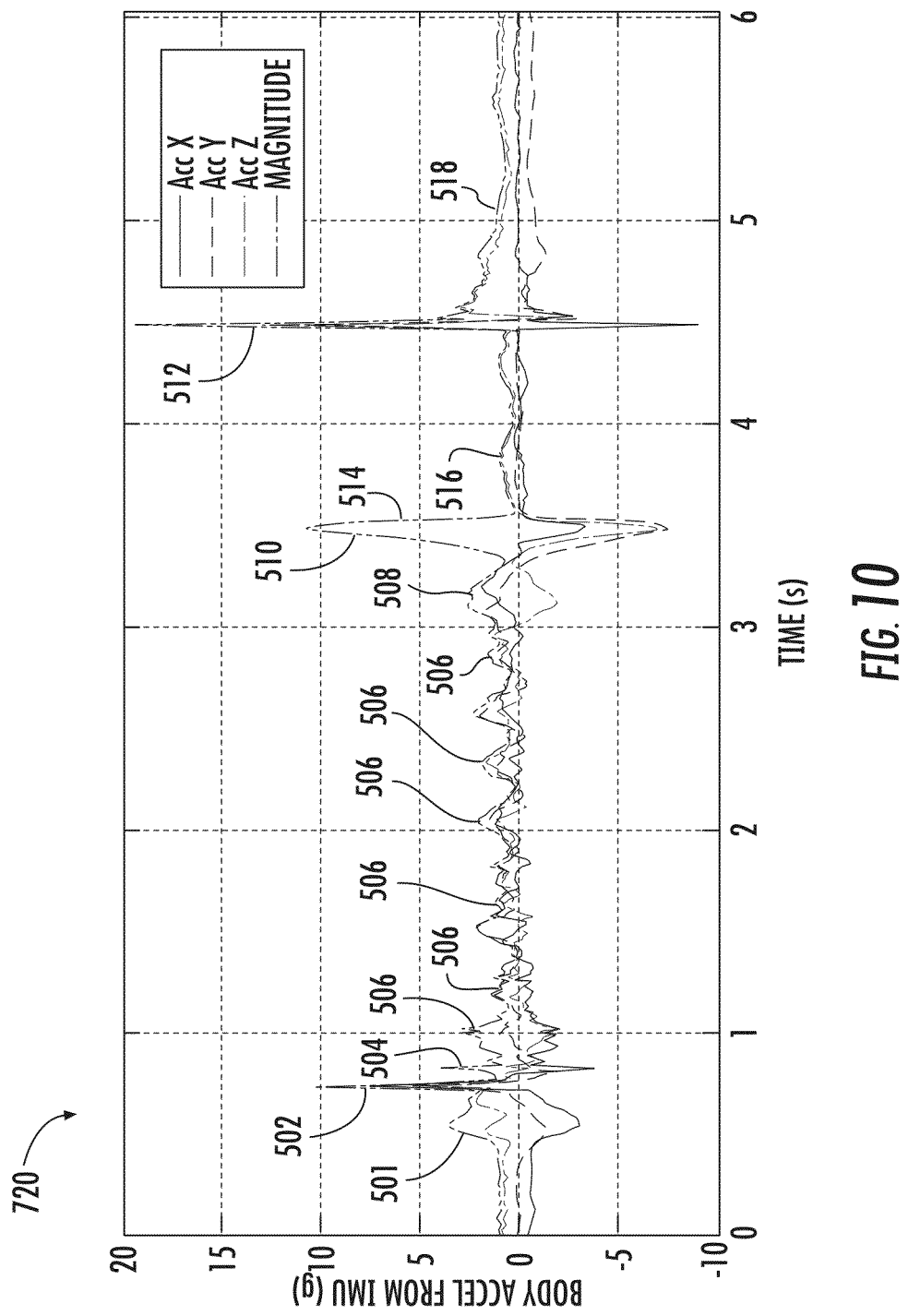
FIG. 10 is a diagram of another example American football event acceleration trace signature for a continuous series of football events utilized by the sport performance system of FIG. 5.

FIGS. 8-10 illustrate example acceleration traces serving as signature traces for various multi-step quarterback drops from under center follow a snap and subsequent passes which are caught. FIG. 8 illustrates an example signature trace 700 produced by a continuous series of football events comprising an under center snap, a three-step drop, a pass and a catch. FIG. 9 illustrates an example signature trace 710 produced by a continuous series of football events comprising an under center snap, a five-step drop, a pass and a catch. FIG. 10 illustrates an example signature trace 720 produced by a continuous series of football events comprising an under center snap, a seven-step drop, a pass and a catch. Each drop back step is indicated by spikes 506. In other implementations, the signature trace can track other forms of incomplete passes beyond a pass impacting the receivers' hands followed by an impact with the ground. The passed ball may not impact the receivers' hands. It may impact the ground directly, or impact other body part or parts or a defender and then impact the ground.

As illustrated by FIGS. 8-10, each of the individual football events of the different series has similar, consistent shapes and characteristics, reflecting that each event has a unique signature that is used by module 460 to identify subsequent football events through comparison. As illustrated by FIGS. 8-10, three-step, five-step and seven set drops each produce distinct and distinguishable acceleration traces with a distinct number of spikes, allowing module 460 to identify the number of drop back steps taken by quarterback from under center. In implementations where the positioning or movement direction of football 450 may also be determined from signals produced by sensor 252, module 460 may also identify football event such as the quarterback stepping up in a pocket, bootlegging or scrambling to the left or to the right prior to a pass. The extent or distance of such quarterback movement may be indicated by the number of steps indicated from an acceleration trace.

Figure 11:
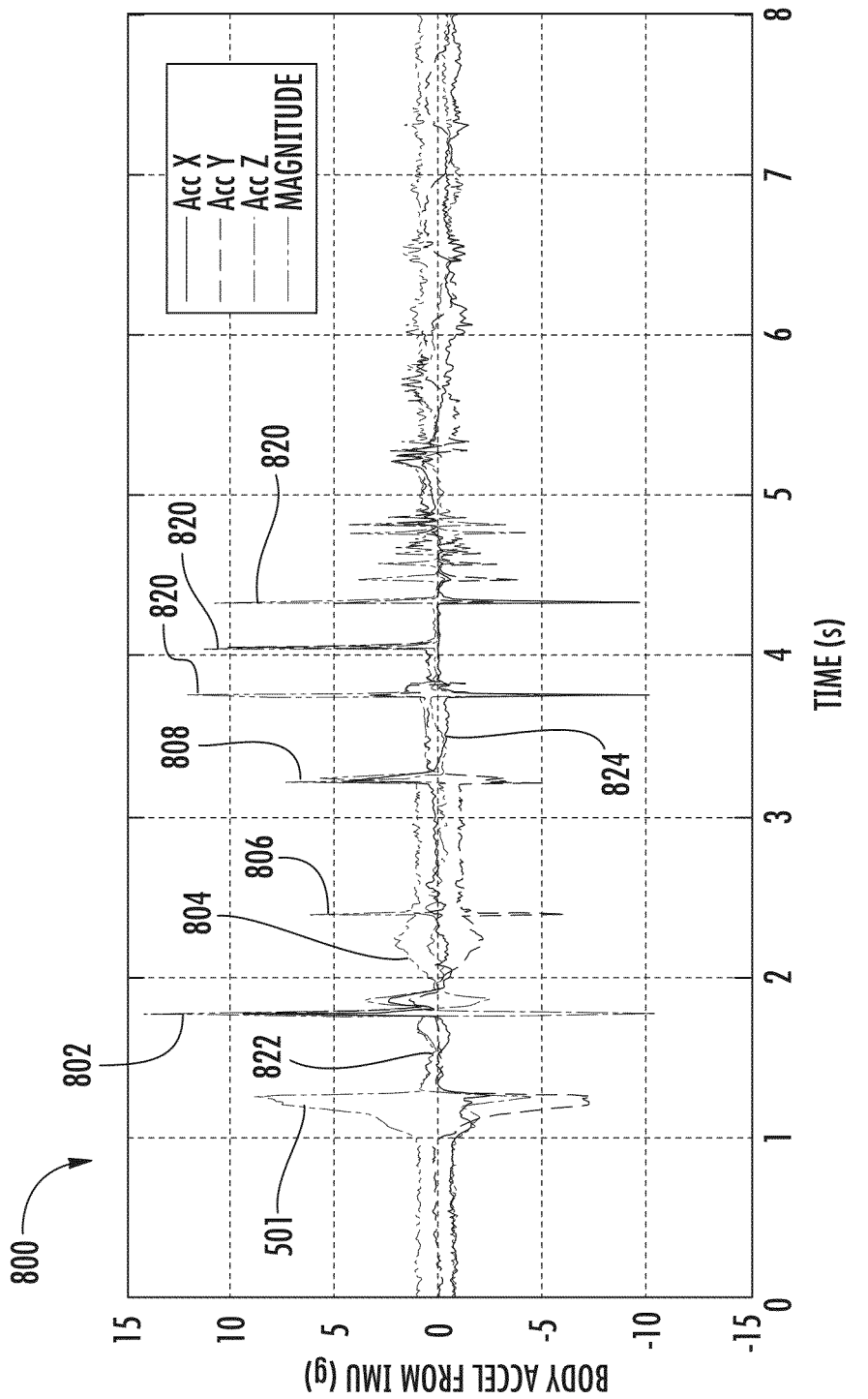
FIG. 11 is a diagram of another example American football event acceleration trace signature for a continuous series of football events utilized by the sport performance system of FIG. 5.
Figure 12:
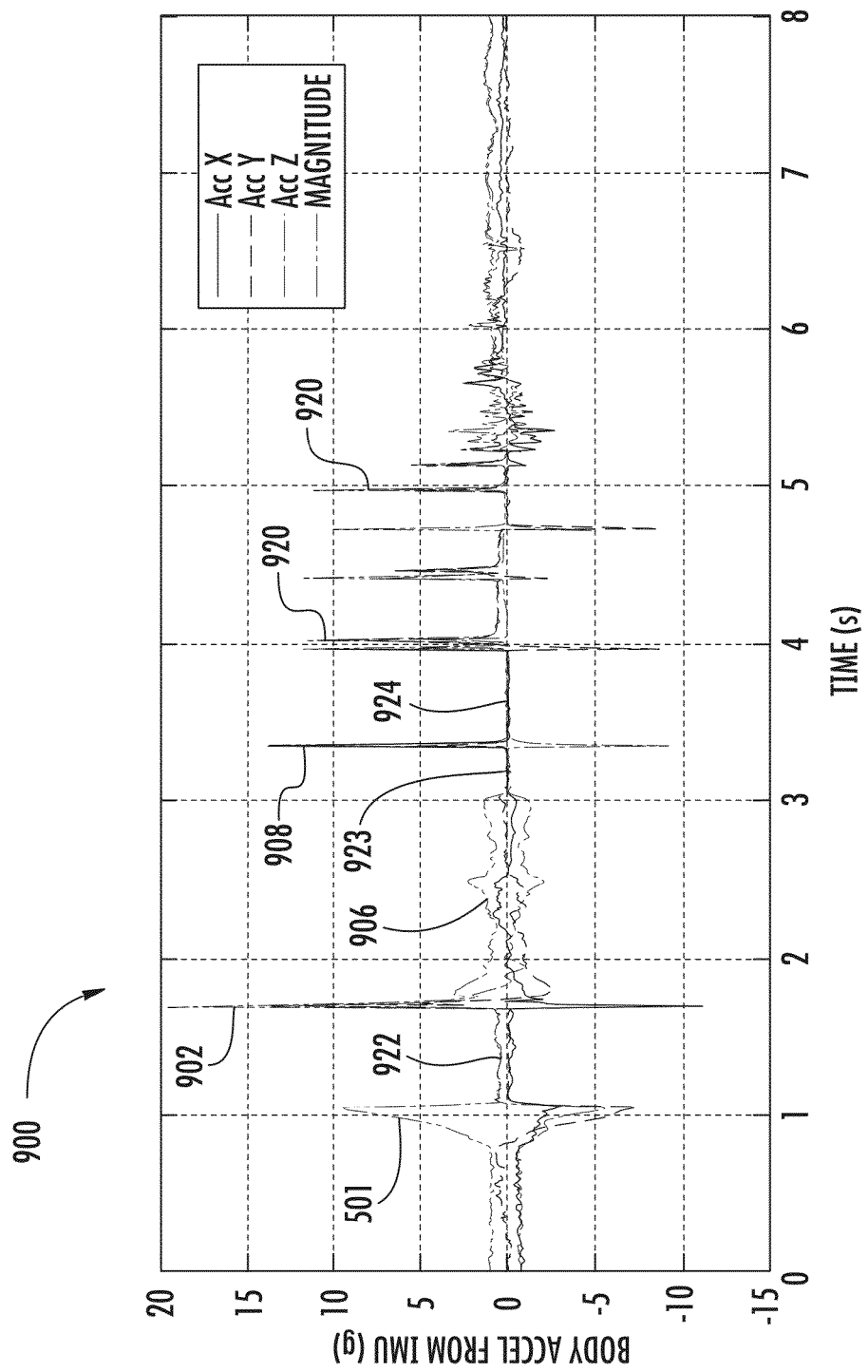
FIG. 12 is a diagram of another example American football event acceleration trace signature for a continuous series of football events utilized by the sport performance system of FIG. 5.

FIGS. 11 and 12 illustrate example acceleration traces serving as signature traces for continuous series of football events involving kicking and punting of football 450. As with the above signature traces, FIGS. 11 and 12 illustrate signals output for acceleration along X, Y and Z orthogonal axes along with a magnitude tracing. FIG. 11 illustrates an example trace 800 produced by a continuous series of football events during an example field goal kick that is short or which impacts the ground rather than being caught by a net or a capture behind the goalpost. As shown by FIG. 11, trace 800 of acceleration comprises amplitude spikes that occur in response to the ball being snapped (spike 501), in response to the ball being received by the hands of a holder (spike 802), in response to the ball being lowered to the ground by the holder (spike 804), in response to the ball impacting and placed on the ground (spike 806), in response to the ball being impacted by the kicker's foot (spike 808), and in response to the ball subsequently bouncing or impacting the ground after flight (spikes 820). In other implementations where the field-goal is good and the football is caught by a net behind the goalpost or is caught by a catcher, spikes 820 may not occur or may be omitted from signature trace 800. As further shown by FIG. 11, the flight of the football from the snap to the holder is represented by portions 822 of trace 800. The flight of the football following the kick is represented by portion 824 of trace 800. Although portion 824 of trace 800 is illustrated as lasting less than one second, the length of this portion will vary depending upon the length, acceleration, speed, launch angle, and environmental conditions at the time of the kick. Utilizing this length and a detected acceleration or speed of football 450, a distance of a kick may be calculated by module 460. A fake field goal would have a different acceleration signature trace.

FIG. 12 illustrates an example trace 900 produced by a continuous series of football events during an example punt that impacts the ground rather than being caught. As shown by FIG. 12, trace 900 of acceleration comprises different spikes corresponding to different football events in the series. Different spikes having different shapes and/am different amplitude occur or are produced in response to the ball being snapped (spike 501), in response to the ball being received by the hands of the punter (spike 902), in response to the steps by the punter prior to the punt (spikes 906), in response to the ball being impacted by the punter's foot (spike 908), and in response to the ball subsequently bouncing or impacting the ground after flight (spikes 920). In other implementations where the punted football is caught, spikes 920 may not occur or may be omitted, or may be a single spike from signature trace 900. As further shown by FIG. 12, the flight of the football from the snap to the holder is represented by portions 922 of trace 900. The release of the ball by the punter prior to the ball being punted is indicated by portion 923 of trace 900. The flight of the football following the punt, or hang time, is represented by portion 924 of trace 900. Although portion 924 of trace 900 is illustrated as lasting less than one second, the length of this portion will vary depending upon the length, acceleration, speed, launch angle, and environmental conditions at the time of the punt. Utilizing this length and a detected acceleration or speed of football 450, a distance of a punt may be calculated by module 460. A fake punt would have a different acceleration signature trace.

Once football travel parameter module 460 has identified or determined one or more football events, module 460 directs processor 26 to output graphics, information, lights, sound or other indicators based upon and/or utilizing the determined or identified football events. In one implementation, module 460 cooperates with display module 239 to display graphics representing the one or more football events by displaying a simulation of football 450 experiencing or undergoing the one or more football events. In one implementation, the timing, distances and/or positioning of the football in the graphical simulation are based upon football travel parameters received from sensor 252 of football 450.

In one implementation, module 460 stores and displays different data based upon identified football events in the timing of such identified football events for evaluation, comparison and/or training. For example, by identifying a snap of a football, module 460 may also identify the time elapsed from the identified snap to a second football event such as a punt, kick or pass of the football. By identifying a cocking of a football (a first football event) and the past release or launch of the football (a second football event), module 460 may identify the time elapsed to determine a quarterback release time or quick release for storage, display and/or comparison/training purposes. By identifying a snap of the football and receipt of the snap football by holder, punter or quarterback (during a quick snap or shotgun snap), the quality of the long snap may be stored, displayed and evaluated by module 460. By identifying when the football initially impact the ground following a kickoff for punt and by identifying each bounce of the football as well as a velocity and spin of football, model 460 made determine and display a travel distance of the football following the determined initial ground impact. Such a determination may facilitate training for kickoffs and onside kicks. As will be described below, the spiral efficiency of such long snaps may further be evaluated, displayed and compared by module 460. The present system provides the ability for a player, coach, team or organization to analyze one or more football events in a variety of different ways, simply, accurately, and comprehensively to evaluate a practice, an exercise, an in game play, or other football event(s). Additionally, the present system can be used to identify what event or events occurred to the football. In other words, a player could pick up the football and perform a series of football events, and the system can determine what the football event or events were based upon the signature trace. For example, the system can be configured to communicate that the football was just snapped, thrown and caught by a receiver. The system can also communicate more details such as the duration of each event or combination of events.

In one implementation, module 460 utilizes the one or more events as a basis for triggering a visible or audible alarm. For example, in one implementation, module 460 may utilize the identification of a football snap as a starting point for tracking the time for the quarterback to throw the ball or for a punter to kick a ball, wherein a visible or audible alarm is triggered at a predetermined time period following the identified snap. In another implementation, the visual or audible alarms may be emitted at a pre-determined frequency, such as, for example, once per second. In one implementation, module 460 may utilize the identification of the football snap as a starting point for determining a time following the snap to output a visible or audible indication that an opposing defense may initiate a rush, such as in a touch or flag football game. In one implementation, visible and/or audible alarms are provided with one or more light or emitters carried by football 450, wherein processor 26 transmits signals to football 450 initiating the alarm. In another implementation, such visible and/or audible alarms are provided by an auxiliary sound or light emitter, positioned along a playing field, which receives triggering signals from processor 26. In another implementation, such visible and/or audible alarms are provided on the personal electronic device itself. In another implementation, such visible and/or audible alarms may be produced by a sound and/or light emitter positioned within or attached to the ball. In another implementation, such visible and/or audible alarms are provided by a remote sound and/or light emitting device.

In one implementation, module 460 not only associates time with each football event or the series of football events, but also associates football travel parameters, characteristics of the football in motion, with the identified or determined football event or series of football events. For example, in one implementation, module 460 may identify the withdrawal or cocking of a quarterback's arm to initiate a pass. Utilizing such information and the time at which the cocking of a quarterback's arm begins, module 460 determines and associates a sensed height of the football at such time to the determined beginning of the throwing motion, facilitating analysis of throw mechanics. Likewise, module 460 may identify the release of the football. Utilizing the time at which the football is determined to be released, module 460 may associate sensed data regarding a height of the football to the time at which the release of the football takes place, allowing analysis and training regarding the release height of football by the quarterback. In another implementation, module 460 determines when a ball is released or when the ball initiates flight following a punt or kick, wherein module 460 may associate spin characteristics for the particular time in which module 460 determines that the ball is in flight to determine spiral efficiency or other spin characteristics for a pass, punt or kick.

Figure 13:
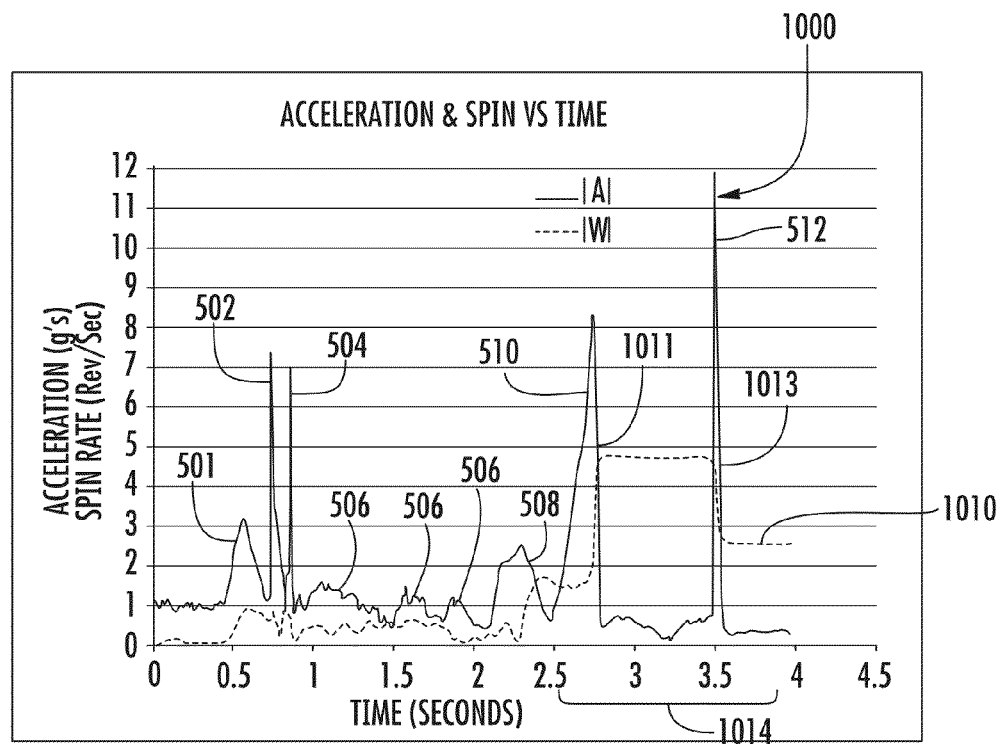
FIG. 13 is a diagram of an example football event acceleration trace overlaid with respect to an example spin rate trace and revolutions per second.

FIG. 13 is a graph overlaying a received acceleration trace 1000 over time with a spin rate trace 1010 over the same period of time. In addition to comparing the received acceleration trace to one or more stored signature acceleration traces to identify distinct events, module 460 evaluates the spin, if any, of the football, or its spiral efficiency, during different football events. For example, module 460 evaluates the spin and/or spiral efficiency of a football when in flight during a pass (portions 824, 924 and FIGS. 11 and 12, respectively), the spin and/or spiral efficiency of a football when in-flight following a snap to a holder (portion 822 of trace 800 of FIG. 11), to a punter (portion 922 of trace 900 of FIG. 12), or to a quarterback such as following a shotgun or quick snap; and evaluates the spin and/or spiral efficiency of a football when in-flight after being kicked (portion 824 of trace 800 of FIG. 11) or punted (portion 924 of trace 900 of FIG. 12).

FIG. 13 illustrates the received acceleration trace 1000 and the received spin (revolutions per second) trace 1010 over time for a series of events comprising an under center snap, three step drop, throw and catch. Module 460 directs processor 26 to compare the received acceleration trace with previously stored acceleration signature traces (such as shown in FIGS. 6-42). Based upon this comparison, processor 460 identifies acceleration spike 501 as corresponding to a snap of the football, acceleration spike 502 as corresponding to the quarterback receiving the ball under center, acceleration spike 504 as corresponding to moving of the ball from under center by the quarterback, acceleration spikes 506 to each of the three steps of the three-step drop, acceleration spike 508 is a cocking of the arm prior to the throw, acceleration spike 510 is forward movement of the arm and the final launch of the football, and acceleration spike 512 as the catch of the football (the impact of the ball with the receiver). If additional acceleration spikes immediately followed the catch within a predefined period of time, module 460 may alternatively identify spike 512 as part of a football event constituting a drop of the football (or an incompletion). As further shown by FIG. 13, the spin rate of the football drastically increased upon release of the football at time 1011 (can be indicative of the quarterback's finger tips imparting spin to the football at the point of release) and dropped off upon impact with the receiver's hands at time 1013.

Figure 14:
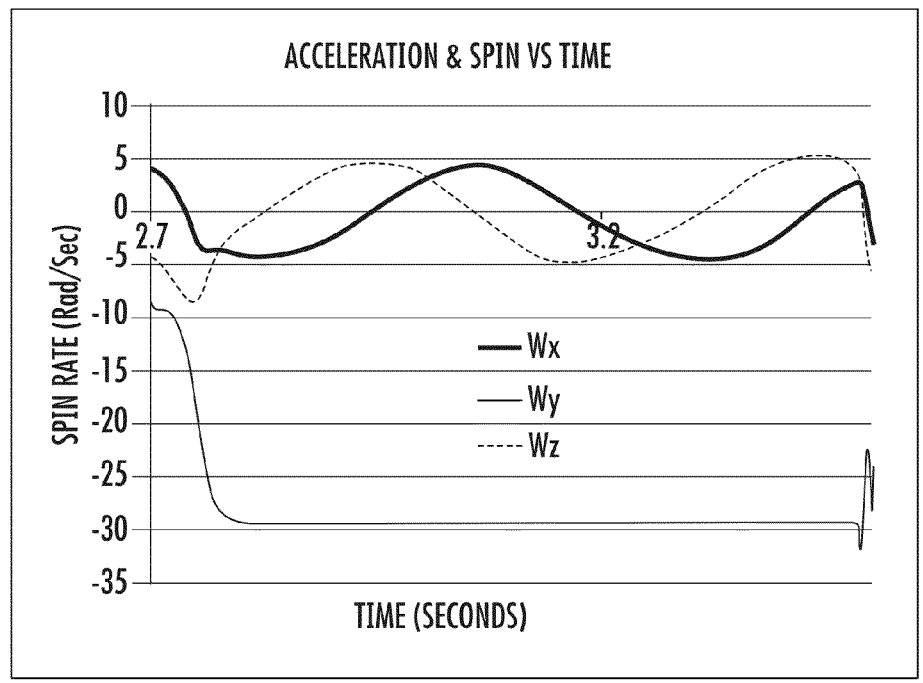
FIG. 14 is a diagram of an example spin rate trace in radians per second.

FIG. 14 is a graph depicting a football travel parameter of football 450 during the time period 1014 shown in FIG. 13. The football travel parameter shown in FIG. 14 is the spin rate in radians per second of football 450 along each of the three axes x, y and z during time period 1014. The illustrated spin rate $W_y$ shows generally reflects the spin of the football 450 about its longitudinal axis. The spin rate is highest upon leaving the quarterback's hands, drops and remains generally constant during most of the flight of the football. The illustrated spin rates $W_x$ and $W_z$ in radians per second indicate a degree of wobble of football 450 over time, and illustrates the spiral efficiency of football 450 over time. In the example illustrated, football 450 is illustrated as rotating between +5 and −5 radians per second. A tighter spiral would be a case where football 450 rotates within a smaller spiral range about 0, say, for example, between +3 and −3 radians per second. A looser spiral (sometimes referred to as a "duck") would be reflected by a larger spiral range about the $W_x$ and $W_z$ spin rates. By determining a spin rate in radians per second, module 460 is able to determine a spiral efficiency of football 450 during the noted time period 1014. As a result, module 460 may output an evaluation of a pass, kick, punt or snap of a football on the basis of its spiral efficiency for training and comparison purposes.

Figure 15:
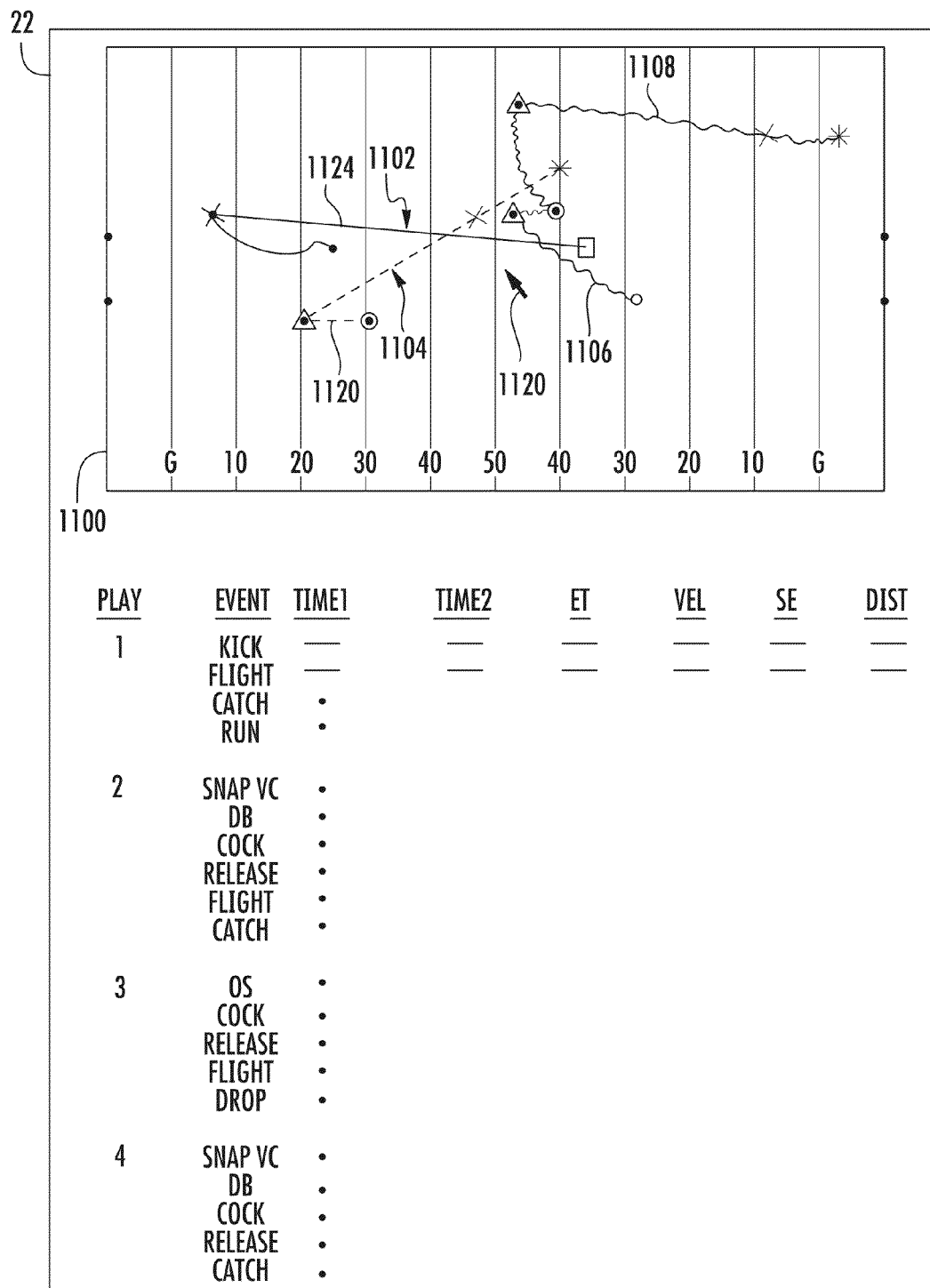
FIG. 15 is a diagram of an example screenshot presented by the system of FIG. 5 including a representation of a football field and event data presentation.

In one implementation, module 460 is further configured to display, using display 22 and display module 239, a tracking of football 450 across a football field or playfield utilizing the identified football events. FIG. 15 illustrates an example presentation of football field tracking on display 22. As shown by FIG. 15, module 460 displays a representation of a playing or football field 1100. Utilizing the identified football events, module 460 further displays each continuous series of identified football events and the respective positions on football field 1100. In the example illustrated, module 460 presents for continuous series of football events or "plays", a kickoff 1102, a completed pass 1104, an incomplete pass 1106 and a completed pass 1108.

In the example illustrated, module 460 further presents data on display 22 pertaining to each of the depicted plays, as applicable. The example illustrated, module 460 presents data regarding information such as the start time of an event (time 1), the ending time of an event (time 2), the elapsed time of an event (ET), the velocity of the ball (VEL), the spiral efficiency of the ball (SE) and the distance traveled by the ball (DIST). In other implementations, other information or data may be presented for each event, as applicable.

In one implementation, different events of each individual play are graphically distinguished from one another on the graphic of football field 1100. For example, in the example illustrated, different plays are represented by different line styles representing movement of the football during a run or pass. Individual events in a play, other than the travel or flight of the ball which is used to distinguish between different plays, are represented by different symbols. In the example illustrated, a kick is represented by a dot inside a square. A snap is represented by a dot inside a circle, a catch is represented by an x, and endpoint of a plays represented by a dot and a dropped pass is represented by an empty circle. A throw of a football is represented by a dot in a triangle. The endpoint of a run following a handover or following a catch is represented by an asterisk (*). In other implementations, other symbols, colors, fonts or other graphic variations may be additionally or alternatively employed to distinguish between different events in a play as well as to distinguish between different plays. Although not illustrated, in some implementations, a legend or key may additionally be presented by module 460.

In one implementation, module 460 may graphically represent or present the plays on a graphic of football field 1100 which serves as a graphical user interface. In such an implementation, module 460 may provide a selector 1120, such as a cursor, pointer or movable icon, which may be moved through manipulation of a mouse, keyboard, touchpad or the like to locate the selector 1120 over the graphics or icons representing identified events of a play. Based upon the positioning of selector 1120, module 460 presents any and all relevant information for the particular event beneath selector 1120. For example, in response to selector 1120 may be positioned over the depiction of event 1122 representing a quarter back drop back following under center snap. In response, module 460 presents the number of steps taken, and the time elapsed for the drop back. In response to selector 1120 being positioned over the graphic representing the event 1124 representing the flight of a kick, module 460 presents the velocity the football, the spiral efficiency of the football, the hang time of the football and the distance of such flight. In response to selector 1120 being positioned over a throw event, module 460 automatically retrieves and presents information pertaining to the throw event such as the pass release time, the elapsed time from the snap of the ball. In one implementation, module 460 may additionally present the spiral efficiency, velocity and distance of the ball in response to the throw event being selected. In some implementations, module 460 is configured such that selector 1120 may be utilized to highlight or select multiple events forming a portion of a play for the presentation of associated data.

In one implementation, module 460 is configured to allow or prompt a user to input various settings, varying what information, such as what data is presented, the number of plays presented, how such plays and events are graphically distinguished from one another upon the selection of a particular event on the graphical user interface formed by football field 1100 and the presented plays. In this manner, module 460 facilitates evaluation of an entire possession of the football by a team or a longer period of time such as a quarter, half or entire game.

In one implementation, module 460 allows a user to filter out what is displayed. For example, module 460 may allow a person to enter commands or selection such that only passing completions are presented, such that only pass completions are presented, such that only kicks are presented, such that only punts are presented or the like. In one implementation, module 460 is configured to allow a person to establish or adjust settings such that only particular events or categories of events are presented to allow user to focus his or her analysis on a particular type of football event. For example, such settings may be adjusted such that only under center snaps or only quick/shotgun snaps are presented on field 100 or the underlying data table. As a result, in such an implementation, module 460 provides an easy-to-use interface allowing a coach, player or other person to quickly and easily sort through and analyze data for particular football events or groups of football events.

Figure 16:
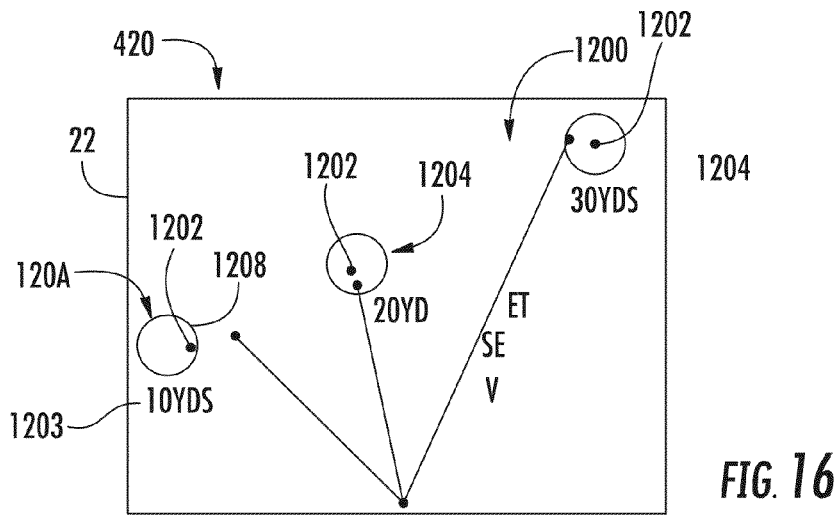
FIG. 16 is a diagram of an example screenshot presented by the system of FIG. 5 including representations of a plurality of targets on a playing field and the paths taken by practices throws of an example football.

FIG. 16 illustrates system 420 operating in a selected mode in which system 420 provides a player with a practice routine, instructing the player to perform a series of practice throws for data capture and analysis. FIG. 16 illustrates an example presentation 1200 on display 22 directing a player to complete passes for predetermined locations 1202 at predefined distances 1203 and at predefined lateral regions 1204 of a field. In the example illustrated, each predefined location 1202 is surrounded by a target window 1208 in which will be deemed as accurate. Window 1208 is a window of distances and feel regions that are deemed by module 460 as sufficiently close so as to count as satisfying the target. In one implementation, module 460 may be configured to allow a person to adjust the size of such windows for deeming a pass to have been completed or for deeming a pass as being sufficiently accurate. In one implementation, the size of such windows may automatically increase or decrease depending upon accuracy results currently being achieved by a player using the current window size. For example, if such target training is becoming too easy for a player, module 460 may automatically adjust a size of one or more of windows 1208.

In one implementation, module 460 may present differently sized windows depending upon the particular field region or the particular distance of a throw. For example, short throws may have a tighter/smaller window 1208 as compared to windows for longer distance throws. If a particular throw to a particular location yields poor results, module 460 may enlarge the size of the associated window 1208. Alternatively, if a particular throw to a particular location yields results exceeding a predefined success threshold, module 460 may decrease the size of the associated window 1208 to increase the challenge to the player. In one implementation, module 460 may present differently shaped windows or windows that are non-uniformly or eccentrically positioned with respect to the primary target location, so as to more strongly discourage errors to a predetermined side of the target location. For example, in situations where it may be more acceptable to miss a target to the outside of the target as compared to the inside of the target (so as to avoid an interception) module 460 may eccentrically locate the window towards the outside of the target.

FIG. 16 further illustrates the detected actual results of such pass attempts presented on the same display. As a result, the player may visibly ascertain the accuracy of his or her throws. In some implementations, such accuracy results may further be textually displayed on display 22. Although module 46 is illustrated as concurrently depicting multiple pass targets and concurrently depicting multiple pass target results, in other implementations, module 460 may depict a single pass target and pass target result. In one implementation, module 460 may additionally present on display 22 football travel parameters associated with the individual throws such as a spiral efficiency (SE), elapsed time (ET) and/or velocity (V) of the throw.

Figure 17:
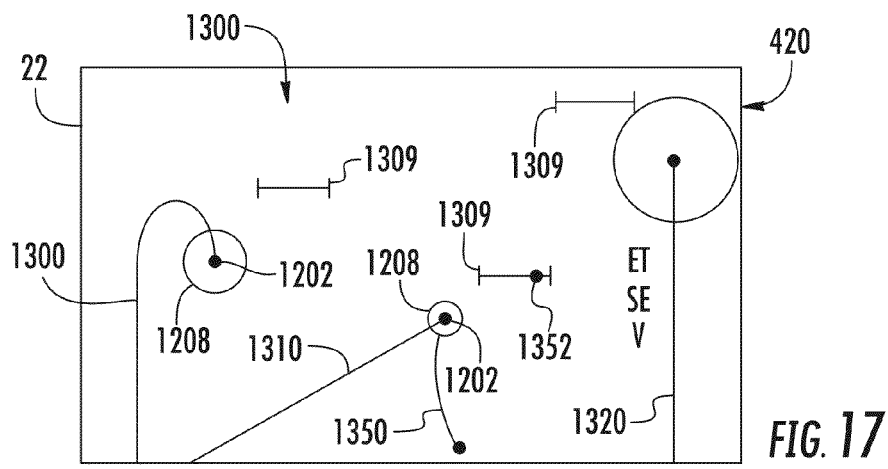
FIG. 17 is a diagram of an example screenshot presented by the system of FIG. 5 including representations of a plurality of practice timing routes on a playing field and the associated throwing targets.

FIG. 17 illustrates system 420 operating in a selected mode in which system 420 provides a player with a practice routine, instructing the player to perform a series of timing route practice throws for data capture and analysis. FIG. 17 illustrates an example presentation 1300 in which different example timing routes are presented for completion by a player in training. In the example illustrated, module 460 directs processor 26 to present three different receiver pass routes: a button hook 1300 with a target location 1202, a completion window 1208 and a timing window 1309; a slant 1310 with a target location 1202, a target completion window 1208 and a timing window 1309; and a fly pattern 1320 with a target location 1202, a completion window 1208 and a timing window 1309. In other implementations, other passing routes can be used. The target location 1202 and target completion window 1208 are described above with respect to FIG. 16. Timing window 1309 indicates a range or window of times for which the ball is to arrive at the target window 1208 or at the target location 1202 (depending upon a player's settings or preferences). The scale of timing windows 1309 present on display 22 may be uniform or may alternatively vary depending upon the length of time being presented for each pass. In one implementation, the timing for each timing window is based upon an elapsed time from a determined snap of the football. In another implementation the timing for each timing window is based upon elapsed time from a determined initiation of a pass (beginning of arm cocking) or release/launch of a pass. Because system 420 determines the timing of the relevant football event (snap, arm cocking, pass release), system 420 accurately tracks the timing in which the ball reaches or passes through the target region defined by the particular window 1208. As a result, system 420 facilitates evaluation of positional accuracy and time accuracy for a throw. In one implementation, the user may be presented with multiple target regions and windows 1208 and be provided with an indication of which of the multiple target regions and windows is the desired target. Such an implementation can be used to improve decision making, release of the football and/or surveying of the field.

In the example illustrated in FIG. 17, window 1208 of pass 1310 is reduced in size as compared to window 1208 of pass 1300. Likewise, window 1208 of pass 1320 can be a non-uniform shape and can be eccentrically positioned with respect to location 1202. Window 1208 is also larger than windows 1208 of passes 1300 and 1310. In some implementations, module 460 may establish or adjust the size of timing windows 1309 in a fashion similar to the adjustment of the size of windows 1208. For example, module 460 may direct processor 26 to automatically increase or decrease the size of the timing window 1309 depending upon the degree of success being achieved by the player with the current timing window 1309. In some implementations, module 460 may additionally or alternatively adjust the size of the timing window 1309 based upon the type of the pass, the distance of the pass and/or the region of the field for a particular pass. In other implementations, system 420 may prompt a person to input various settings or parameters for establishing such timing windows 1309.

FIG. 17 further illustrates the display of throw results 1350 (or the path of the football) for one of the illustrated targets, slant 1310. In the example illustrated, the timing accuracy of the actual throw is depicted on the timing window 1309 at point 1352. In the example illustrated, the player may visibly ascertain that his or her throw was on the long side of the range of times which the ball was to reach our pass through window 1208 for the particular pass. In other circumstances, point 1352 may be illustrated at a location within timing window 1309, or depending upon the timing of the actual throw, to the left or to the right of the illustrated timing window 1309 illustrating that the ball arrived at the location target window 1208 early or late, respectively.

Figure 18:
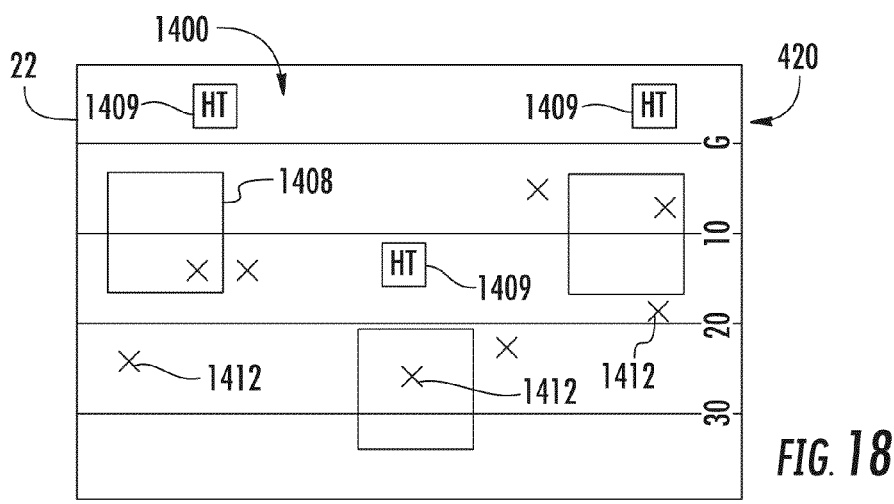
FIG. 18 is a diagram of an example screenshot presented by the system of FIG. 5 including representations of a plurality of targets on a playing field and the landing locations of an example football.

FIG. 18 illustrates system 420 operating in a selected mode in which system 420 provides a player with a practice routine, instructing the player to perform a series of timing routes, practice kickoffs or punts for data capture and analysis. FIG. 18 illustrates an example presentation 1400 in which different example kicks or punts to different regions of a football playing field are presented for completion by a player in training. In the example illustrated, module 460 directs processor 26 to present three different kick or punt target regions defined by a target window 1408 and having a minimum hang time values (HT) 1409. Each target window 1408 defines the region of the football field in which a kick or punt is to land. Each hang time value 1409 is a minimum hang time for the kick or punt.

As shown by FIG. 18, in addition to displaying target regions 1408 and target minimum hang times 1409, module 460 may direct processor 26 to visibly present actual results for different kicks and/or punts with respect to the different target regions 1408. In the example illustrated, actual landing locations are identified by x-shaped graphics 1412. In one implementation, module 460 utilizes the determined kick football event (impact of football by the kickers foot) to determine the hang time. In one implementation, module 460 indicates whether a particular punt or kick satisfies the minimum hang time value HT by displaying the punt or kick landing spot x in different colors. In one implementation, a kick or punt satisfying minimum hang time will be displayed in the color green by kicker but a kick or punt not satisfying the minimum hang time will be displayed in the color red. In one implementation, the extent to which a punt or kick satisfies or fails to satisfy the minimum hang time value may be indicated through different indicia or other form such as colors, brightnesses or the like. For example, different kicks or punts having hang times falling within different ranges of time may be presented with different colors, brightnesses, symbols or the like. As a result, system 420 allows a person or player to visibly ascertain his or her kicking or punting performance, not only taking into account positional accuracy but concurrently taking into account hang time.

FIGS. 19-52 illustrate various screenshots of an example sport performance system 420. In one implementation, such screenshots are presented on a screen or display 22 of a portable electronic device such as a portable smart phone, a portable personal data assistant, a portable digital music player (IPOD etc) or a portable tablet. In other implementations, such screenshots may be presented on a laptop or desktop computer.

Figure 19:
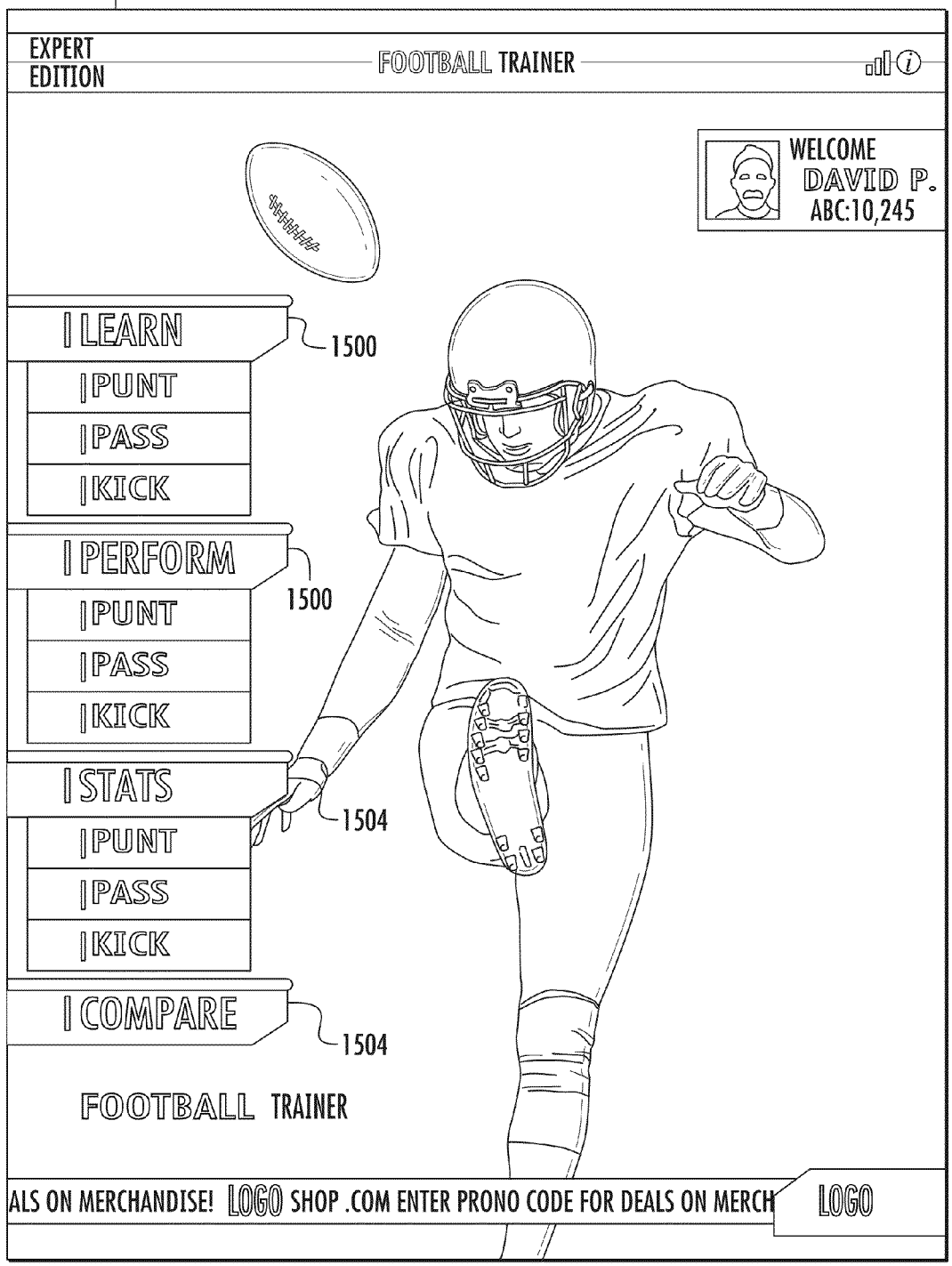
FIG. 19 illustrates an example screenshot of an example implementation of the sport performance system of FIG. 5 including a player punting a football and selectable tabs.

As shown by FIG. 19, processor 26, following instructions contained in memory 428 provides a user (David P. in the example) with the options to learn 1500, perform 1502, stats 1504 or compare 1506. As further shown by FIG. 19, under the learn tab or option 1500, the user is further provided with the option to select categories of punt, pass or kick. Each of such selections can be made using a touchscreen or may be made using a keyboard, touchpad or other input device. As shown by FIG. 19, under the perform option, the user is further provided with the option to select categories of punt, pass and kick. As shown by FIG. 19, similar categories are provided under the option of stats.

Figure 20:
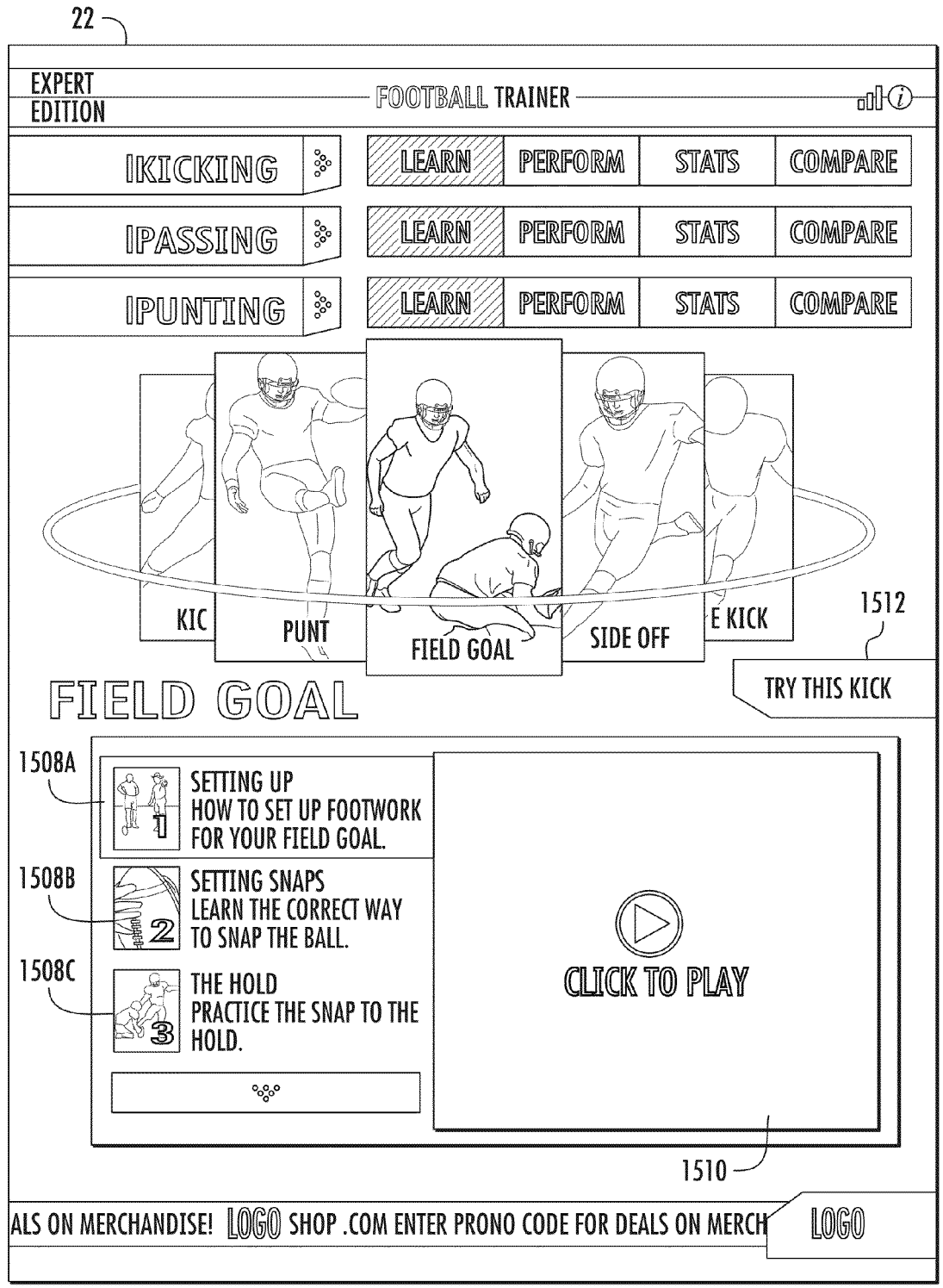
FIG. 20 illustrates an example screenshot of an example implementation of the sport performance system of FIG. 5 in which the learn tab option of kick is selected.

FIG. 20 illustrates a presented screenshot produced by processor 26 in response to a person selecting the kick category under the learn option 1500 of the screenshot presented in FIG. 19. In the example illustrated, the user is provided with the options of selecting various instructional videos 1508A, 1508B, 1508C pertaining to field-goal kicking. In response to such selections, instructional videos are presented on a video window portion 1510 of display 22. As shown by FIG. 20, after instructional videos for each of the individual steps or portions of a field-goal kicking attempt are presented, the user may select presentation of all of the steps or portions of the field-goal kicking attempt for review. When the user is ready to try the kick, he or she may select the "try this kick graphical user interface or icon 1512 which transitions system 420 to a sensing and analysis mode.

Figure 21:
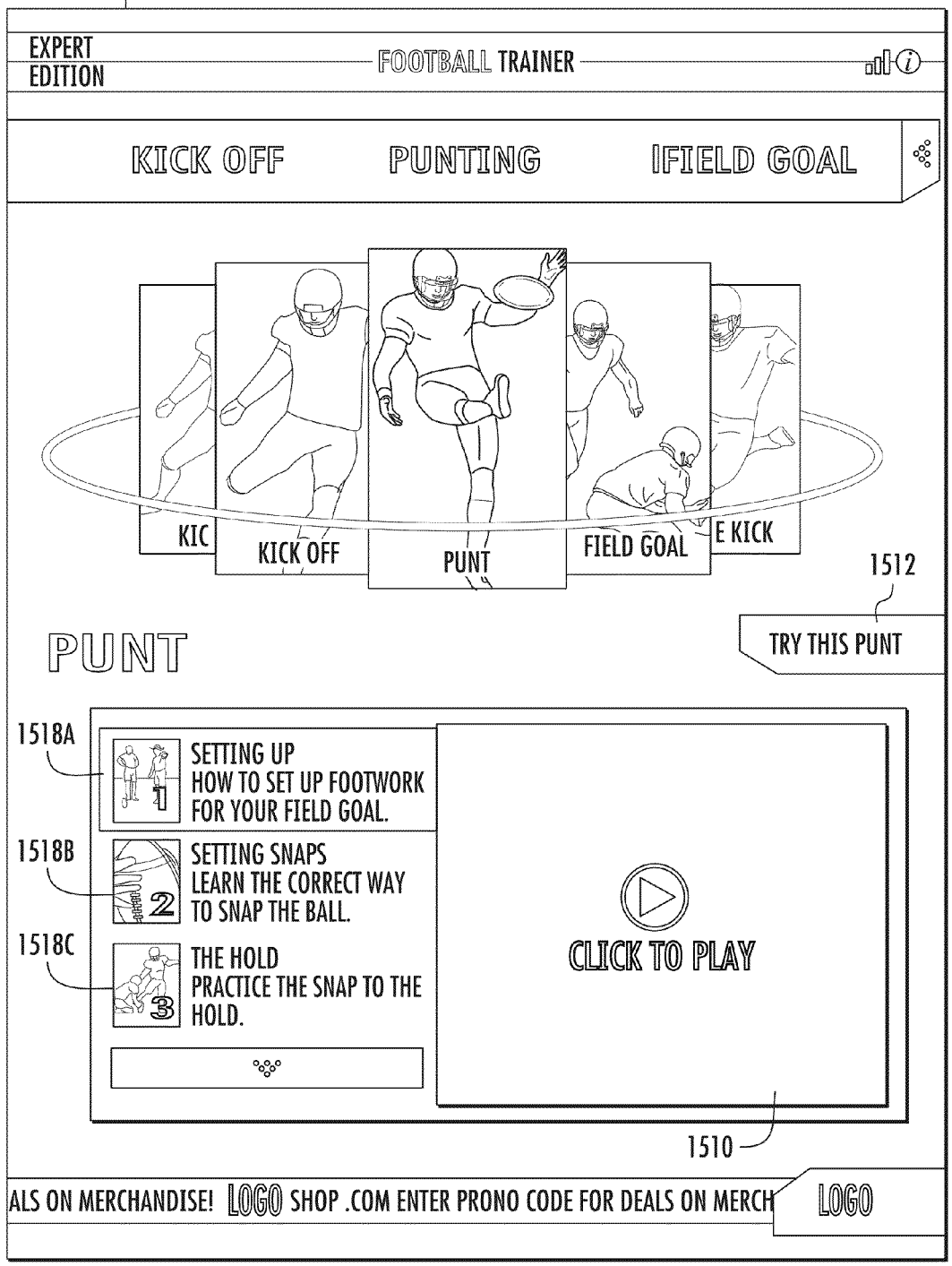
FIG. 21 illustrates an example screenshot of an example implementation of the sport performance system of FIG. 5 in which the learn tab option of punt is selected.

FIG. 21 illustrates a presented screenshot produced by processor 26 in response to a person selecting the punt category under the learn option 1500 of the screenshot presented in FIG. 19. In the example illustrated, the user is provided with the options of selecting various instructional videos 1518A, 1518B, 1518C pertaining to punting. In response to such selections, instructional videos are presented on display 22. As shown by FIG. 21, after instructional videos for each of the individual steps or portions of a punt are presented, the user may select presentation of all of the steps or portions of the punt for review. When the user is ready to try the punt, he or she may select the "try this kick" graphical user interface or icon 1512 which transitions system 420 to a sensing and analysis mode.

Figure 22:
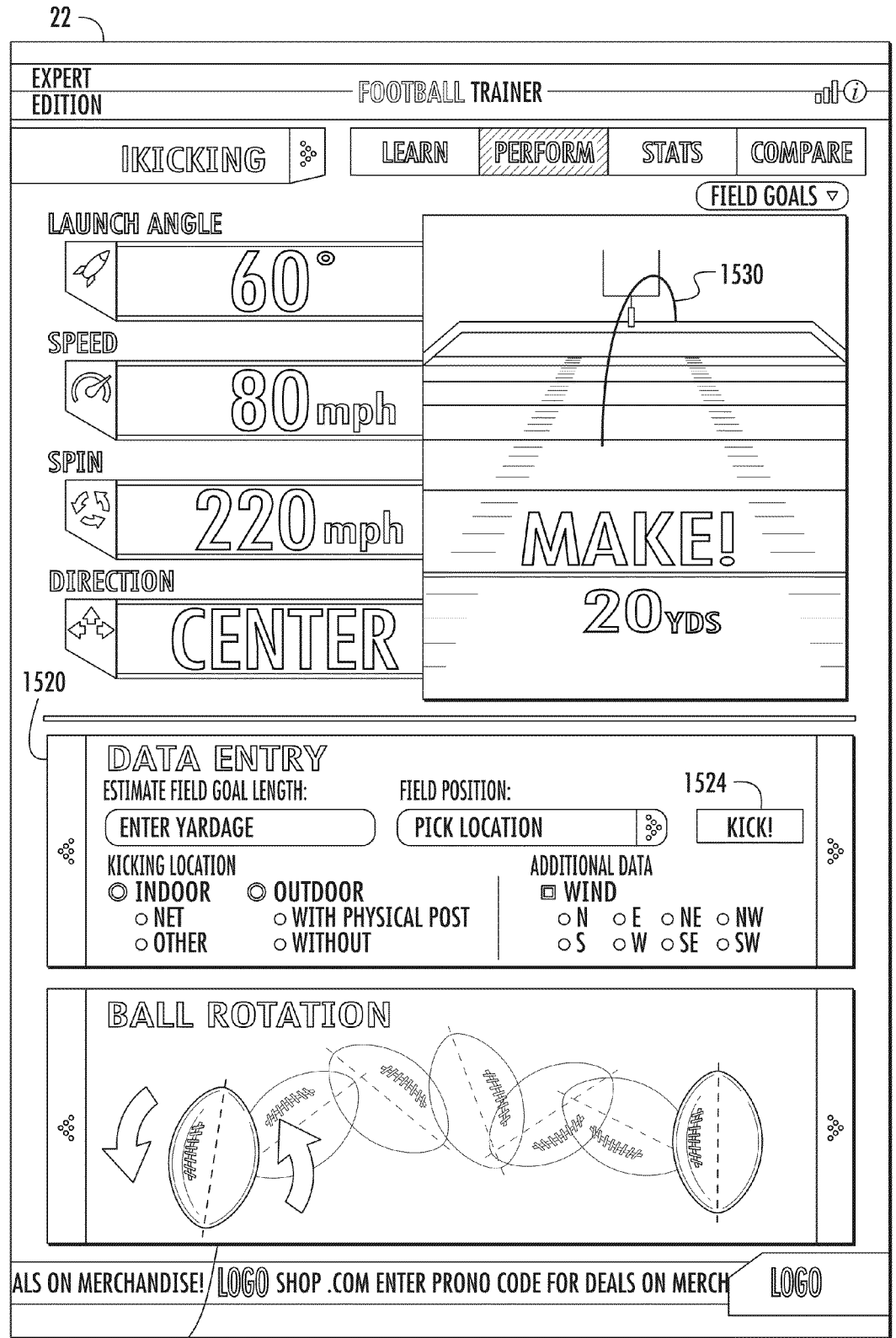
FIG. 22 illustrates an example screenshot of an example implementation of the sport performance system of FIG. 5 in which the perform tab option of kick is selected including a graphic depicting the trajectory of a football during a field-goal kick attempt and data relating the field goal attempt.
Figure 23:
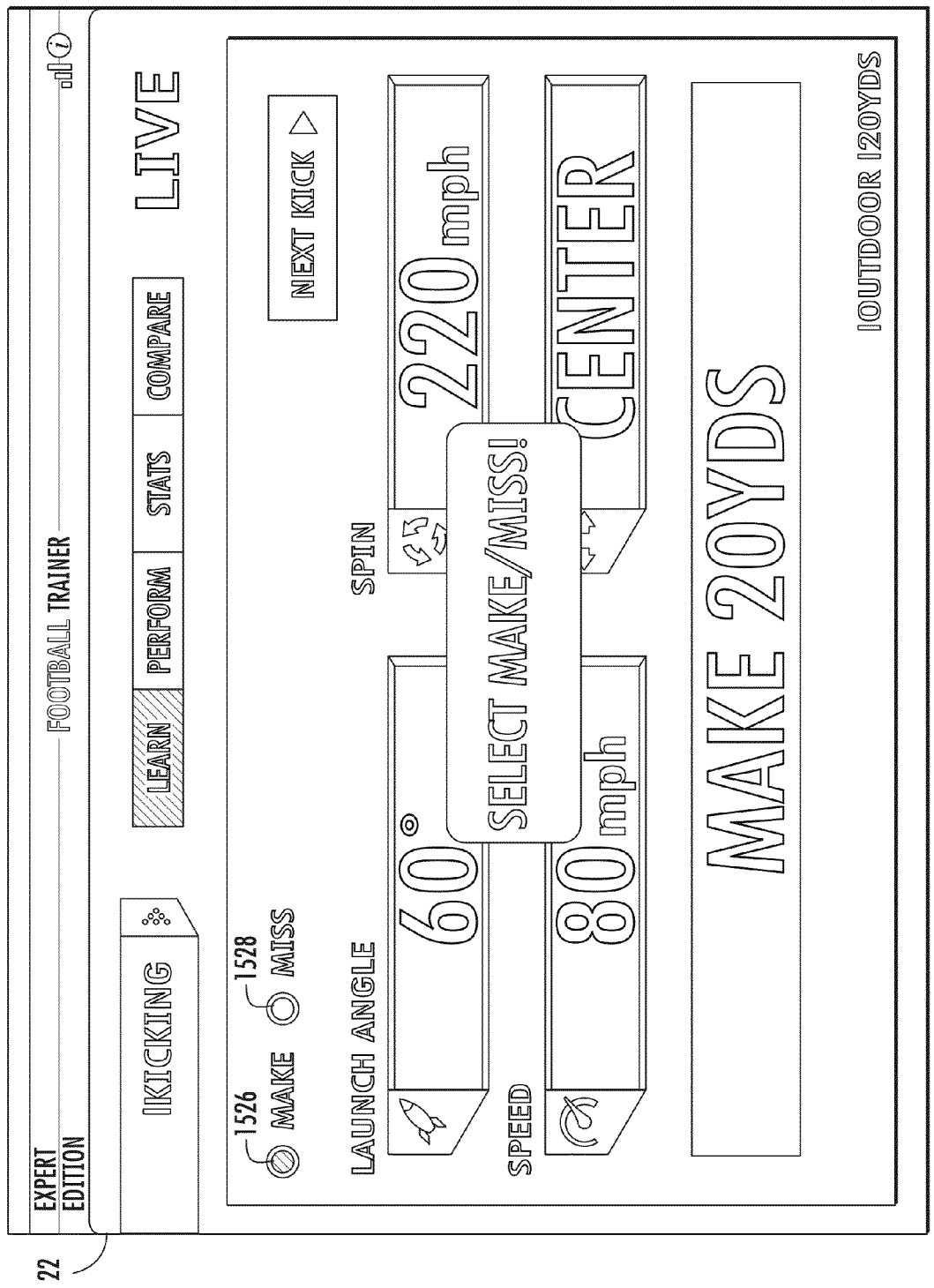
FIG. 23 illustrates an example screenshot of an example implementation of the sport performance system of FIG. 5 in which the perform tab option of kick is selected including data relating the field goal attempt and a user prompt.

FIGS. 22 and 23 illustrate screenshots presented on display 22 by processor 26 in accordance with instructions in memory 428 in response to the user selecting the kick category under the perform option (see FIG. 19). As indicated by a data entry section or screenshot portion 1520, processor 26 prompts the user to enter data regarding the conditions of the kick. In the example, processor 26 prompts the user, on display 22, to enter the field-goal length and the field position (center, left hash, right hash). Processor 26 may also prompt a user to input whether the kick is taking place indoors, outdoors, or whether the kick is with a net or a physical post. In some implementations, processor 26 may prompt a user to indicate whether the physical field-goal post is a high school, college or professional field-goal post. Processor 26 further prompts user to provide environmental data such as wind direction. As noted above, in some implementations, such environmental conditions may be sensed or may be retrieved from remote sources. One such information has been entered, the user may select the "kick!" button 1524 to initiate the kicking sample.

In response to receiving the "kick!" selection 1524, processor 26 notifies the user that system 420 is ready for the sample kick. Such notification may occur after synchronization between input 24 and transmitter 254 of ball 450. During the sample kick, sensor 252 gathers data are values for various ball travel parameters and transmits them to input 24 using transmitter 254. As noted above, the provision of data to input 24 may occur in other fashions in other implementations.

Figure 24:
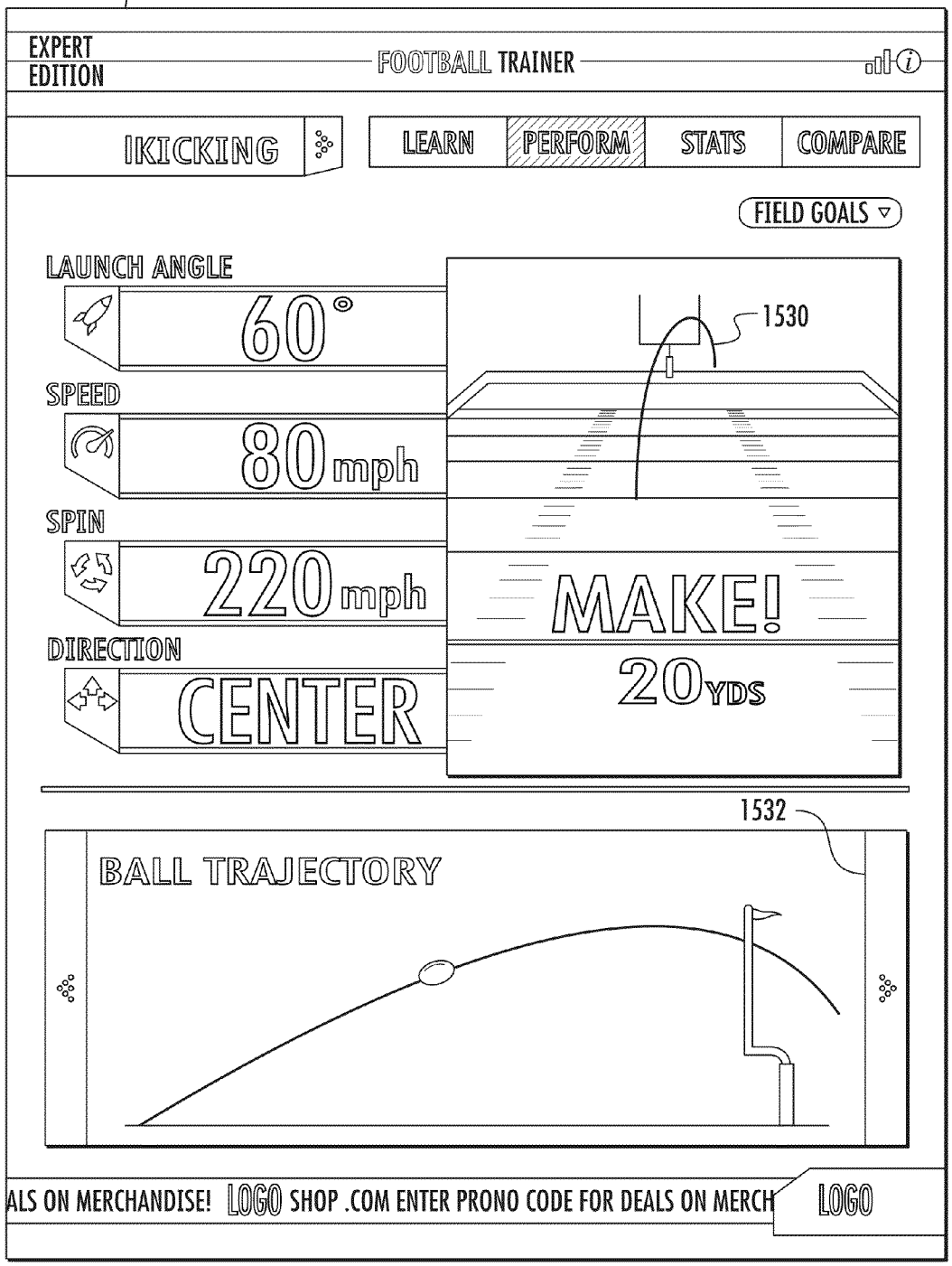
FIG. 24 illustrates an example screenshot of an example implementation of the sport performance system of FIG. 5 in which the perform tab option of kick is selected including graphics depicting the trajectory of a football during a field-goal kick attempt and data relating the field goal attempt.

Upon completion of the kick sample, processor 26 displays the ball travel parameters. In the example illustrated, the data collected comprises launch angle, speed, spin and direction of the football. As shown by FIG. 23, processor 26 prompts the user to indicate whether or not the particular field-goal kick attempt was successful by selecting either the make 1526 or miss 1528 inputs. In other implementations, the screenshot of FIG. 23 may be omitted where processor 26 determines whether or not the field-goal attempt was successful based upon the received values for the ball travel parameters, the environmental conditions, the field position and the field-goal length. In some implementations, processor 26 may indicate on display 22 at what distance the field-goal attempt would've been successful, or at what distances the field-goal attempt would not have been successful. The processor may indicate with what types of field-goal post the kick would've been successful or unsuccessful. This may be beneficial in those circumstances where the kick attempt is being made without actual field-goal posts. As shown by FIGS. 22 and 23, processor 26 displays the outcome. As shown by FIG. 22, processor 26 further presents a graphic 1530 depicting the trajectory of the football during the field-goal kick attempt. As shown by FIG. 22, processor 26 may present on display 22 a graphic 1532 indicating a rotation of the ball during the kick. As shown by FIG. 24, processor 26 may further display on display 22 a side view of the ball trajectory. Similar presentations may be made with the field-goal attempt is indicated to be wide left, wide right or short.

Figure 25:
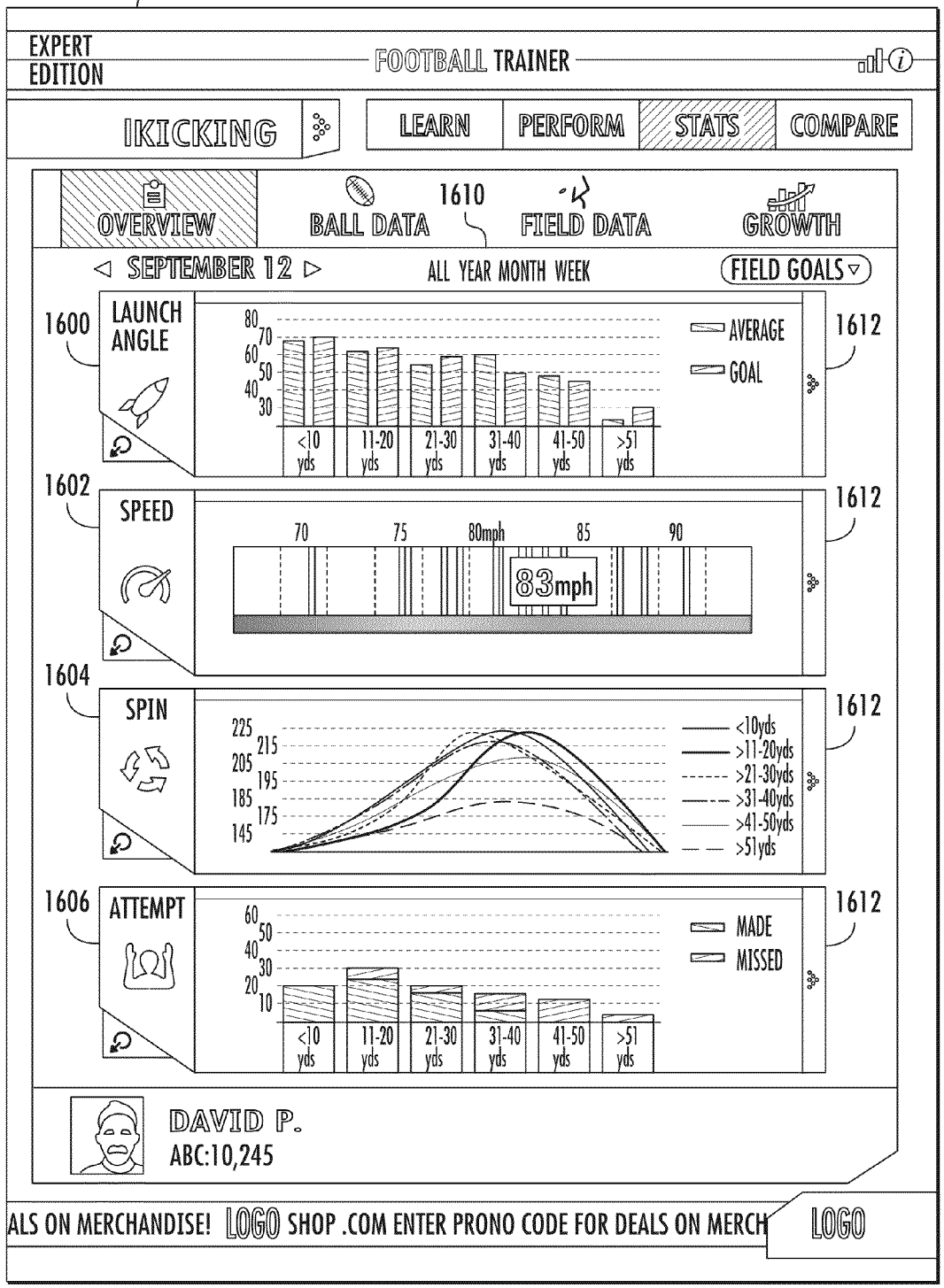

FIGS. 25-37 illustrate example screenshots presented by processor 26 on display 22 in response to a user selecting the kick category under the stats option (See FIG. 22). As shown by FIG. 25, processor 26 presents on display 22 launch angle data 1600, ball speed data 1602, ball spin data 1604 and field-goal attempt or accuracy data 1606. Such statistics are further broken down according to the different distances of the field-goal kick attempts. As shown by FIG. 25, a user may select one of various time ranges 1610 for data from which such statistics are derived. In the example illustrated, processor 26 allows the user to look at historical data for various years, months, weeks or days. Although the current selection for the time period is illustrated as being indicated by hatching, the current selection may be indicated in other manners such as color change, brightness and the like. As further shown by FIG. 25, graphical user interface icons 1612 are presented for allowing a person to obtain additional details regarding launch angle, speed, spin and field-goal accuracy.

Figure 26:
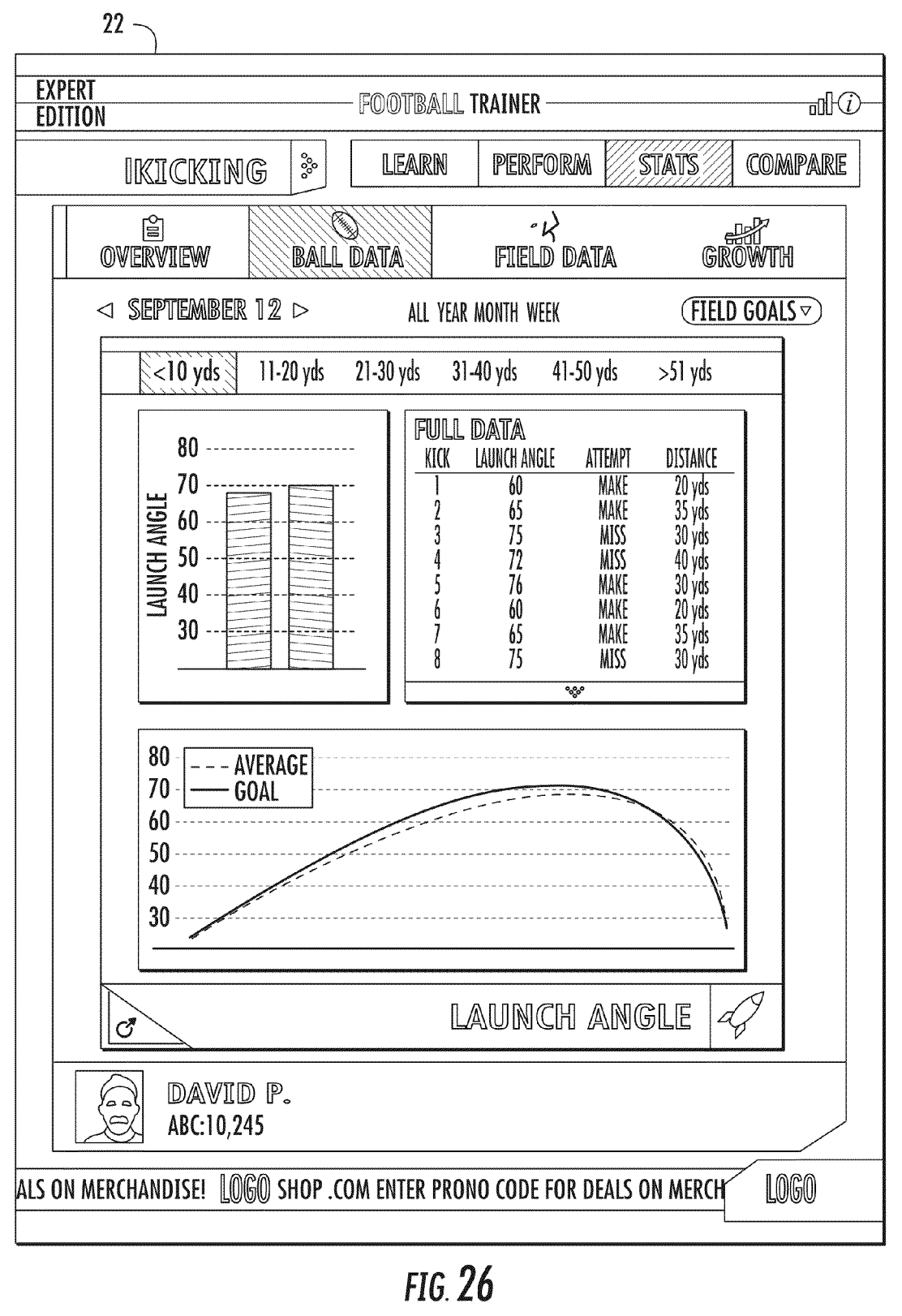
Figure 27:
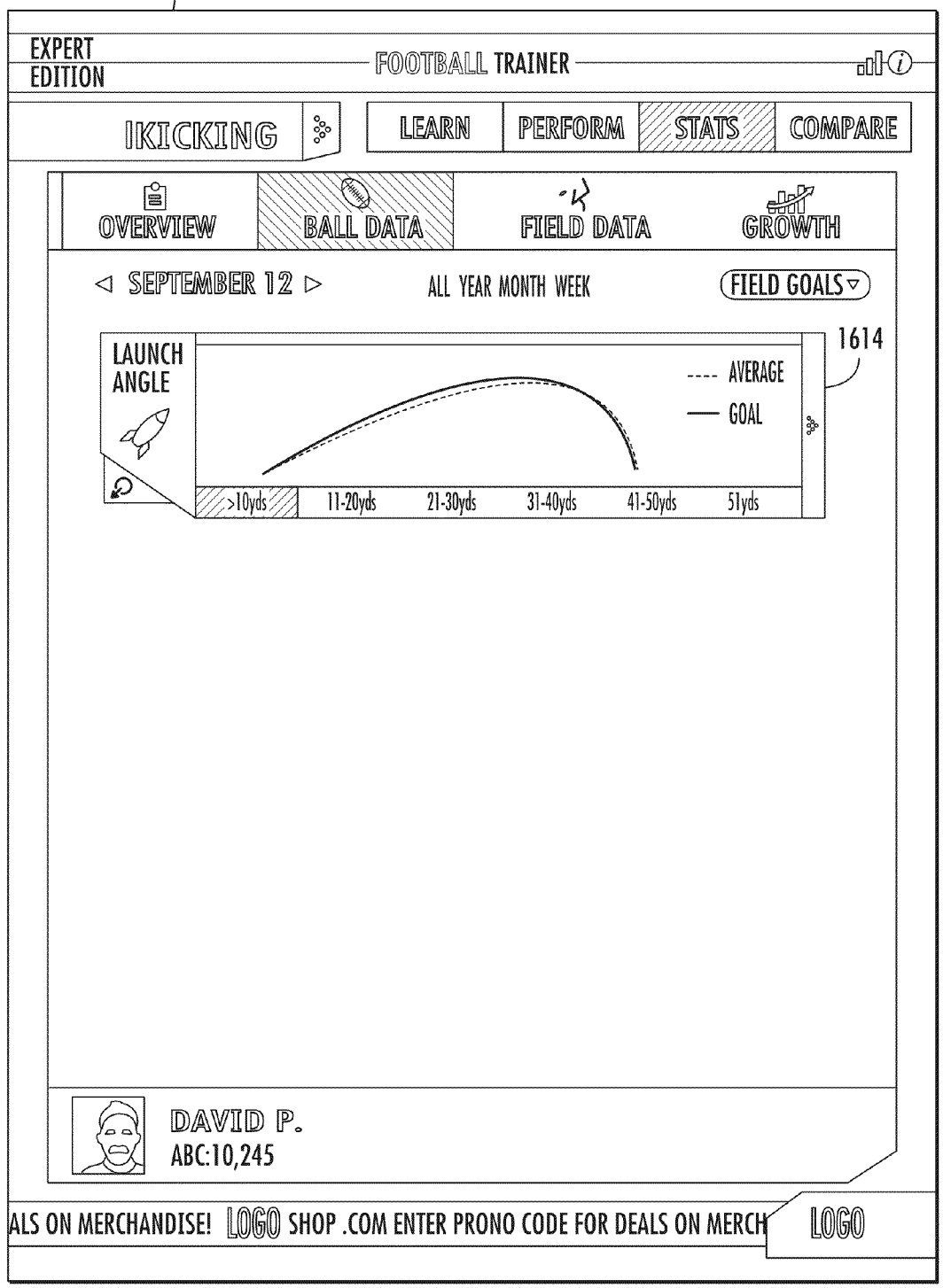
Figure 28:
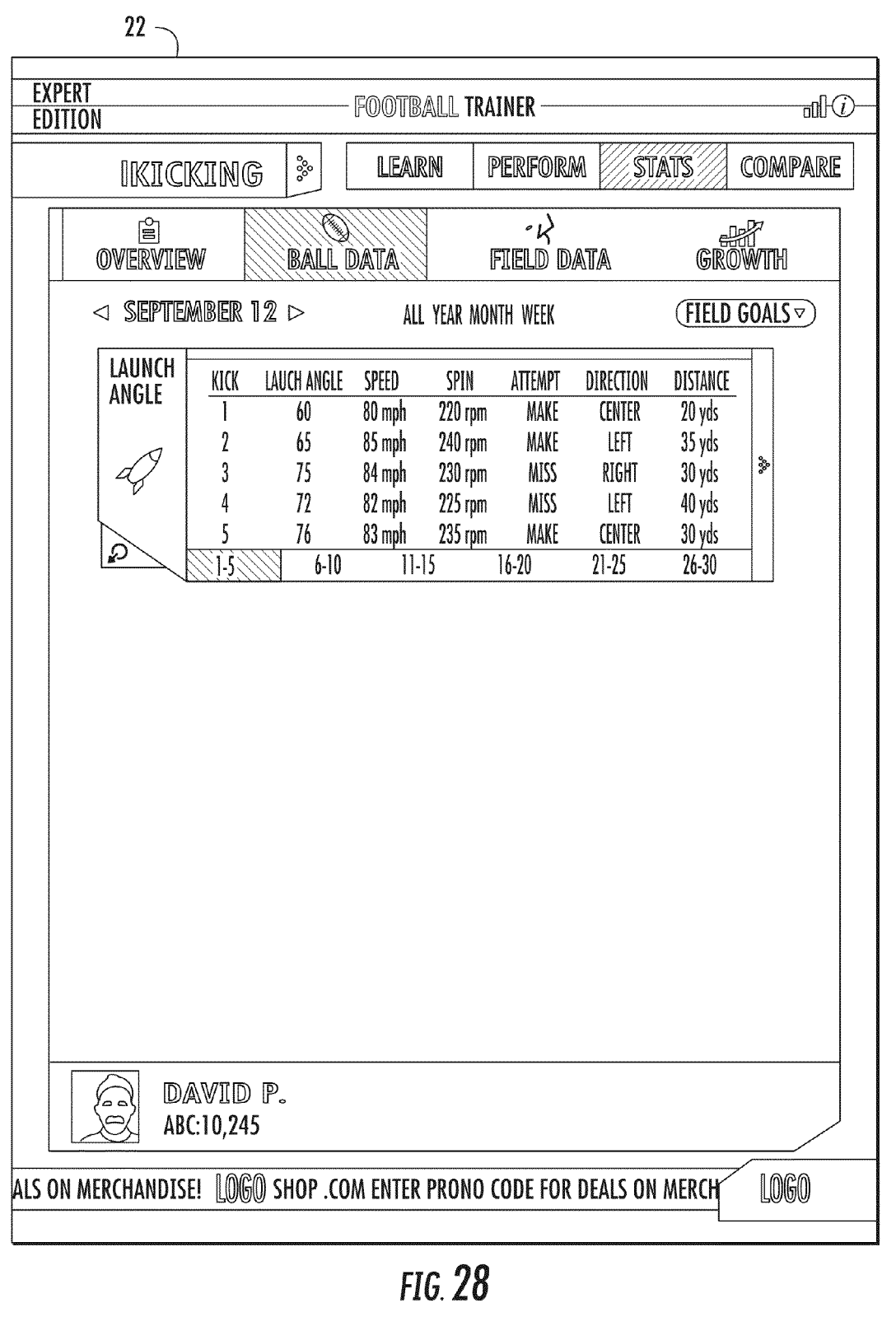
Figure 29:
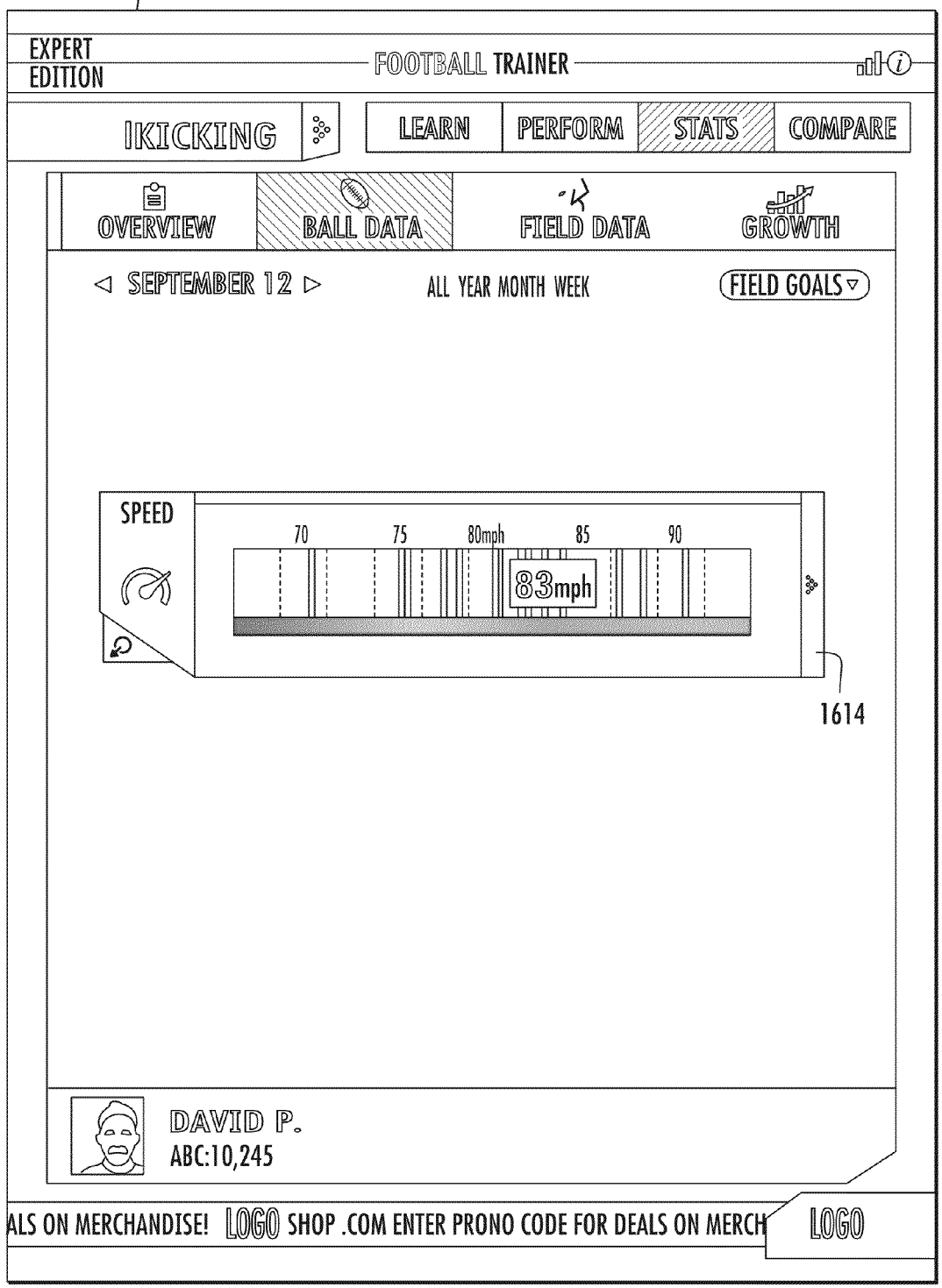
Figure 30:
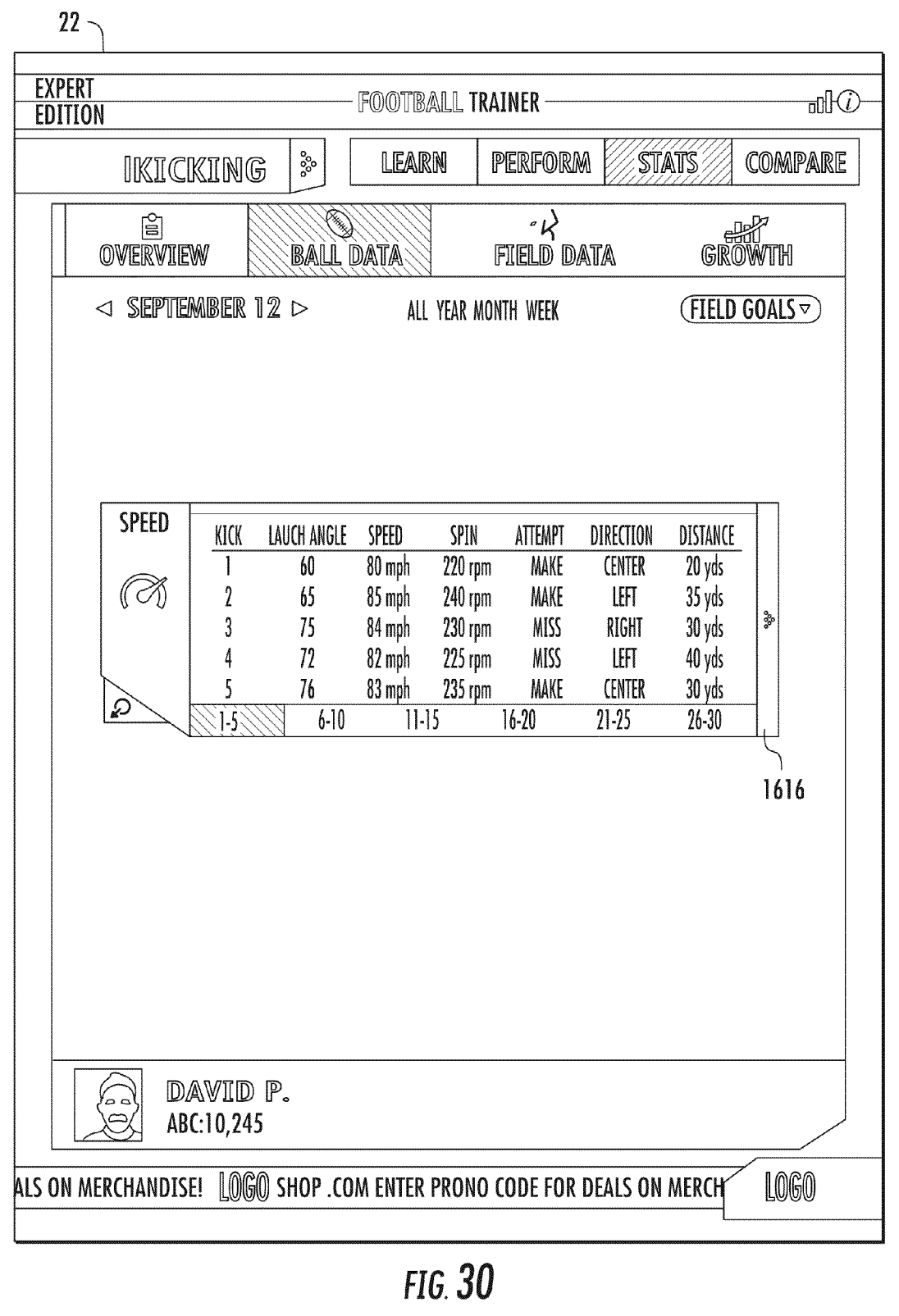

FIG. 26 illustrate an example screenshot presented by processor 26 on display 22 in response to the user selecting detail icon 1612 (shown in FIG. 25) for launch angle data 1600. As shown by FIG. 26, in response to selection of interface icon 612 associated with launch angle data 1600 (shown in FIG. 25), processor 26 presents on display 22 data regarding launch angle of the kick attempts and compares such data with objective or goal launch angles. In the example illustrated, in response to receiving signals indicating that the screen of FIG. 26 has been clicked upon, processor 26 advances through a series or progression of different presentations regarding information about launch angle data. FIGS. 26 and 27 illustrate an example presentation of data by processor 26 which allows a person to choose amongst several different yardages for field-goal kicks so as to visibly ascertain the average launch angle and trajectory for kicks at the chosen distance and compare such launch angles/trajectories with respect to goal launch angles/trajectories for the particular distance. In response to receiving signals that advancement graphical user interface 1614 has been selected, processor 26 presents more detailed information on the screen shown in FIG. 28. The screenshot shown in FIG. 28 depicts other information associated with the particular kicks at the different launch angles. In other implementations, the information provided in the screenshots shown in FIGS. 27 and 28 may be presented on a single screenshot or may be accessed in other manners. FIGS. 29 and 30 illustrate screenshots presented by processor 26 on display 22 in response to the graphical user interface 1612 of ball speed data 1602 (shown in FIG. 25) being selected or clicked upon. FIG. 29 illustrates a graph of an average speed for field-goal kicks sensed doing the selected period of time. In response to receiving signals indicating that advancement icon 1614 has been selected, processor 26 advances to present the screenshot shown in FIG. 30 provides additional information associated with each kick from which the average speed was derived. Selection of advancement icon 1616 of the screenshot shown FIG. 30 cause processor 26 to return display 22 to the overview screenshot shown FIG. 25.

Figure 31:
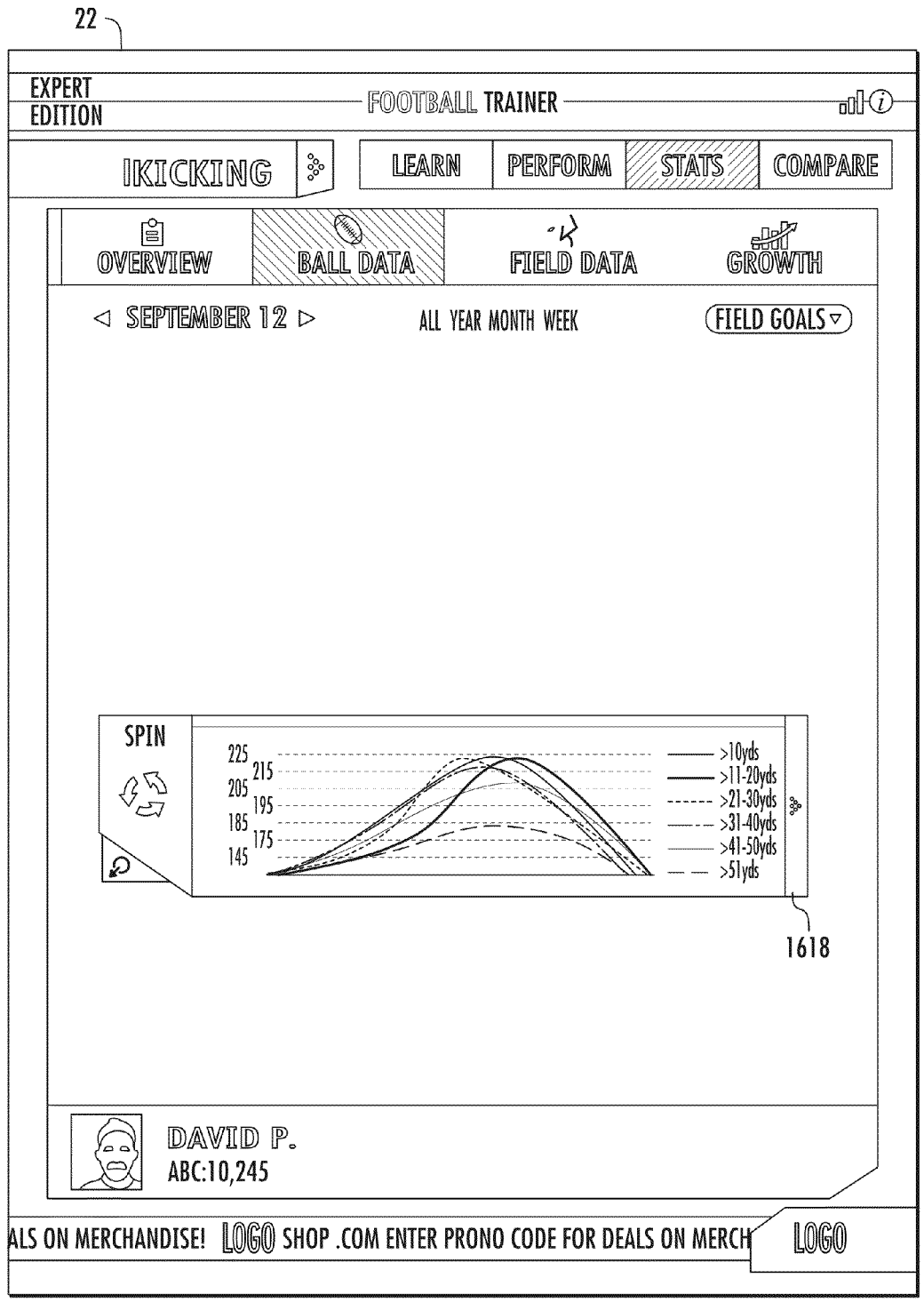
Figure 32:

FIGS. 31 and 32 illustrate screenshots presented by processor 26 on display 22 in response to the graphical user interface 1612 of spin data 1604 (shown in FIG. 25) being selected or clicked upon. FIG. 30 illustrates a graph of an average spin for field-goal kicks at different distances sensed doing the selected period of time. The spin can be about a non-longitudinal axis of the football. In response to receiving signals indicating that advancement icon 1618 has been selected, processor 26 advances to present the screenshot shown in FIG. 32 provides additional information associated with each kick from which the average speed was derived. Selection of advancement icon 1620 of the screenshot shown FIG. 32 causes processor 26 to return display 22 to the overview screenshot shown FIG. 25.

Figure 33:
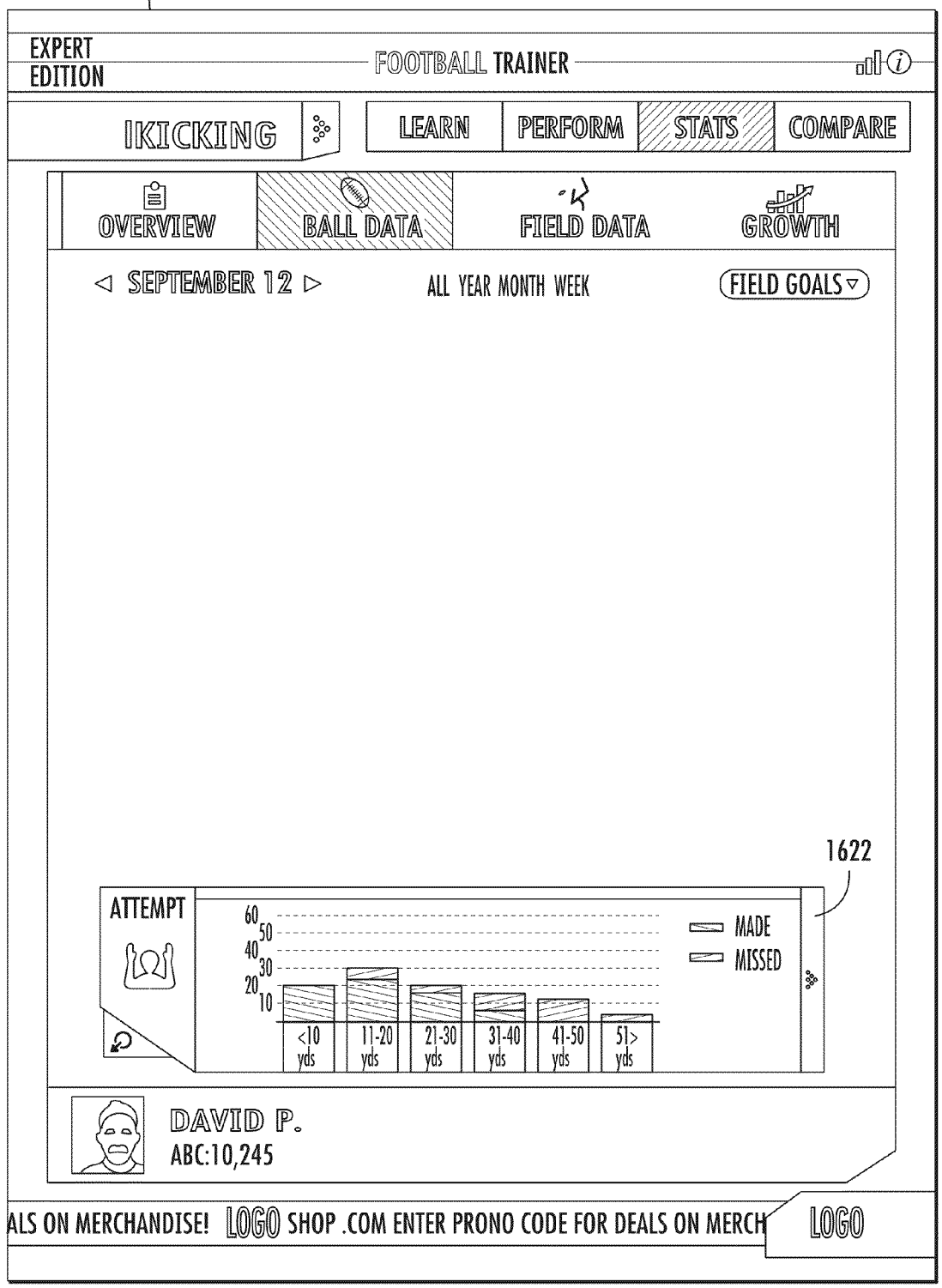
Figure 34:
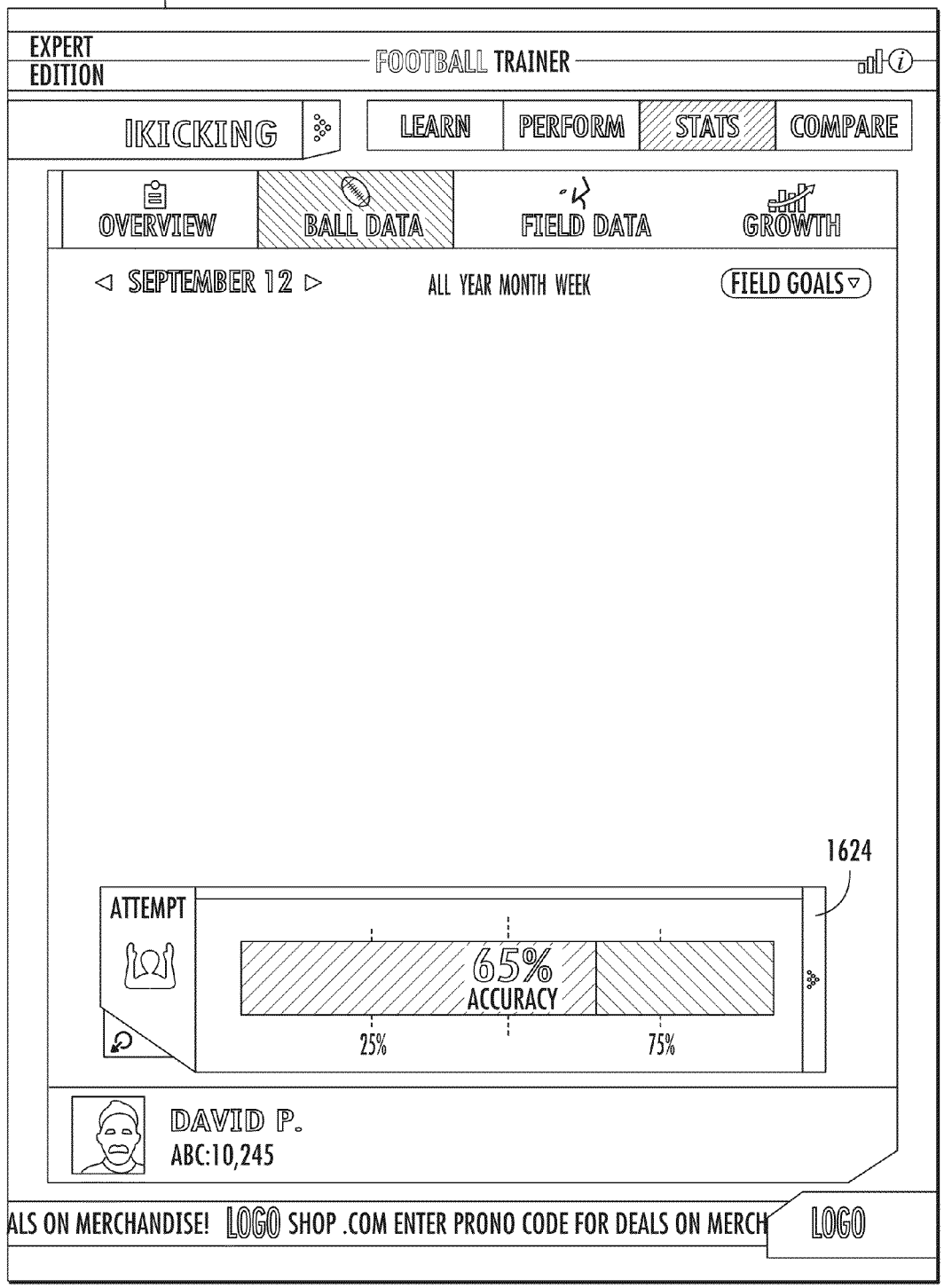

FIGS. 33-35 illustrate screenshots presented by processor 26 on display 22 in response to the graphical user interface 1612 of attempt data 1606 (shown in FIG. 25) being selected or clicked upon. FIG. 33 illustrates an enlarged view of the data shown in FIG. 25. In response to receiving signals indicating that advancement icon 1622 has been selected, processor 26 advances to present the screenshot shown in FIG. 34 FIG. 34 illustrates a graph of an average kick accuracy for all of the field-goal kicks at different distances sensed doing the selected period of time. In response to receiving signals indicating that advancement icon 1624 has been selected, processor 26 advances to present the screenshot shown in FIG. 35 providing additional information associated with each kick from which the average field-goal accuracy was derived. Selection of advancement icon 1626 of the screenshot shown FIG. 35 causes processor 26 to return display 22 to the overview screenshot shown FIG. 25.

Figure 36:
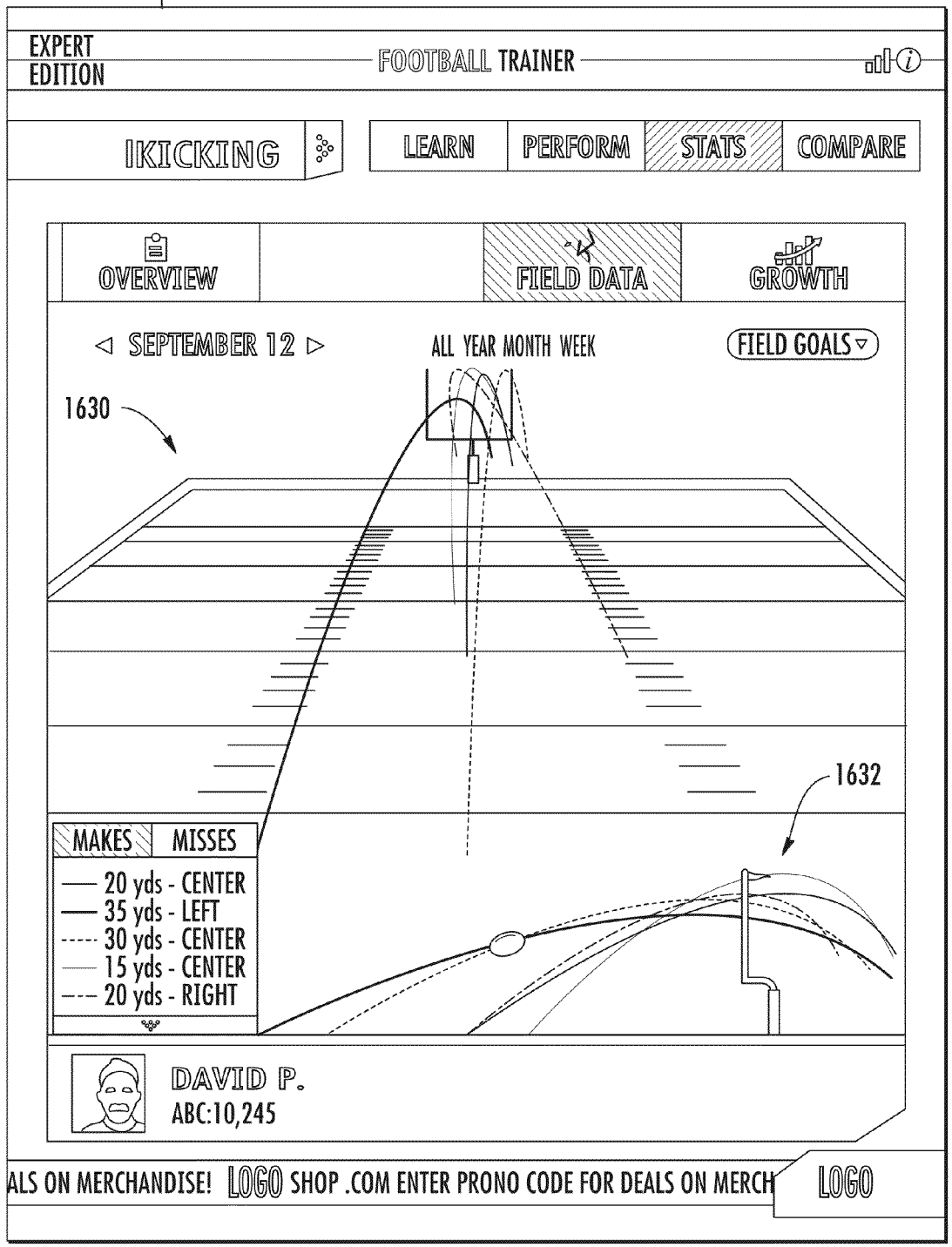
FIG. 36 illustrates an example screenshot of an example implementation of the sport performance system of FIG. 5 in which the perform tab option of kick selected including graphics depicting the trajectories of footballs during a plurality of field-goal kick attempts and data relating the field goal attempts.

FIG. 36 illustrates an example screenshot generating on display 22 by processor 26 in response to a user selecting the "field data" icon on the screenshot shown in FIG. 25. In the screenshot shown FIG. 36, processor 26 presents graphical animations or graphic depictions of each of the field-goal attempts for the selected period of time, using graphical indicators (line font, color, brightness, line characteristic and the like) to distinguish between made and missed field goals. Made and missed field goals are further indicated by the depicted trajectory of the ball with respect to the depicted goalpost. In the example illustrated, processor 26 graphically depicts both a front view 1630 and a side view 1632 of the trajectories of the field-goal attempts. As a result, the user can visibly ascertain the height relative to the low point of the crossbar as well as determine the trajectory with respect to the vertical end posts of the goalpost.

Figure 37:
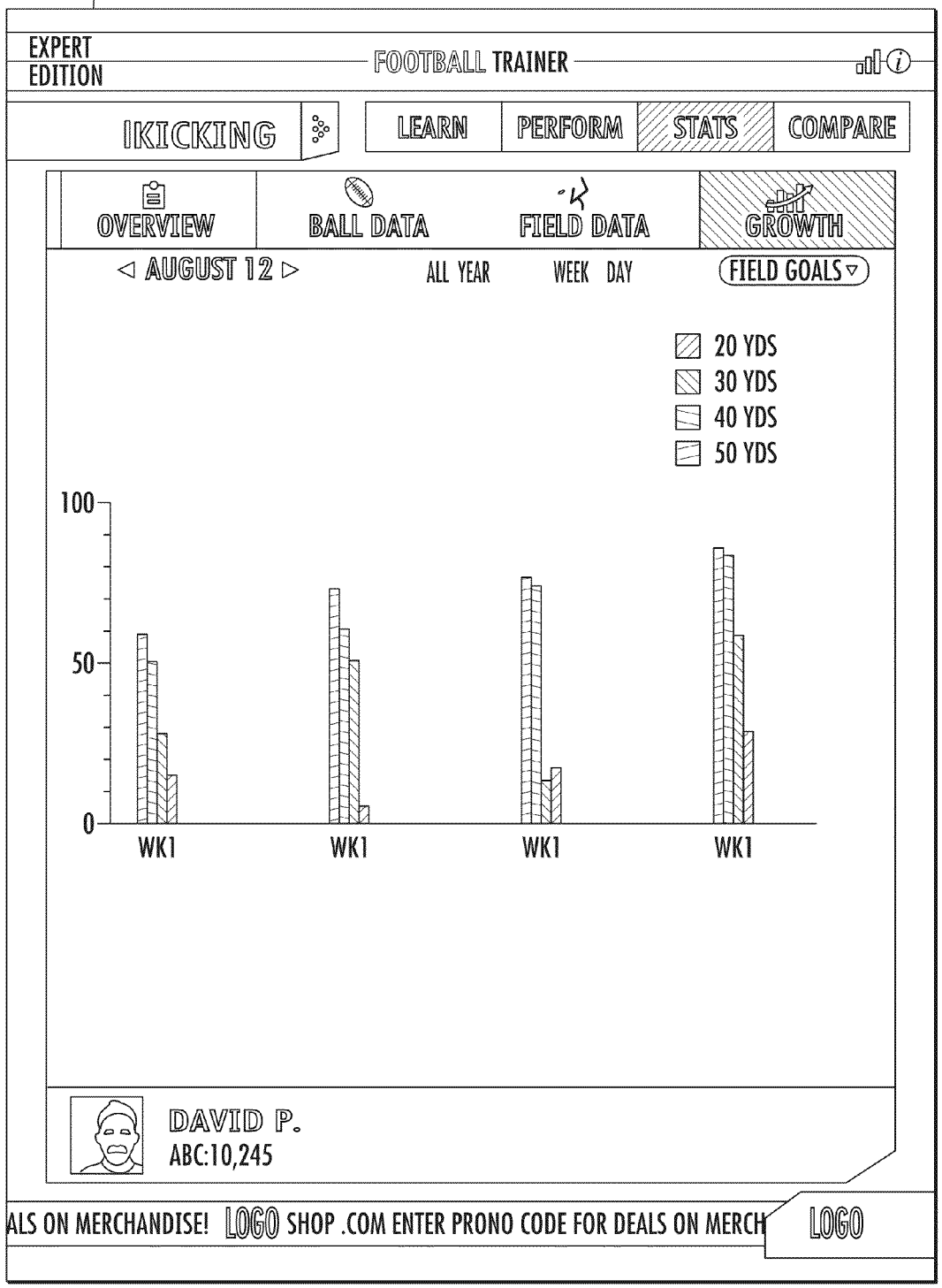
FIG. 37 illustrates an example screenshot of an example implementation of the sport performance system of FIG. 5 in which the perform tab option of kick is selected including a statistical output of a person's field goal kicking results over time.

FIG. 37 illustrates an example screenshot generating on display 22 by processor 26 in response to a user selecting the "growth" icon on the screenshot shown in FIG. 25. In the screenshot shown FIG. 37, processor 26 provides a graph or other statistical output of a person's results over time to visibly indicate growth or skill development or the selected time period. In the example illustrated, processor 26 depicts growth over the previous one-month period. In the example illustrated, processor 26 depicts average field-goal accuracy for particular weeks at different field-goal distances. By inputting different settings, user assess accuracy growth for other time periods left in other than week to week) such as day-to-day, month-to-month, year-to-year and the like. In other implementations, such growth or development maybe visibly depicted by processor 26 in other manners.

Figure 38:
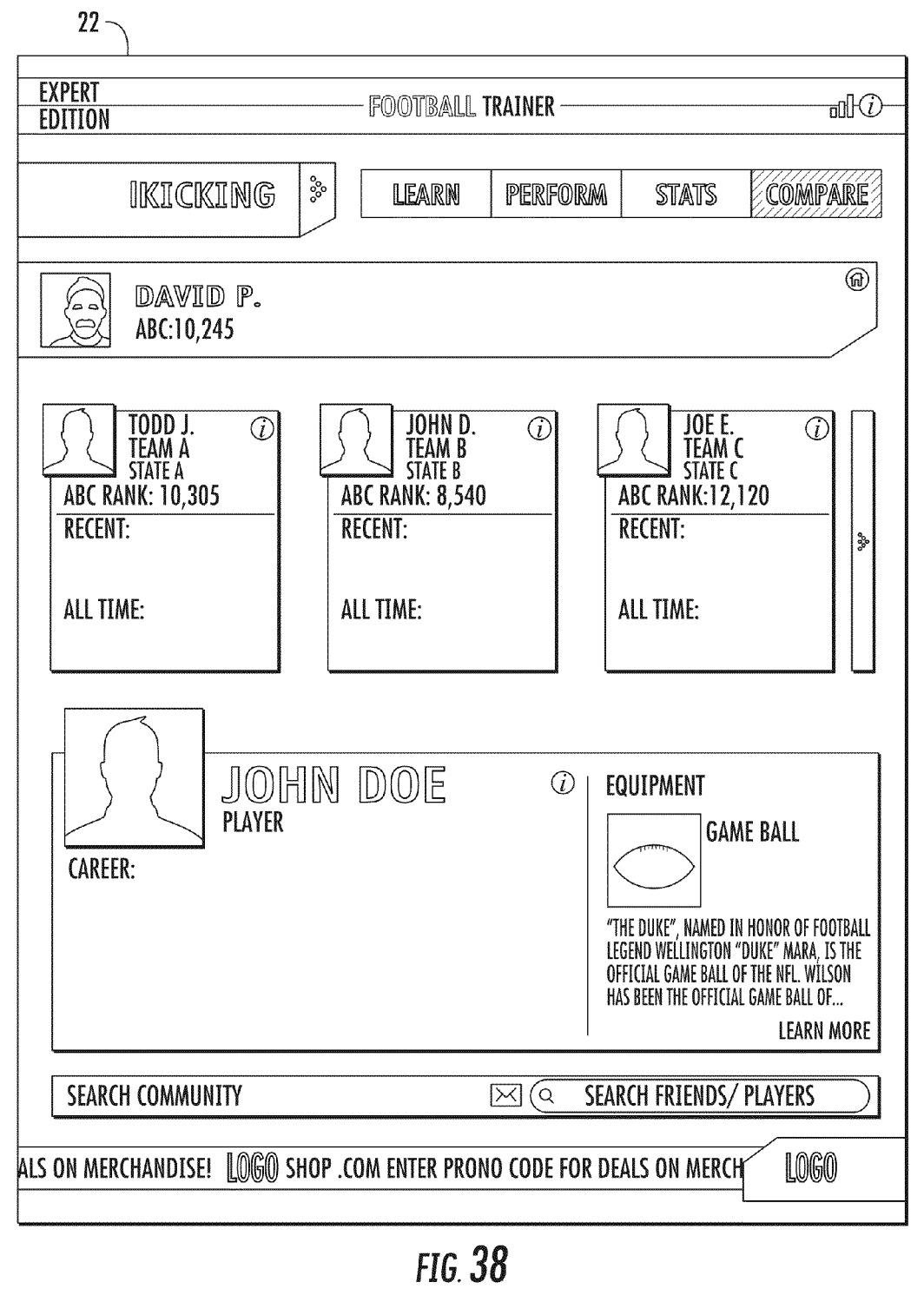

FIG. 38 illustrates a screenshot presented on display 22 by processor 26 in response to the user selecting the compare option. In the example shown in FIG. 38, the user is presented with ranking information and all-time high scores for a particular kick accuracy (or for other ball travel parameters) with respect to other users. Such users may be a select group of friends or those in a league. In one implementation, such accuracy or ball travel parameter values may also be compared to accuracies or ball travel parameters of celebrities. As a result, system 420 may facilitate remote competitions. In one implementation causes 420 may be used in PUNT, PASS AND KICK competitions to track results.

Figure 39:
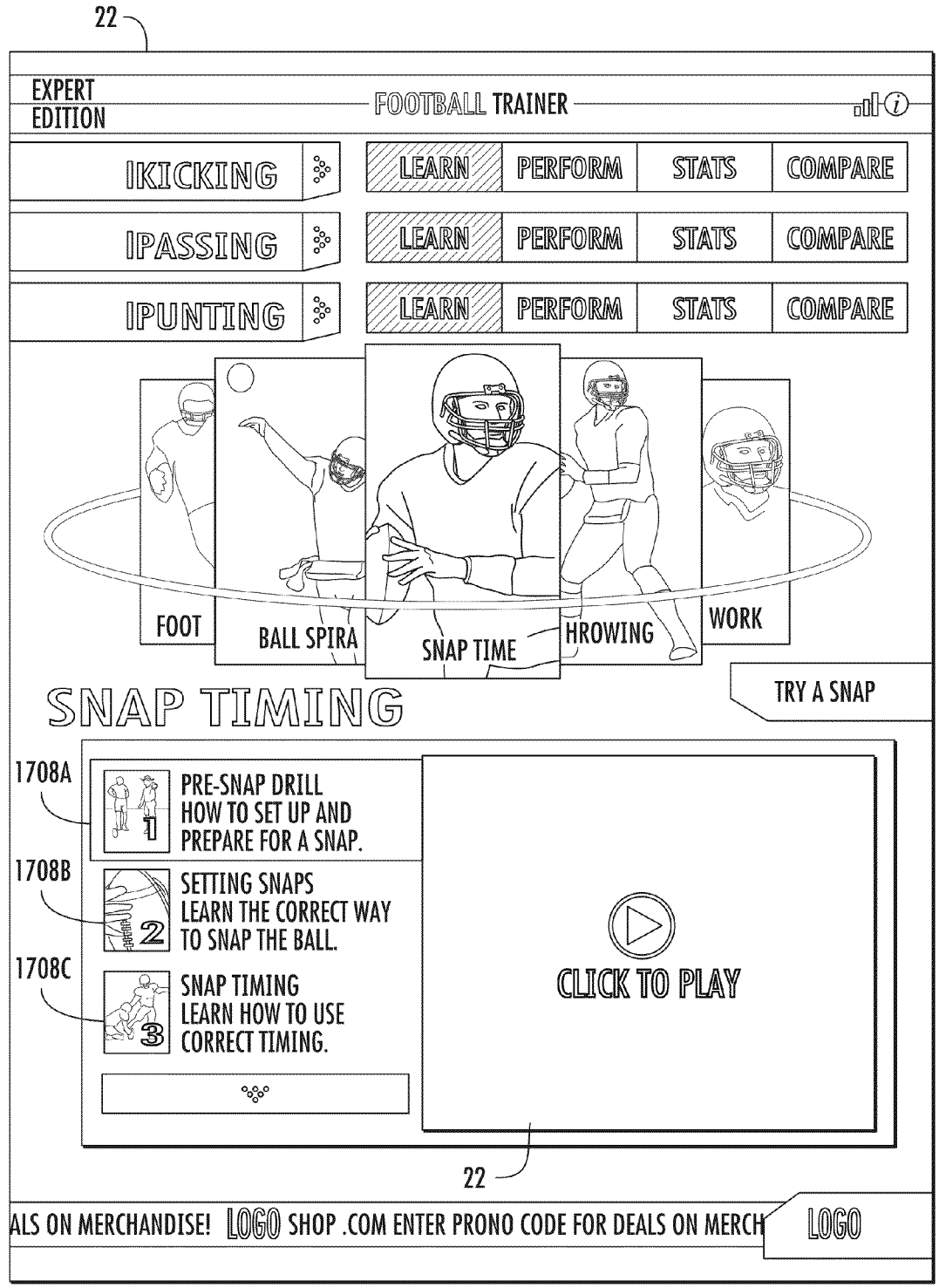
FIG. 39 illustrates an example screenshot of an example implementation of the sport performance system of FIG. 5 in which the learn tab option of pass is selected.

FIG. 39 illustrates a screenshot presented on display 22 by processor 26 in response to a user selecting the pass category under the learn option (shown in FIG. 19). In the example illustrated, the user is provided with the options of selecting various instructional videos pertaining to passing. In the example illustrated, snap timing is the presented subcategory of passing. Other subcategories include ball spiral and throwing motion. In response to such selections, instructional videos 1708A, 1708B, 1708C are presented on display 22. As shown by FIG. 39, after instructional videos for each of the individual steps or portions of a pass are presented, the user may select presentation of all of the steps or portions of the pass for review.

Figure 40:
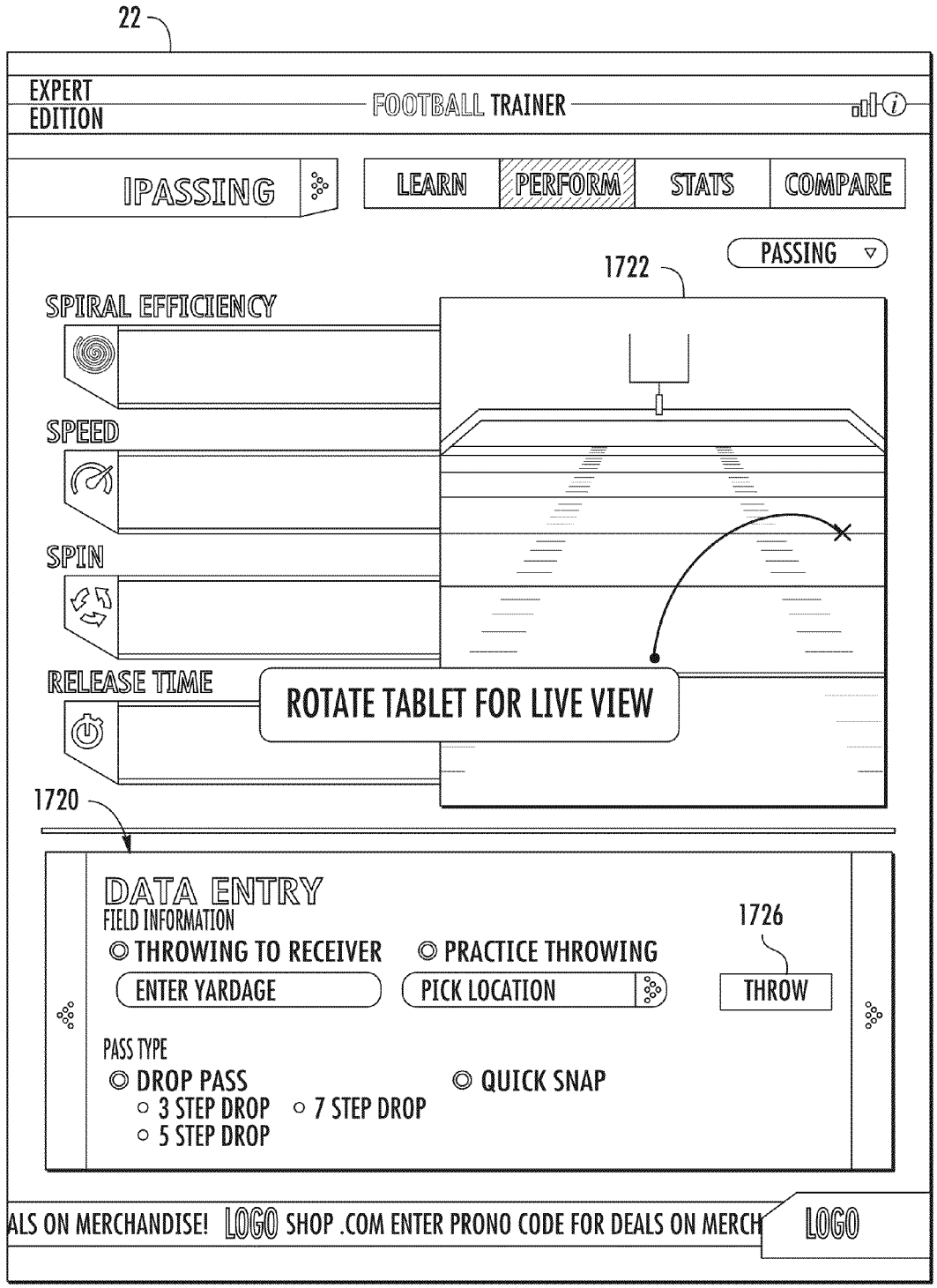
FIG. 40 illustrates an example screenshot of an example implementation of the sport performance system of FIG. 5 in which the perform tab option of pass is selected including a graphic depicting the trajectory of a football during a pass.

FIGS. 40-43 illustrate screenshots presented on display 22 by processor 26 in response to the user selecting the pass category under the perform option (shown in FIG. 19). As shown by FIG. 40, processor 26 presents on display 22 the various ball travel parameters for which data will be collected during the performing of the throw sample. In the example illustrated, the data collected comprises spiral efficiency, speed, spin and release time. In data entry window 1720, processor 26 further prompts the user to enter data regarding the conditions of the pass or throw. In the example, processor 26 prompts the user, on display 22, to enter whether the throw is to a receiver or simply a practice throw. Processor 26 may also prompt a user to input whether throw is following a three step drop, a five-step drop or a seven step drop or whether the throw was part of a quick snap (such as a shot-gun snap). In some implementations, processor 26 further prompts a user to provide environmental data such as wind direction. As noted above, in some implementations, such environmental conditions may be sensed or may be retrieved from remote sources.

In the example illustrated, processor 26 further prompts a user to enter a target yardage in a target location for the upcoming throw. In one implementation, the input target yardage and target location visibly presented on display window 1722 which depicts a trajectory 1724 of a football utilizing the entered target yardage and target location. As noted above, in other implementations, the target location for practice throw may be automatically selected by module 460. Moreover, the manner in which the target is depicted may occur in other fashions, such as shown in FIGS. 16 and 17. Once such information has been entered, the user may select the "throw" button 1726 to initiate the throwing sample.

Figure 41:
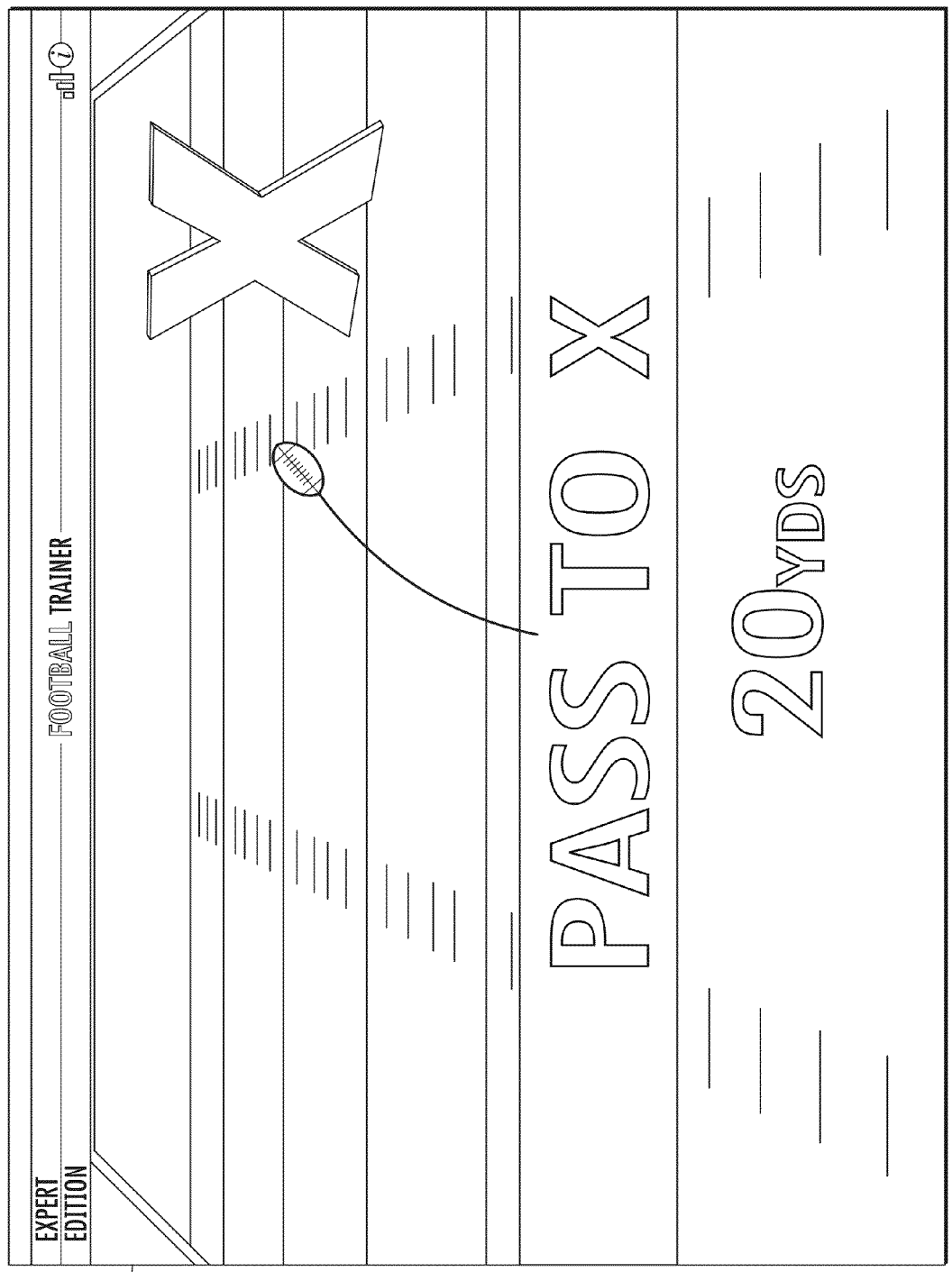
FIG. 41 illustrates an example screenshot of an example implementation of the sport performance system of FIG. 5 in which the perform tab option of pass is selected including a graphic of a simulated football traveling towards a target.
Figure 42:
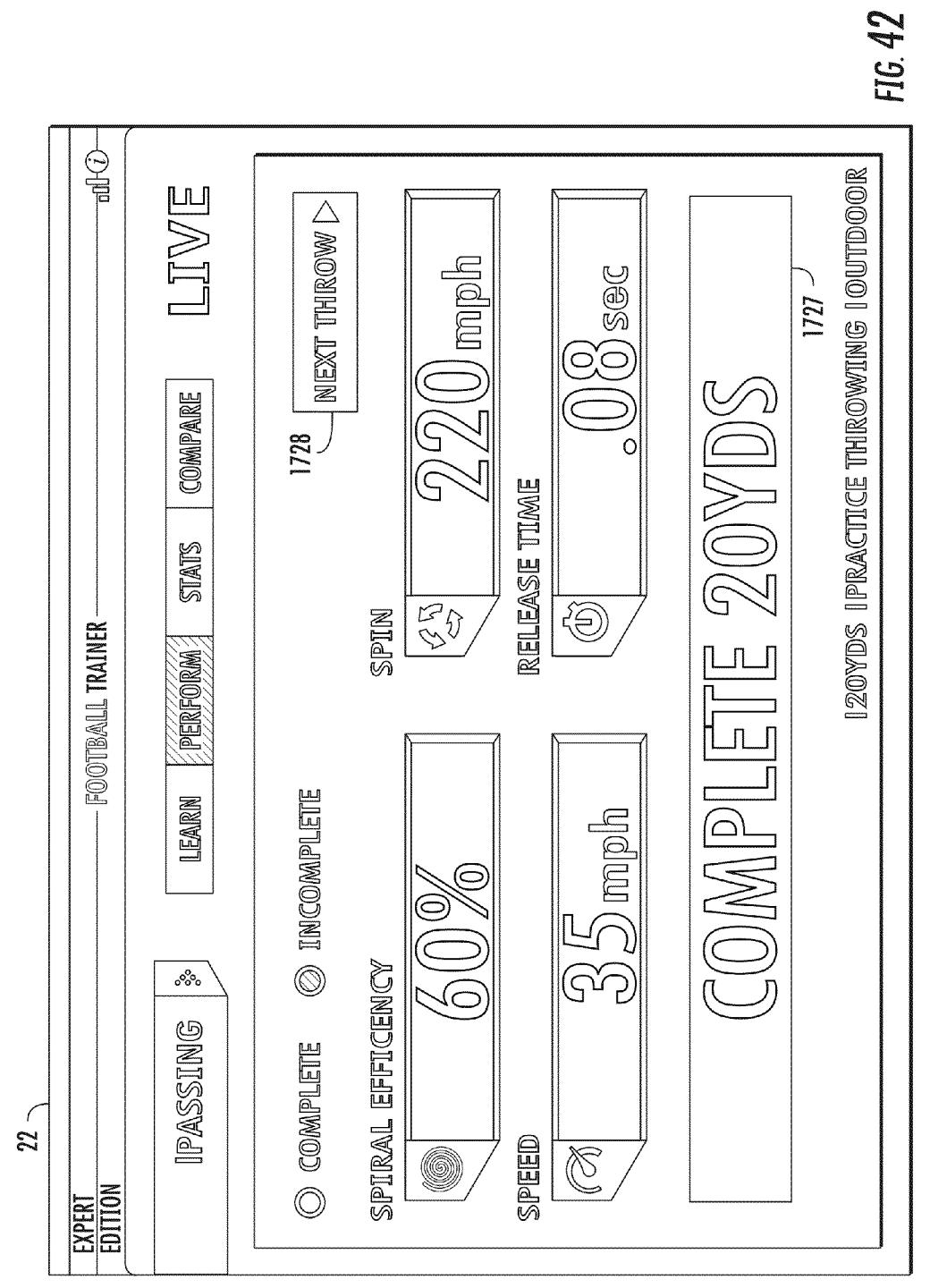

As indicated by FIGS. 41-42, in one implementation, processor 28 may present one or more ball travel parameters in real time or live while the ball is traveling. For example, the trajectory of the ball may be drawn in real time upon display 22 as a ball is moving through its trajectory. FIG. 41 illustrates an example real-time or live view on display 22. FIG. 41 illustrates the target location "X" and further illustrates a graphic of the simulated ball as it is traveling in real time towards the target. In the example illustrated, the real-time view is triggered by rotation of the display 22, wherein the gyroscope sensor such rotation and switches to a live view of the traveling football. In one implementation, the travel of the ball may be recorded and subsequently presented to the person who threw the football.

In response to receiving the "throw" selection, processor 26 notifies the user that system 420 is ready for the sample throw. Such notification may occur after synchronization between input 24 and transmitter 254 of ball 450. During the sample kick, sensor 252 gathers data are values for various ball travel parameters and transmits them to input 24 using transmitter 254. As noted above, the provision of data to input 24 may occur in other fashions in other implementations.

In one implementation, processor 26 displays a count for each of the steps of the drop pass. The displayed count may assist the user in timing the steps and in releasing the ball. In one implementation, processor 26 may utilize signals from ball 450 to determine when the ball is snapped (based upon accelerated movement of ball 450 from an at rest state) and may cause electronic device to emit an alert or sound at a predetermined lapse of time following the determined snap. In other implementations, processor 26 may communicate with other sound emitting devices, such as remote sound emitting devices, and direct such other sound emitting devices to produce the audible alert following the predetermined lapse of time after the determine snap of the football. The alert triggered by processor 26 based upon the determined snap of football 450 may be utilized to indicate when a quarterback should pass or release the ball following a snap or may be used to indicate when a rush of the quarterback may begin such as in various flag or touch football leagues. In other implementations, the audible alert or light emission can be triggered from an initiating event, such as a snap, and then repeated at a fixed interval or frequency (e.g., once per second). The alert can then terminate upon indication of the release or passing of the football.

Figure 43:
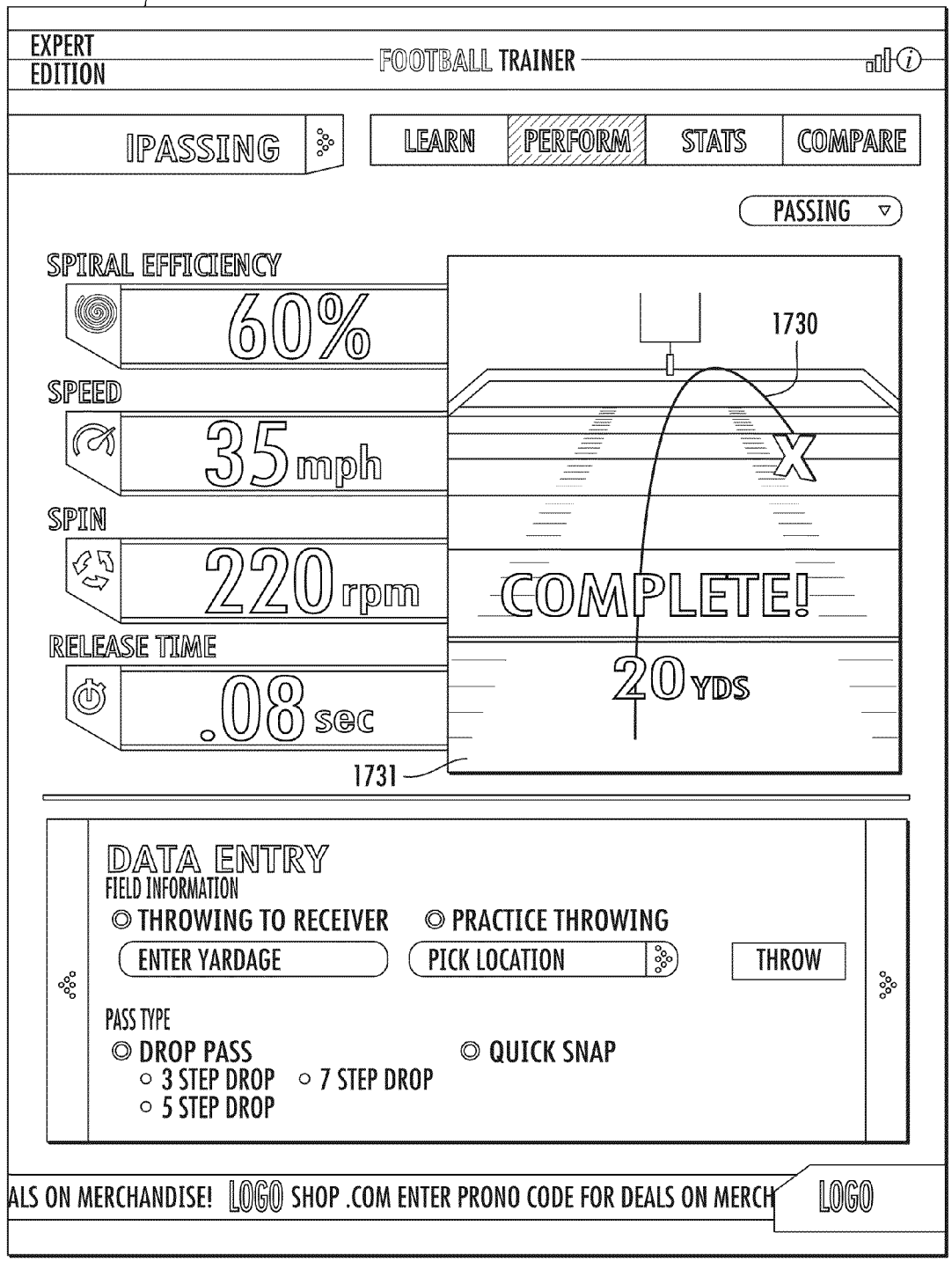
FIG. 43 illustrates an example screenshot of an example implementation of the sport performance system of FIG. 5 in which the perform tab option of pass is selected including a graphic depicting the trajectory of a football during a pass toward a target on a football field and data relating the pass.

As shown by FIGS. 42-43, upon completion of the throw, processor 26 displays the ball travel parameters. As shown by FIG. 42, processor 26 displays the various ball travel parameters. In the example illustrated, processor 26, following instructions for module 460, displays spiral efficiency, speed, spin and release time. In the example illustrated, pass release time or quarterback release time refers to the elapsed time when the person throwing the ball begins to draw the ball upward and/or rearward during cocking of the arm to the time of the ball is actually separated or released from the hand of the person throwing the ball. As shown by FIG. 43, processor 26 further presents a graphic 1730 depicting the trajectory of the football during the throw towards the target "X". In the example illustrated, module 460 directs processor 26 to determine and accuracy of the throw completed and indicates whether the practice throw was "complete" in display window 1727 in FIG. 42 and/or in window 1731 of the screenshot displayed in FIG. 43. As further indicated by FIG. 42, should the person choose to immediately throw another pass, he or she may select (click on) the next throw button 1728.

Figure 44:
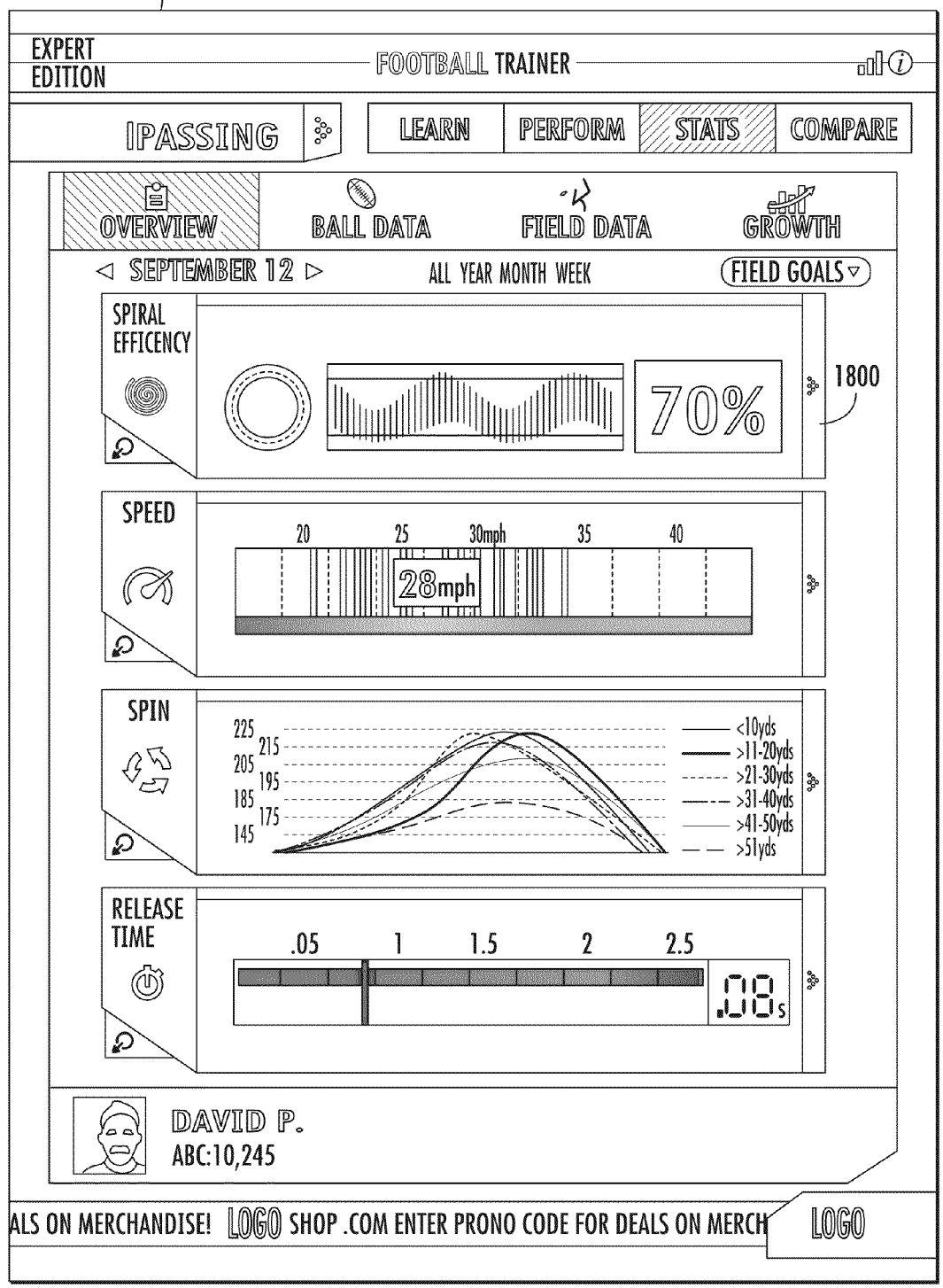
FIG. 44 illustrates an example screenshot of an example implementation of the sport performance system of FIG. 5 in which the perform tab option of pass is selected including graphics illustrating data relating to the pass.

FIG. 44 illustrates an example screenshot presented by processor 26 on display 22 in response to a user selecting the pass category under the stats option (See FIG. 20). As shown by FIG. 44, processor 26 presents on display 22 data regarding spiral efficiency, speed, spin and quarterback release time for one or more throws for various distances. Spiral efficiency can be used to measure the effectiveness of a thrown American-style football. The spiral motion allows for the football to be thrown farther, at greater speeds and with greater accuracy than a non-spiral motion. American-style footballs have a prolate spheroidal shape in which the polar axis or major axis of the football is greater than its equatorial diameter or minor axis. When an American football is thrown in a "spiral", the football rotates about the major axis or polar axis of the football as it travels through the air. However, thrown footballs do not achieve perfect spiral motion because a slight torque is typically applied to the ball in the direction of handedness of the thrower. A right handed player will generally pull with his or her fingers on the right of the ball resulting in a yaw or lateral movement. The yaw generally results in the football moving slightly left upon release and then right for a right-handed player and slightly right upon release and then left for a left handed player. Additionally, aerodynamic drag forces are not perfectly symmetrical and create a torque onto the football, which can cause a gyroscopic or wobble to the thrown football. Almost all thrown or punted footballs include some degree of "wobble" as measured by the rotation of the center front end of the football away from or about the trajectory of the thrown or punted football. The term spiral efficiency is a measure of the degree in which the longitudinal axis of the football remains in line with the trajectory of the football as the football travels through the air and rotates about its longitudinal axis. A football thrown with a perfect spiral would have a 100% spiral efficiency, in which the center front end of the football does not deviate from the trajectory of the football as it travels through the air. Accordingly, the spiral efficiency is a measure of how "tight" the longitudinal axis and center front end of the football remains to the trajectory of the football as it travels through the air.

Figures 45, 46:
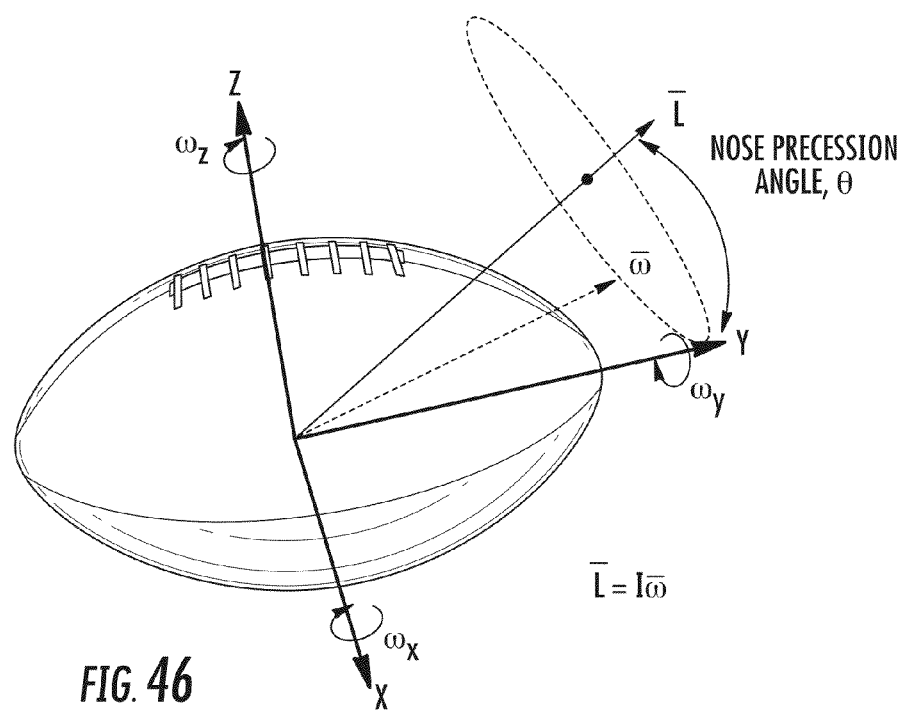
FIG. 45 illustrates data resulting from 10 example throws of a football.
FIG. 46 is a diagram of an example football illustrating example vectors and axes representing rotational and linear forces acting upon the football.
Figure 47:
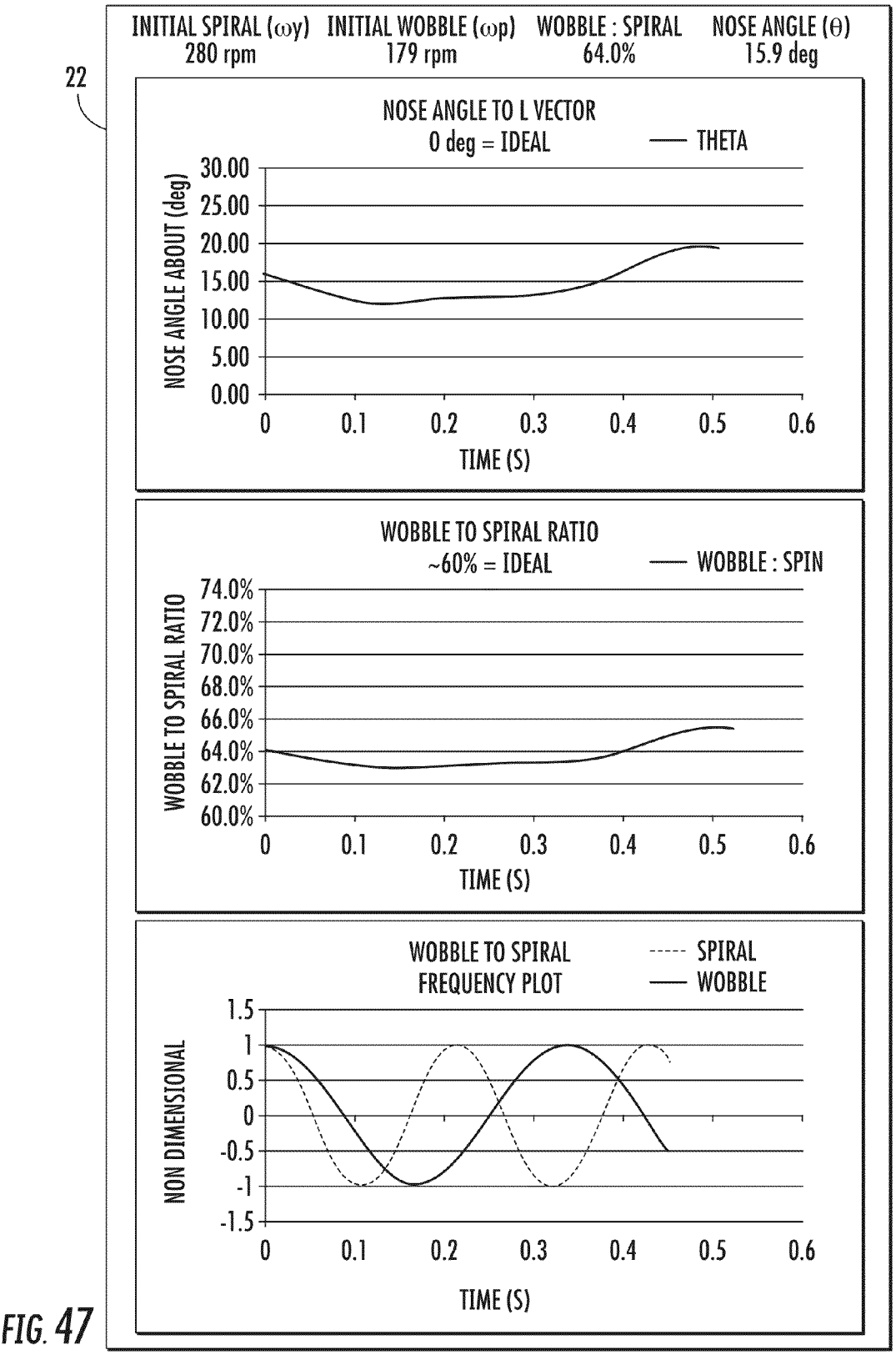
FIGS. 47-50 are diagrams of example screenshots presented by the system of FIG. 5 illustrating graphical data relating to thrown footballs.
Figure 48:
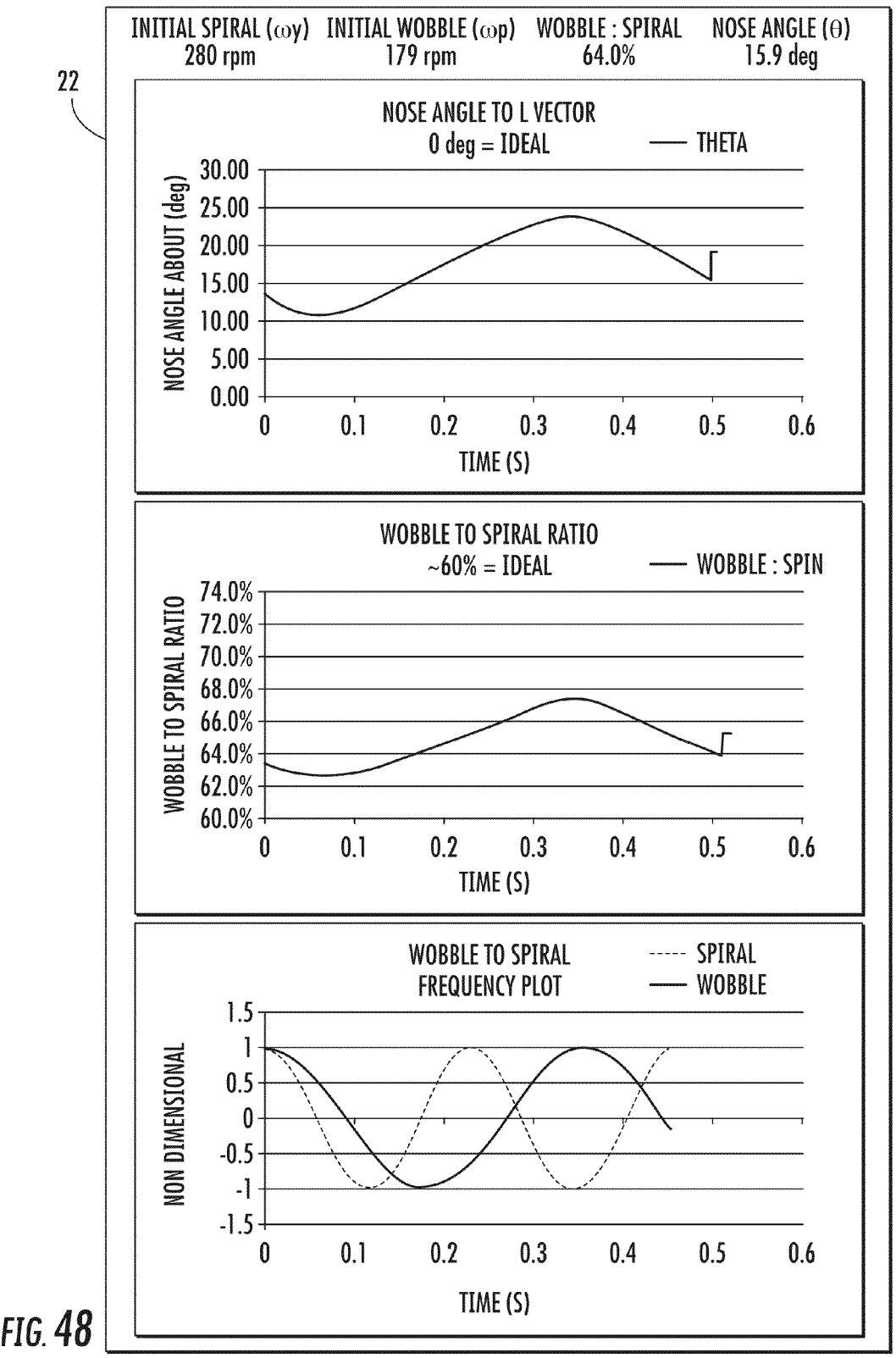
Figure 49:
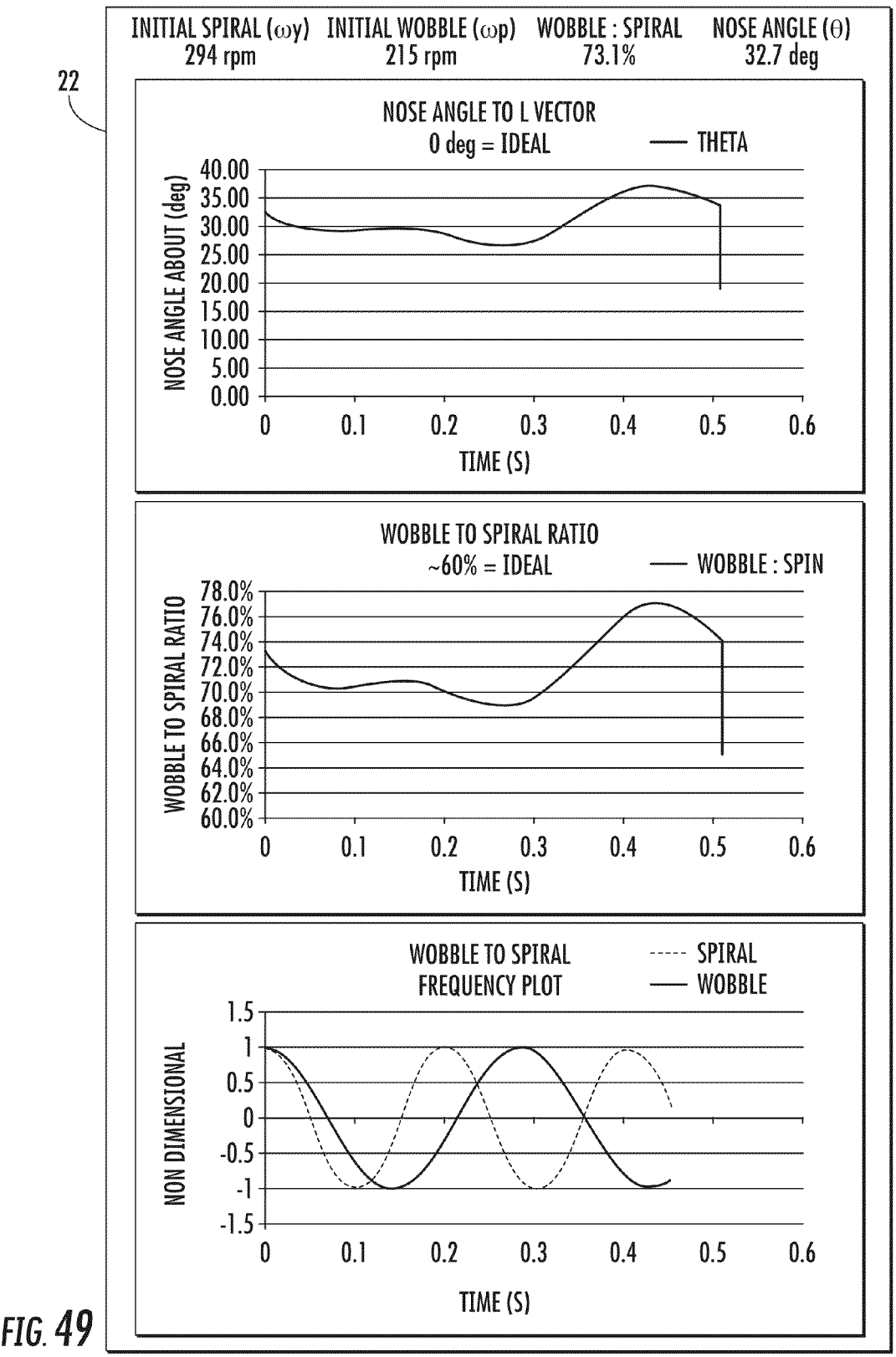
Figure 50:
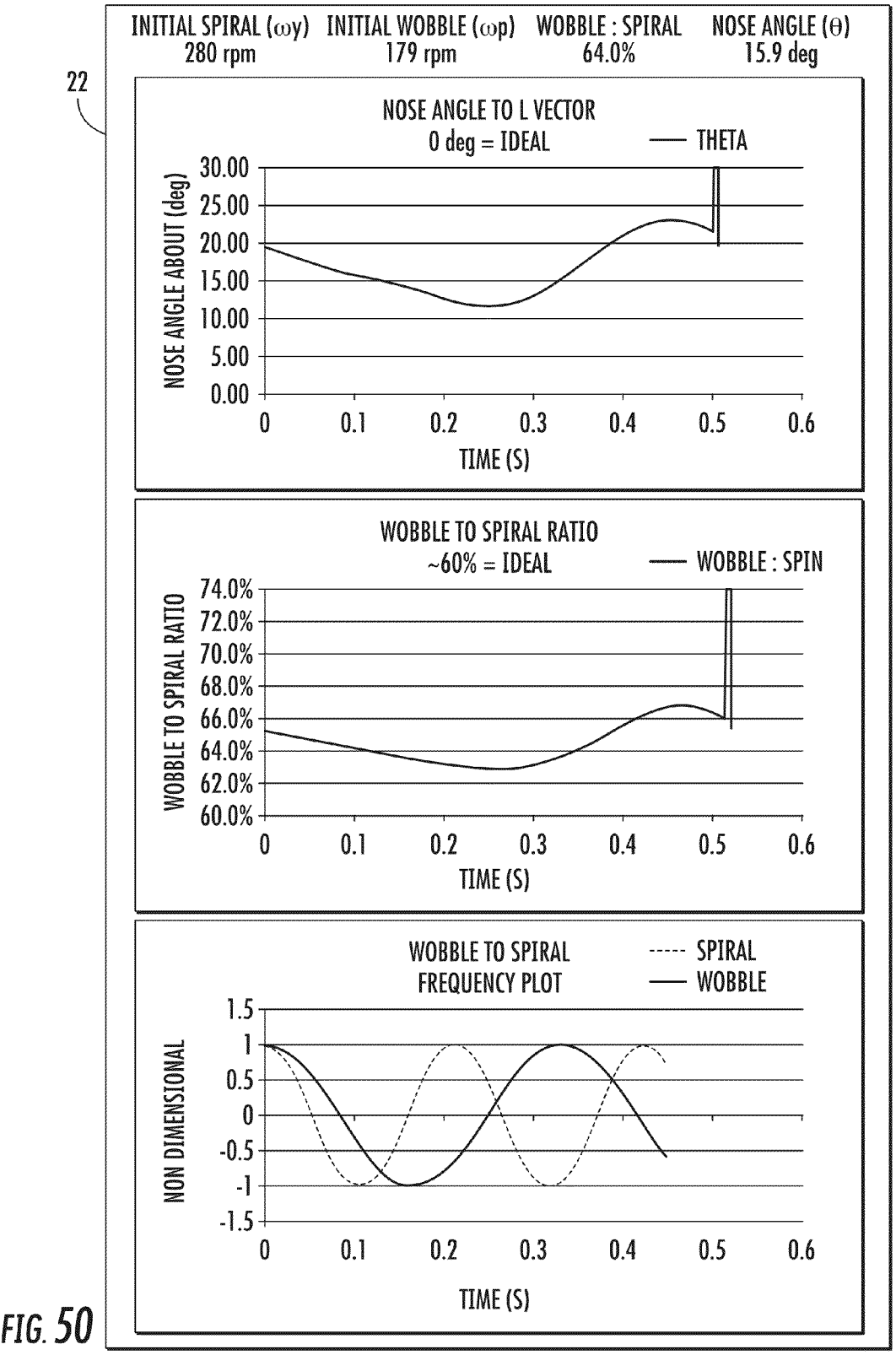

In one implementation, in response to receiving signals indicating that the advanced graphical user interface 1800 has been selected for the spiral efficiency data (FIG. 44), processor 26 displays additional data regarding or associated with spiral efficiency. FIG. 45 illustrates an example screen shot of information presented on display 22 by processor 26 for 10 example throws. An example illustrated, signals from sensor 252 carried by ball 450, such as accelerometers, gyro sensors, provide data regarding spiral RPM, wobble RPM, the ratio of wobble to spiral RPM and the angle of the football wobble axis to the longitudinal vector of the football. FIG. 46 is a free body diagram of an example football 450, illustrating the noted axes and rotational movement of the football.

In one implementation, processor 26 further presents graphical information relating to each of the individual throws. FIGS. 47-50 illustrate example displays of graphical data from throws 1 and 9, from FIG. 45. The presentation of such information permits a person to evaluate his or her spiral efficiency. In addition, the graphical presentation of such information permits a person to evaluate the nose angle of a thrown ball and the wobble to spiral ratio (60% is viewed as ideal). Through the evaluation of the wobble to spiral ratio over time, the person may further evaluate the stability of the spiral. Stability of spiral motion of the thrown football at the time of release from the thrower, immediately after release, and during the course of the entire throw can be measured, stored, compared, analyzed and monitored. The characteristics of a thrown football or the spiral of a thrown football can vary over the course of the throw. Accordingly, the present system contemplates sensing, measuring, analyzing, and comparing information regarding the thrown ball. As a result, system 420 provides yet another tool for the person to evaluate and improve his or her football passing or throwing skills.

Figure 51:
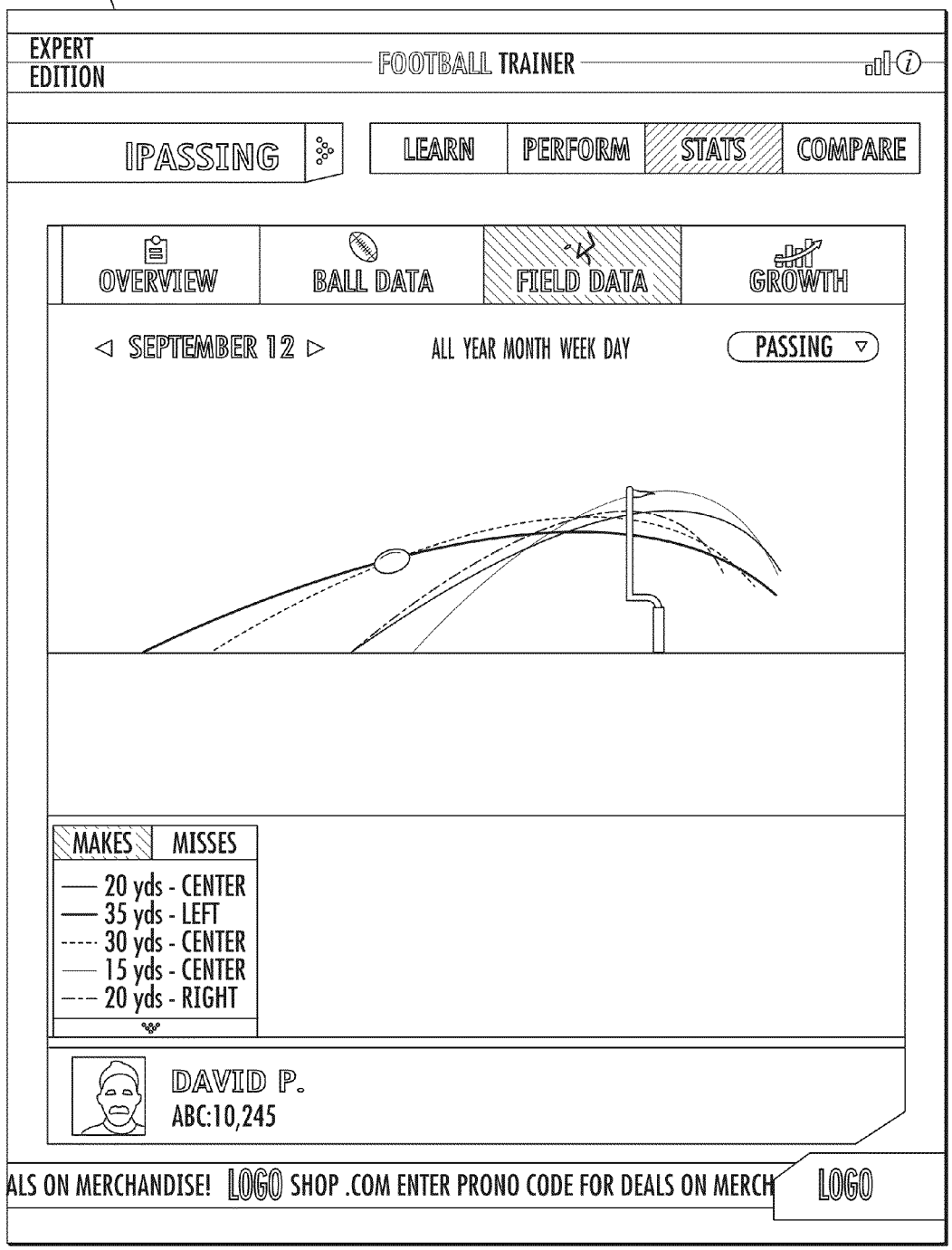
FIG. 51 illustrates an example screenshot of an example implementation of the sport performance system of FIG. 5 illustrating the results of football events over time.

As shown by FIG. 51, processor 26 allows the user to look at historical data for various years, months, weeks or days. Processor 26 presents a graphical depiction of the trajectory of multiple throws. As a result, a person may visibly ascertain not only whether the throw was on target, but whether the throw had a desired trajectory or arc. In the example illustrated, processor 26 utilizes different colors or brightnesses to indicate whether or not the particular throw was on target for the selected yardage. In other implementations, other icons or graphical indications may be used to indicate accuracy of the throw. Such graphical information regarding trajectories may be selected from any historical time.

Figure 52:
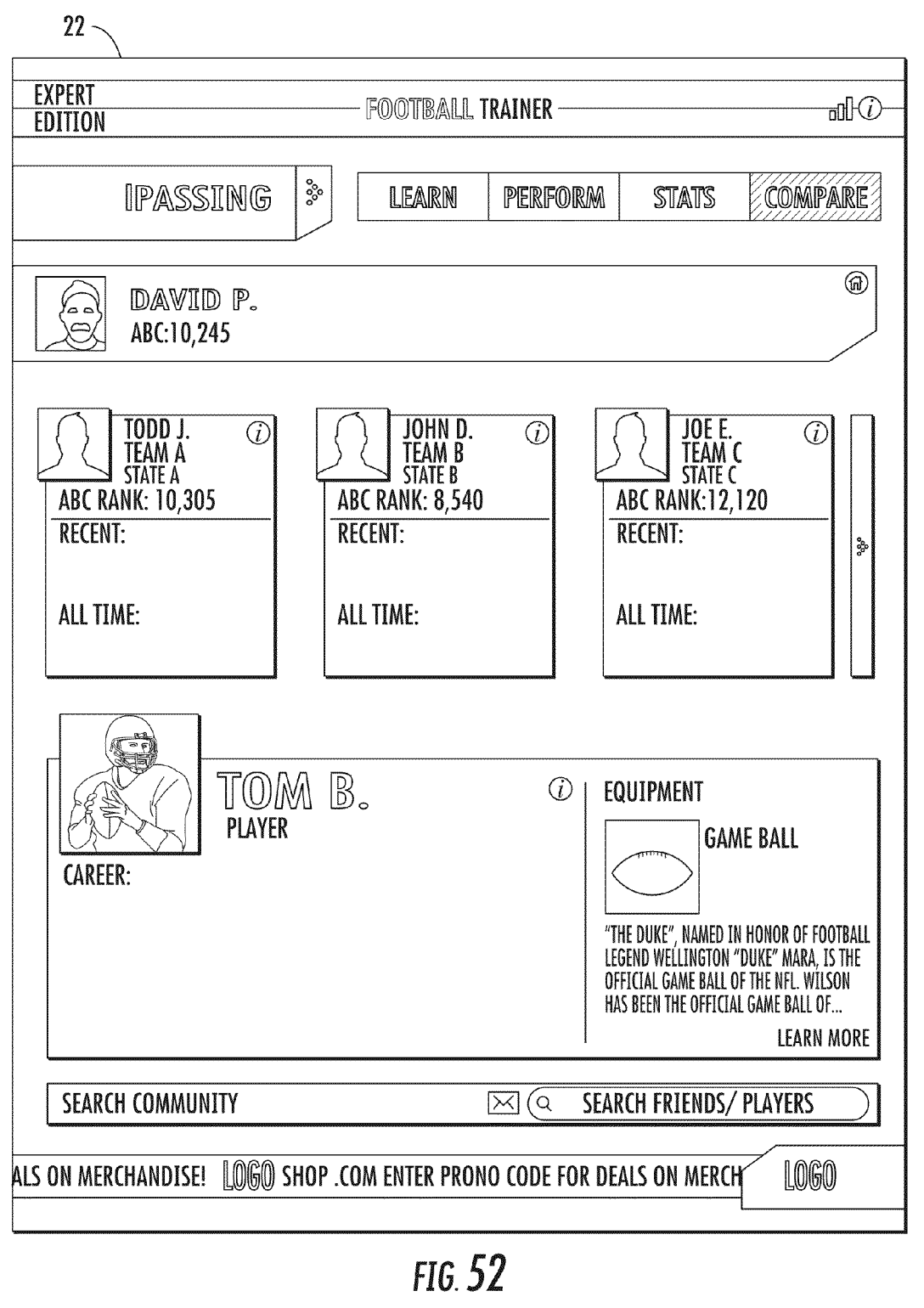

FIG. 52 illustrates a screenshot presented on display 22 by processor 26 in response to the user selecting the compare option. In the example shown in FIG. 50, the user is presented with ranking information and all-time high scores for a particular kick accuracy (or for other ball travel parameters) with respect to other users. Such users may be a select group of friends or those in a league. In one implementation, such accuracy or ball travel parameter values may also be compared to accuracies or ball travel parameters of celebrities. As a result, system 420 may facilitate remote competitions. In one implementation system 420 may be used in PUNT, PASS AND KICK competitions to track results.

Figure 53:
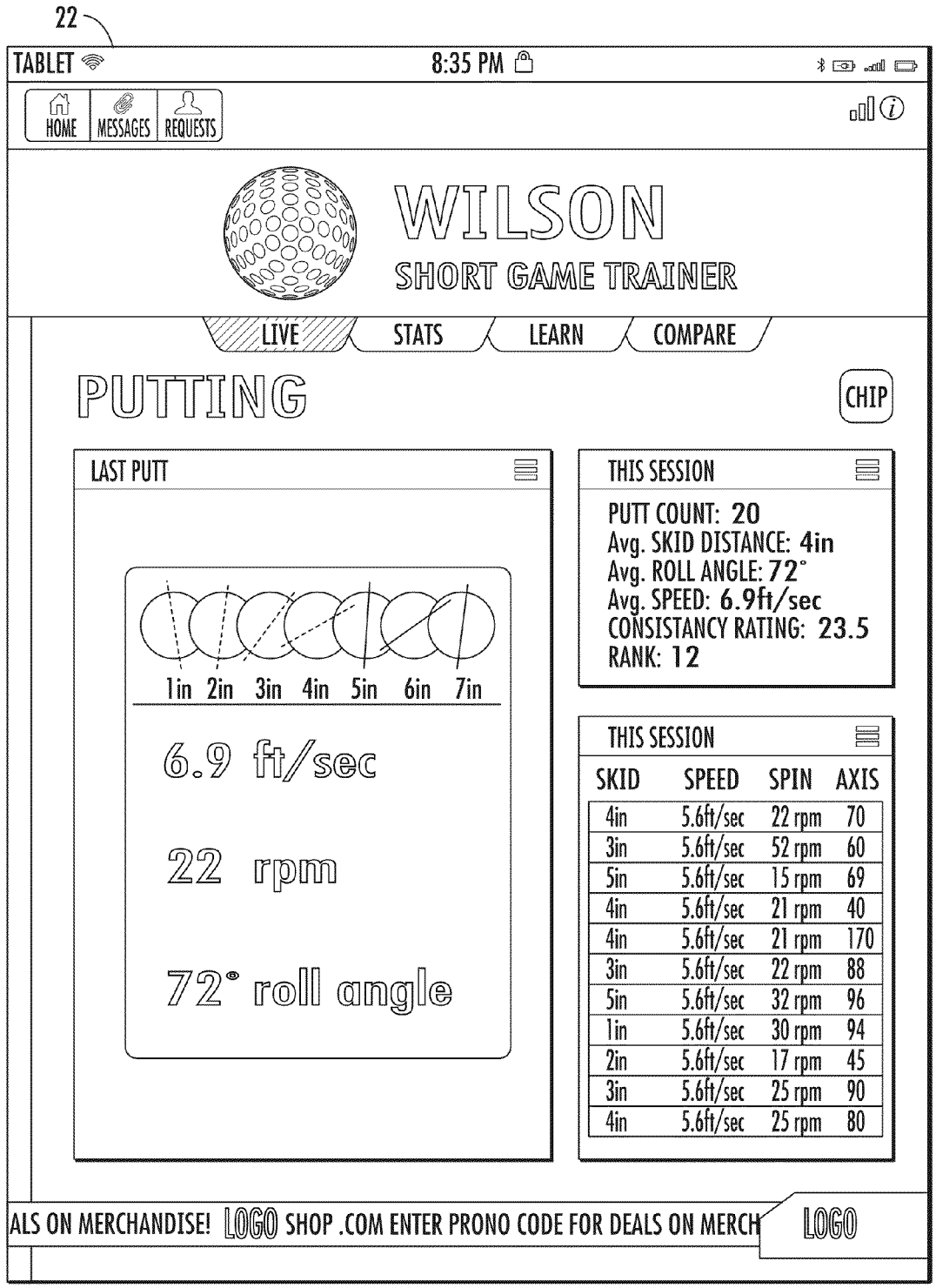
FIGS. 53 and 54 are diagrams of example screenshots presented by the system of FIG. 4 for use with a golf ball and illustrating aspects of a short game trainer system including displays of data involving the rotation of a putted golf ball.
Figure 54:
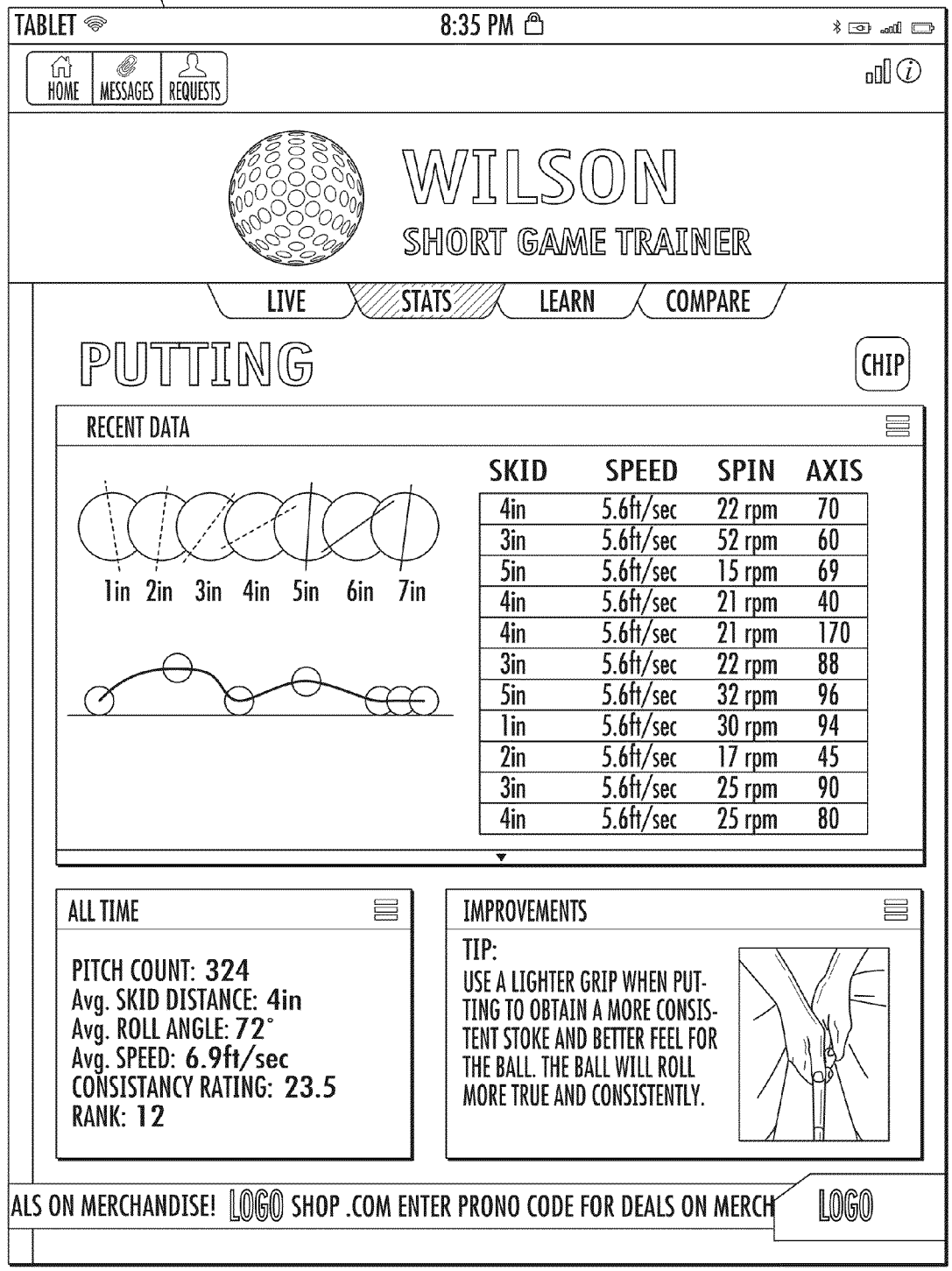
Figure 55:
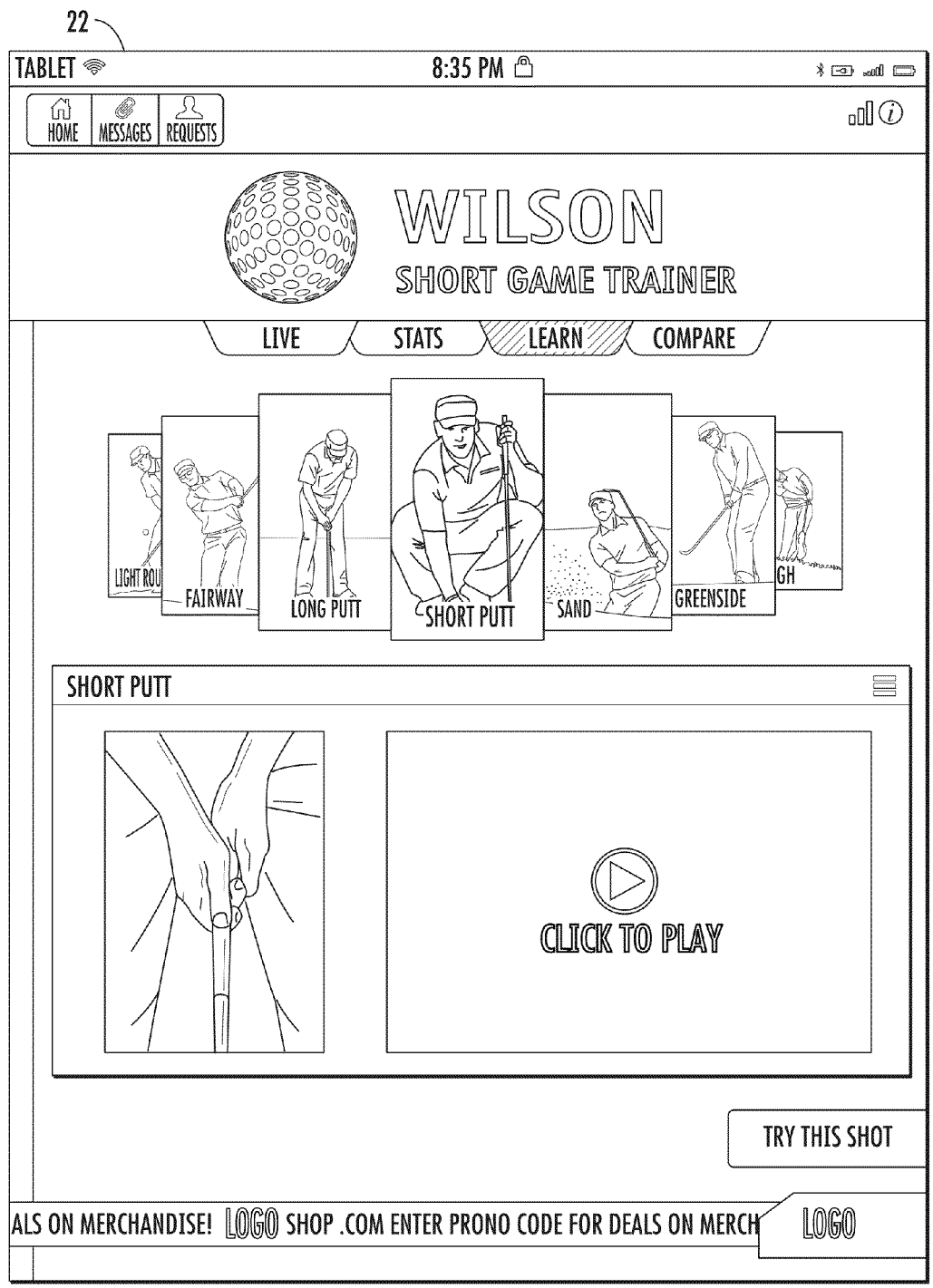
FIG. 55 illustrates an example screenshot of an example implementation of the sport performance system of FIG. 4 in which the learn tab option for a short putt is selected.
Figure 56:
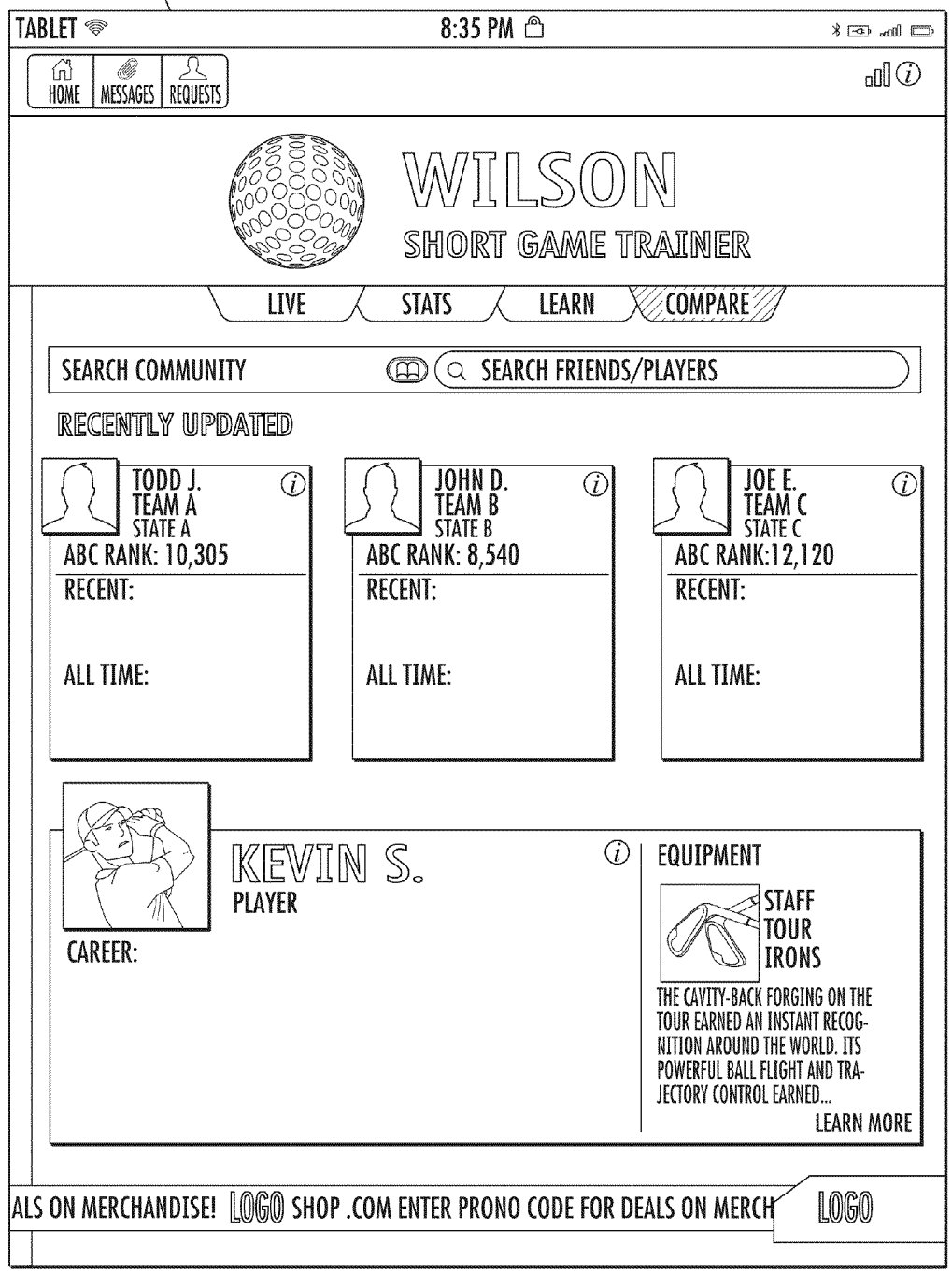
FIG. 56 illustrates an example screenshot of an example implementation of the sport performance system of FIG. 4 including comparing a user's short game information to other users.

FIGS. 53-76 illustrate other example embodiments of sport performance systems or training systems. These embodiments incorporate the disclosure of features discussed above. Referring to FIGS. 53-56, in one embodiment, aspects of a short game trainer apparatus, system and method are disclosed. FIG. 53 illustrates an example screenshot presented on display 22 by system 320 of FIG. 4 in which ball 250 specifically comprises a golf ball. In other implementations, sports performance system 420 of FIG. 5 may present the screenshots of FIGS. 53-56 except that instead of receiving signals from a one of more sensors carried by football, sports performance system 420 is configured to receive signals from one or more sensors carried by a golf ball and to analyze and present information regarding movement of the golf ball. Examples of such a golf ball and the associated sensing componentry are described in copending U.S. Provisional Patent Application Ser. No. 61/891,487, filed on Oct. 16, 2013 and entitled GOLF BALL AND CADDIE SYSTEM, the full disclosure of which is hereby incorporated by reference. As shown by FIGS. 53-54, processor 26 of sports performance system 320 displays data regarding the rotation of a putted golf ball as well as skid or bounce characteristics of the putt. Such analysis may be important to determine the distance for attaining a true roll of the golf ball on the green. As shown by FIG. 53, processor 26 displays various selectable training videos or instruction for different aspects of the player's golf game. As shown by FIG. 54, processor 26 facilitates comparisons with other golfers. In the example shown in FIG. 54, the user is presented with ranking information and all-time high scores for a particular putting accuracy (or for other ball travel parameters) with respect to other users. Such users may be a select group of friends or those in a league. As a result, system 420 may facilitate remote competitions. In one implementation, such accuracy or ball travel parameter values may also be compared to accuracies or ball travel parameters of celebrities.

Figure 57:
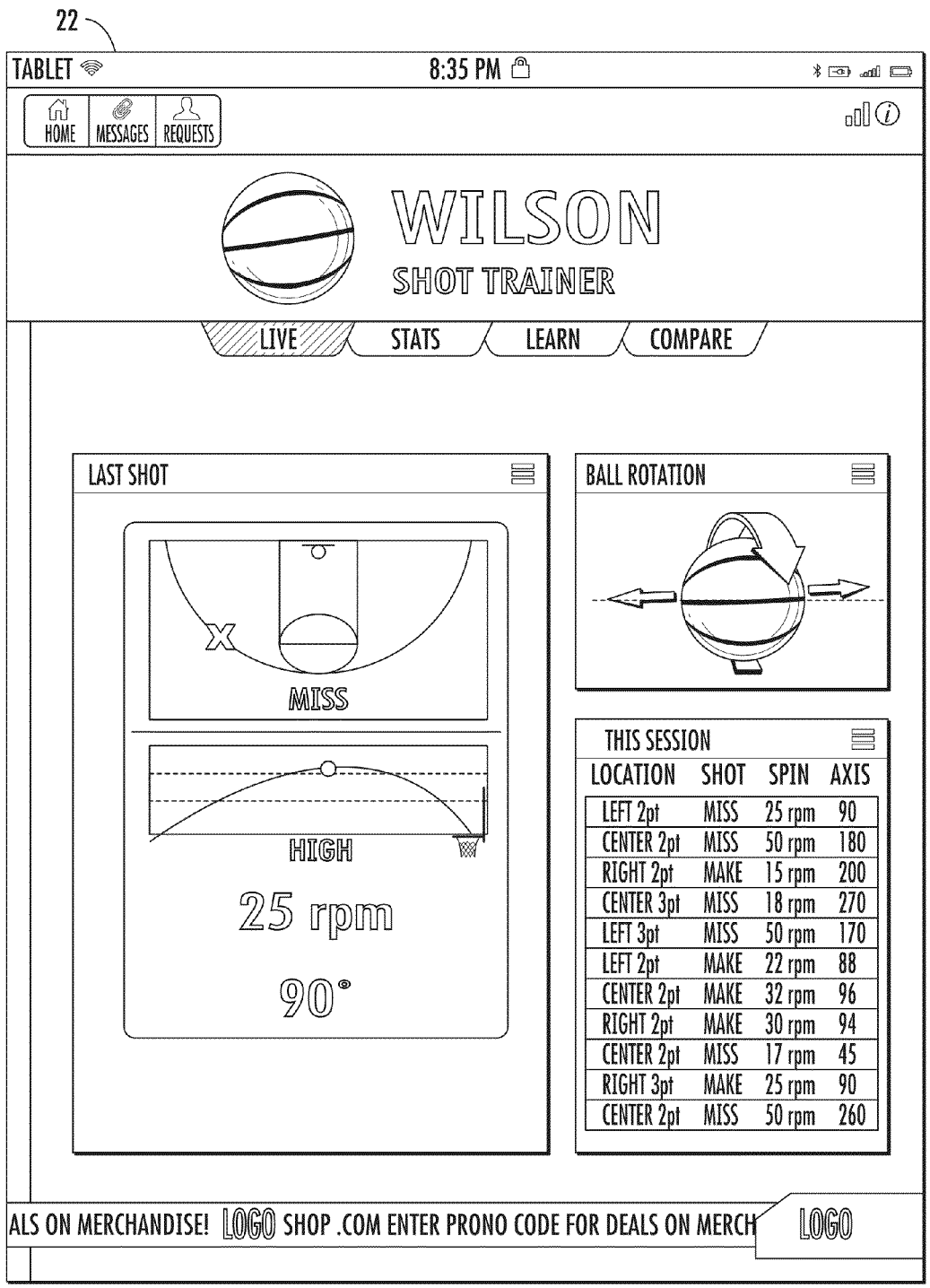
FIGS. 57 and 58 are diagrams of example screenshots presented by the system of FIG. 4 for use with a basketball and illustrating aspects of a shot trainer system.
Figure 58:
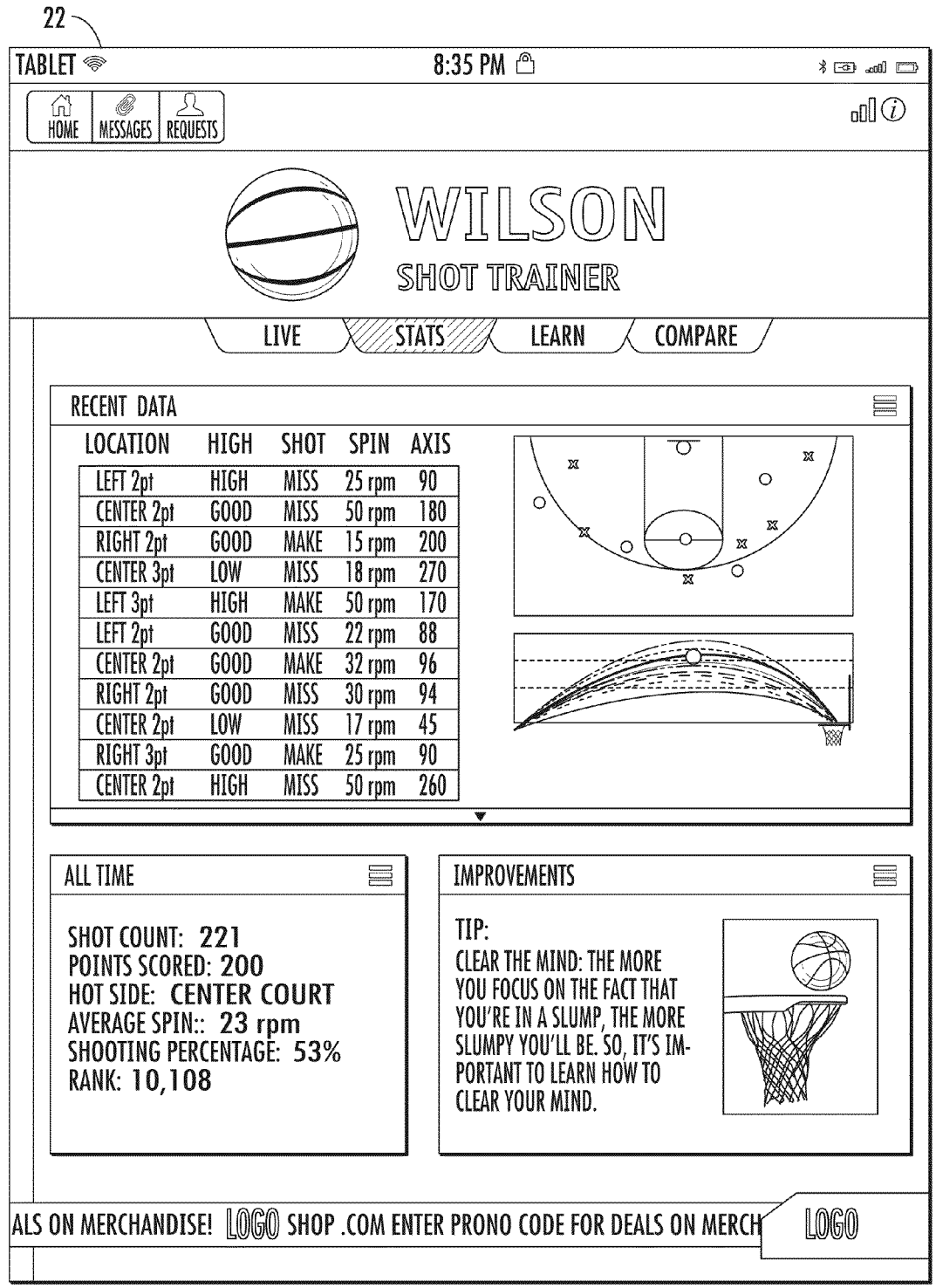
Figure 59:
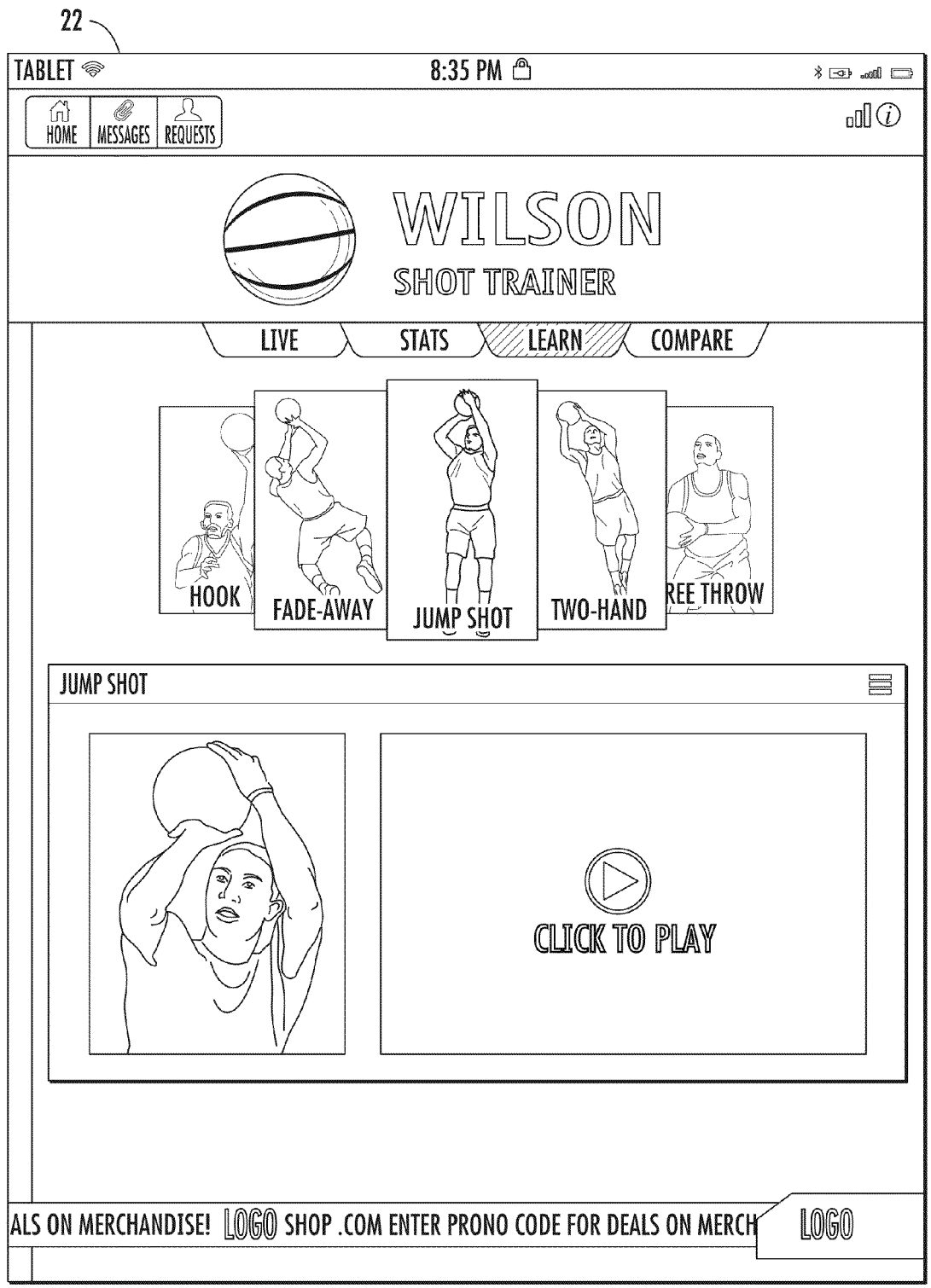
FIG. 59 illustrates an example screenshot of an example implementation of the sport performance system of FIG. 4 in which the learn tab option for a basketball jump shot is selected.
Figure 60:
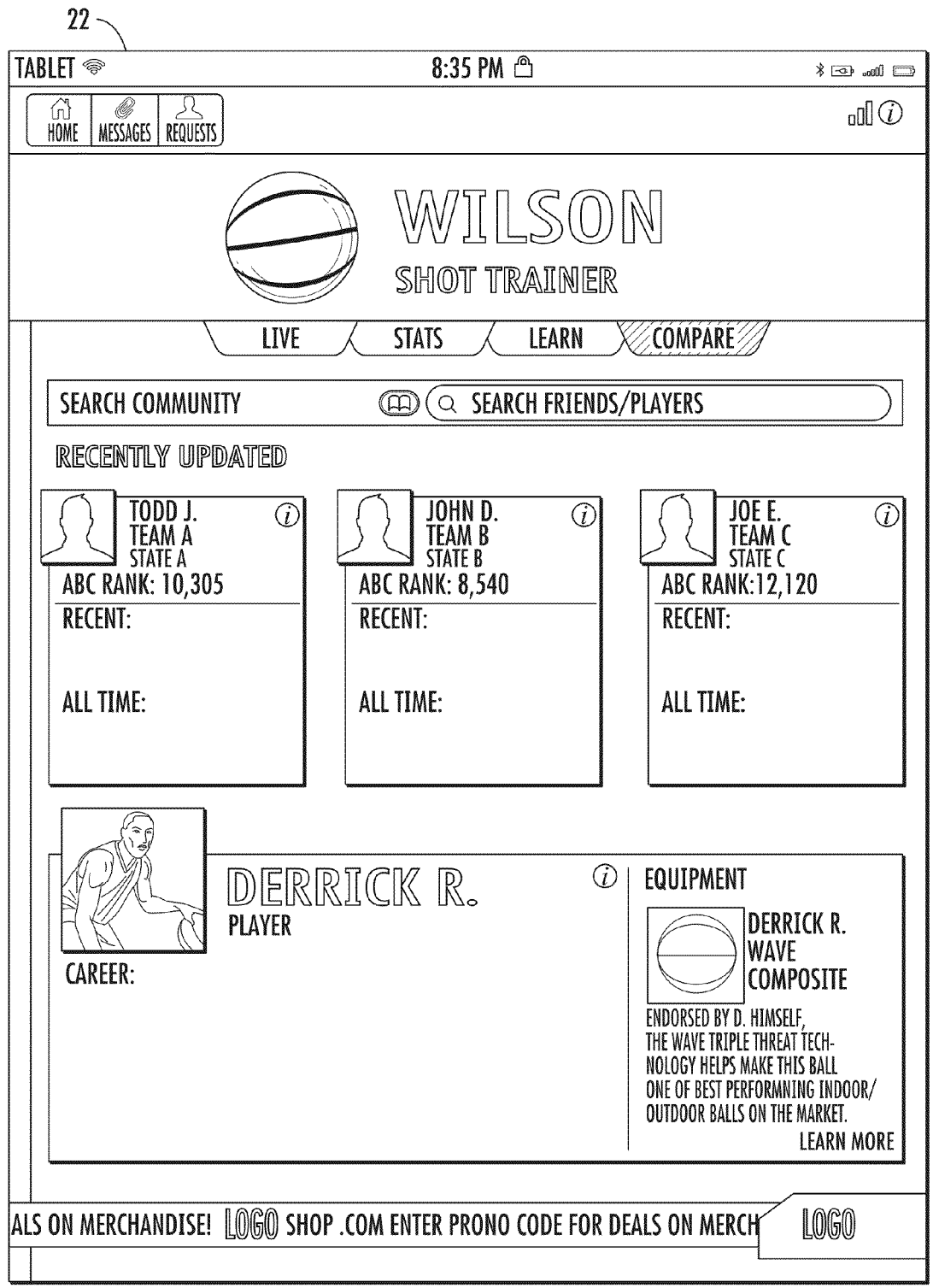
FIG. 60 illustrates an example screenshot of an example implementation of the sport performance system of FIG. 4 including comparing a user's basketball shot information to other users.

Referring to FIGS. 57-60 in one embodiment, aspects of a shot trainer apparatus, system and method are disclosed. FIG. 57 illustrates an example screenshot presented on display 22 by system 320 of FIG. 4 in which ball 250 specifically comprises a basketball. In other implementations, sports performance system 420 of FIG. 5 may present the screenshots of FIGS. 57-60 except that instead of receiving signals from a one of more sensors carried by football, sports performance system 420 is configured to receive signals from one or more sensors carried by a basketball and to analyze and present information regarding movement of the basketball. Examples of such a basketball and the associated sensing componentry are described in copending U.S. Provisional Patent Application Ser. No. 61/798,738, filed on Mar. 15, 2013 and entitled BASKETBALL SENSING, and copending U.S. Provisional Patent Application Ser. No. 61/800,972, filed on Mar. 15, 2013 and entitled BALL LIGHTING, the full disclosures of which is hereby incorporated by reference. As shown by FIGS. 57-58, processor 26 of sports performance system 320 displays data regarding different shots from different locations on a basketball court. The information presented by processor 26 comprises ball rotation, shot speed, shot trajectory and accuracy results. As shown by FIG. 59, processor 26 displays various selectable training videos or instruction for different aspects of the player's golf game. As shown by FIG. 60, processor 26 facilitates comparisons with other basketball players. In the example shown in FIG. 60, the user is presented with ranking information and all-time high scores for a particular shooting accuracy (or for other ball travel parameters) with respect to other users. Such users may be a select group of friends or those in a league. As a result, system 420 may facilitate remote competitions. In one implementation, such accuracy or ball travel parameter values may also be compared to accuracies or ball travel parameters of celebrities.

Figure 61:
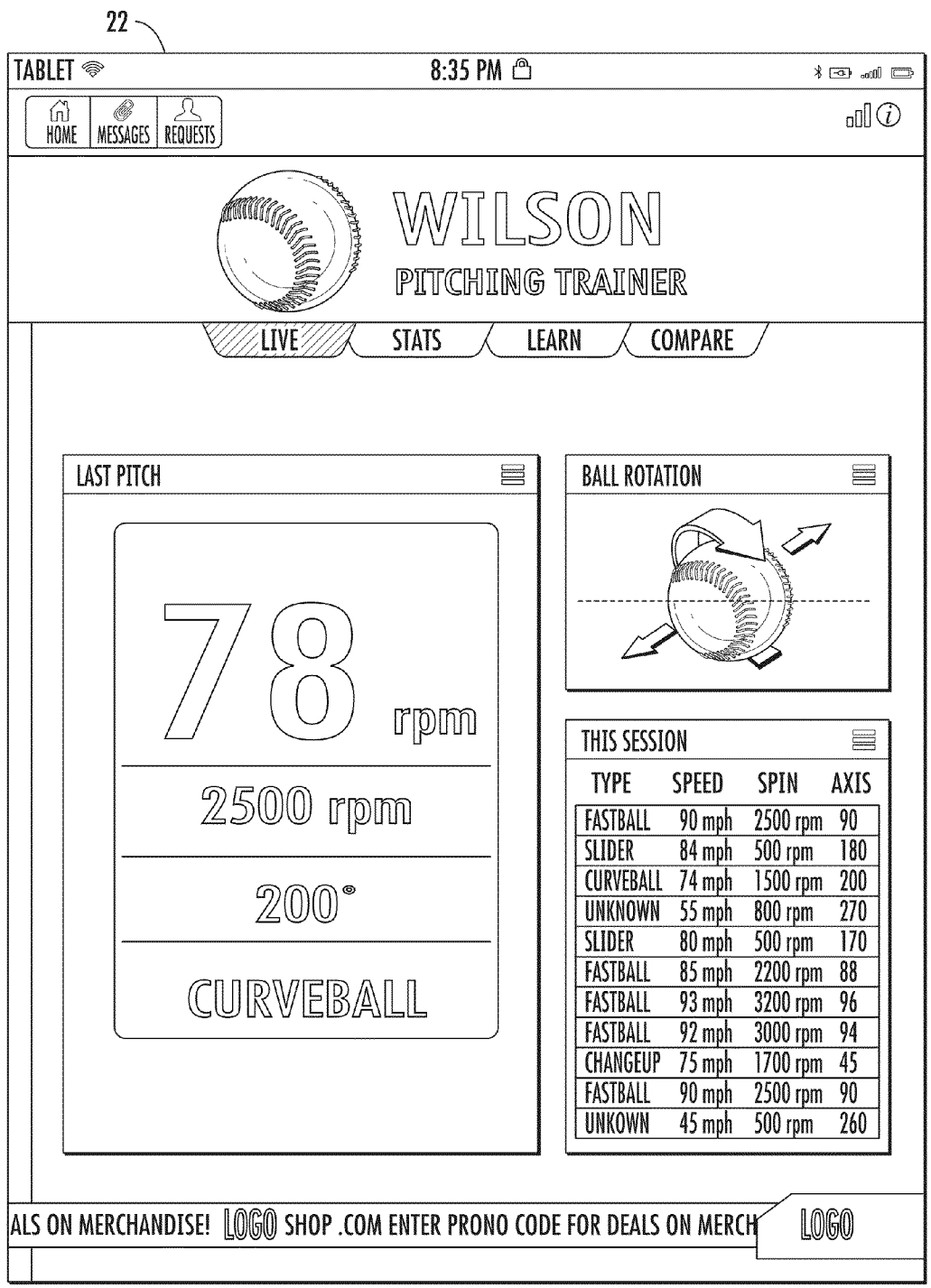
FIGS. 61 and 62 are diagrams of example screenshots presented by the system of FIG. 4 for use with a baseball including aspects of a pitching trainer system.
Figure 62:
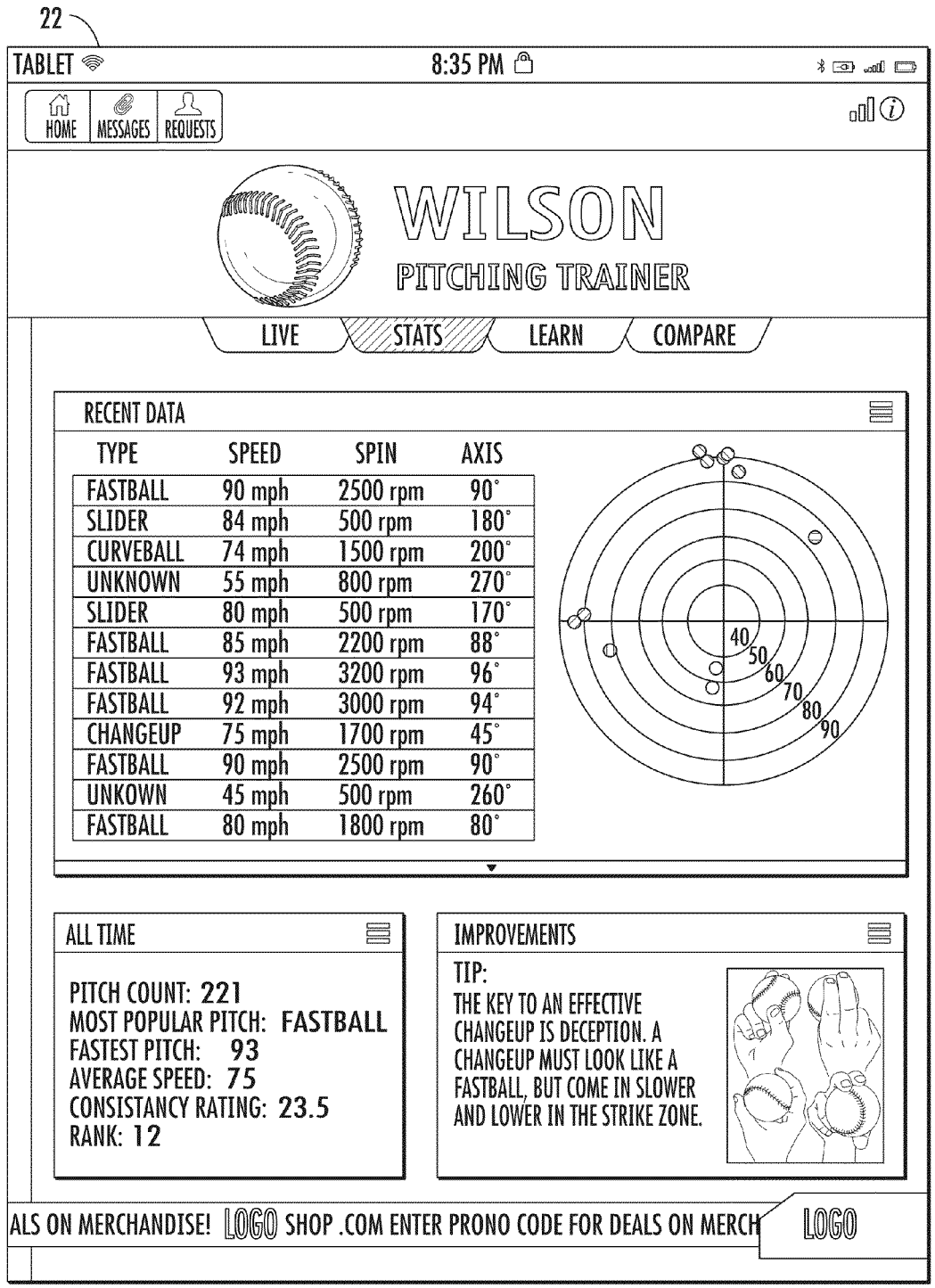
Figure 63:
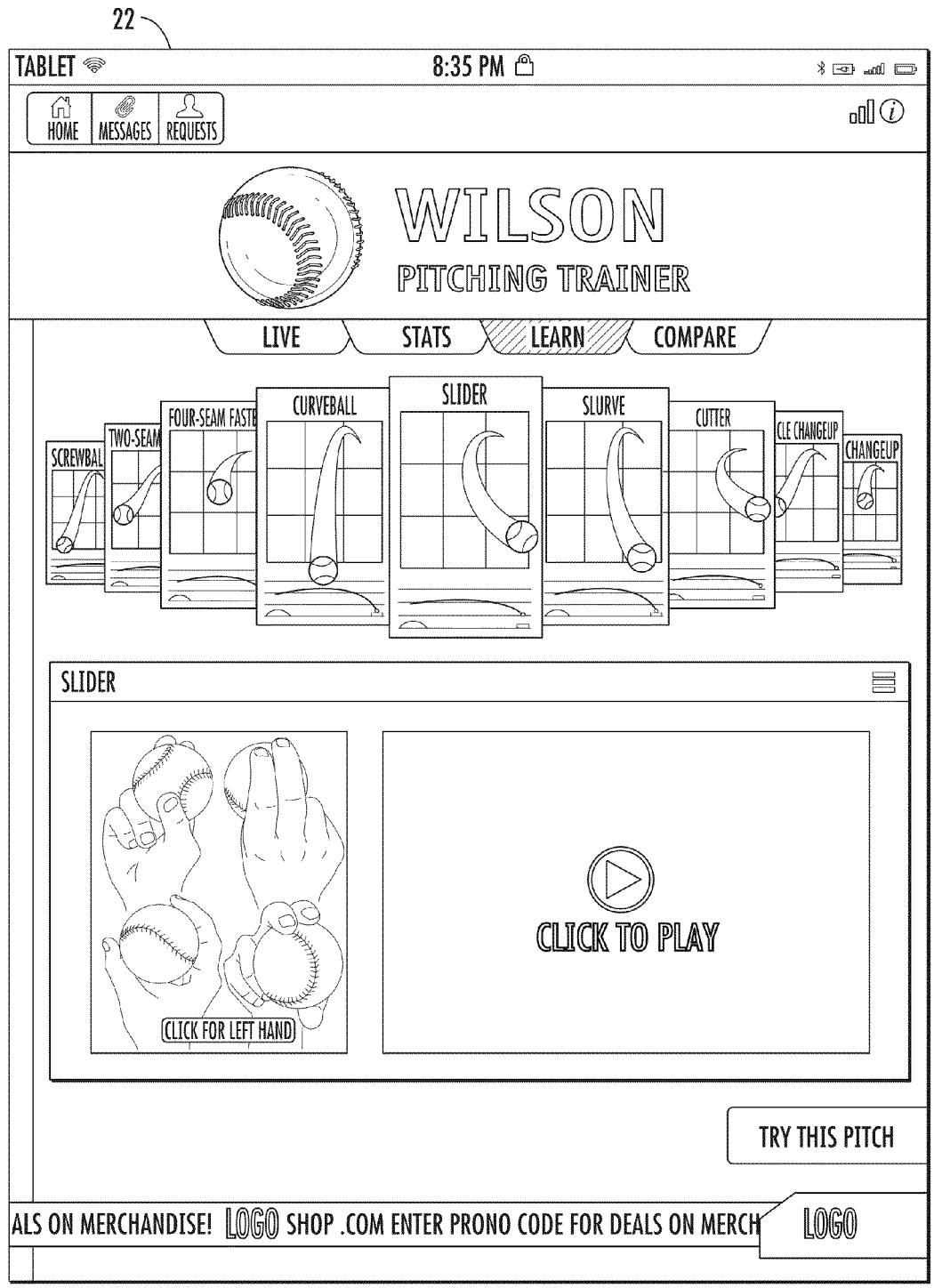
FIG. 63 illustrates an example screenshot of an example implementation of the sport performance system of FIG. 4 in which the learn tab option for pitching a slider is selected.
Figure 64:
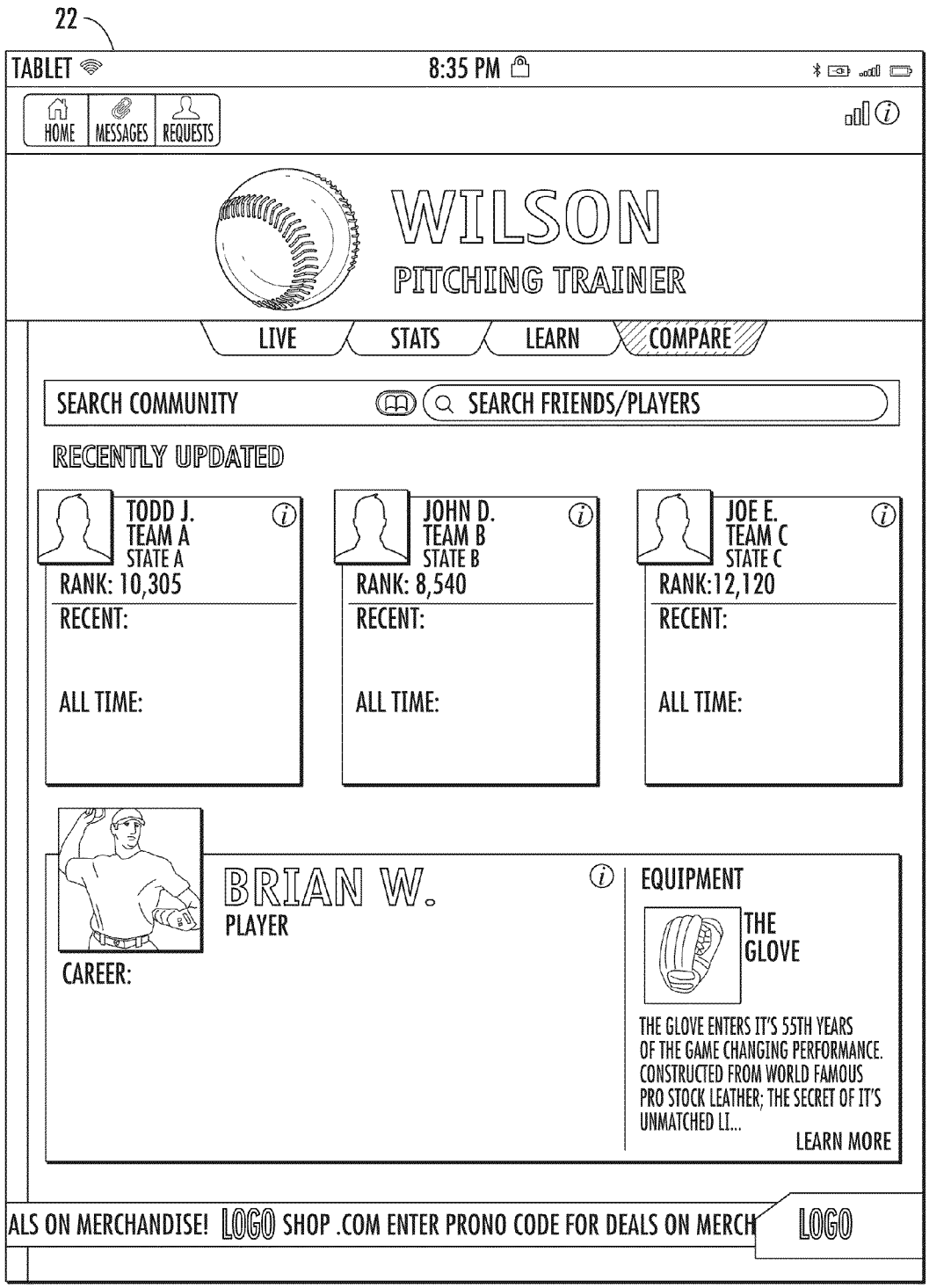
FIG. 64 illustrates an example screenshot of an example implementation of the sport performance system of FIG. 4 including comparing a user's baseball pitching information to other users.

Referring to FIGS. 61-64 in one embodiment, aspects of a pitching trainer apparatus, system and method are disclosed. FIG. 61 illustrates an example screenshot presented on display 22 by system 320 of FIG. 4 in which ball 250 specifically comprises a baseball. In other implementations, sports performance system 420 of FIG. 5 may present the screenshots of FIGS. 61-64 except that instead of receiving signals from a one of more sensors carried by football, spoils performance system 420 is configured to receive signals from one or more sensors carried by a baseball and to analyze and present information regarding movement of the baseball. Examples of such a baseball and the associated sensing componentry are described in copending U.S. Provisional Patent Application Ser. No. 61/788,304, filed on Mar. 15, 2013 and entitled BALL SENSING, the full disclosure of which is hereby incorporated by reference. As shown by FIGS. 61-62, processor 26 of sports performance system 320 displays data regarding different baseball pitches by a pitcher. The information presented by processor 26 comprises ball rotation, pitch speed, pitch type and pitch location results. As shown by FIG. 63, processor 26 displays various selectable training videos or instruction for different types of pitches comprising a screwball, two seam fastball, four seam fastball, curveball, slider, slurve, cutter, and changeups. As shown by FIG. 64, processor 26 facilitates comparisons with other pitchers or baseball players. In the example shown in FIG. 64, the user is presented with ranking information and all-time high scores for a particular pitching type and location accuracy (or for other ball travel parameters) with respect to other users. Such users may be a select group of friends or those in a league. As a result, system 420 may facilitate remote competitions. In one implementation, such accuracy or ball travel parameter values may also be compared to accuracies or ball travel parameters of celebrities.

Referring to FIGS. 65-68 in one embodiment, aspects of a soccer trainer apparatus, system and method are disclosed.

Figure 65:
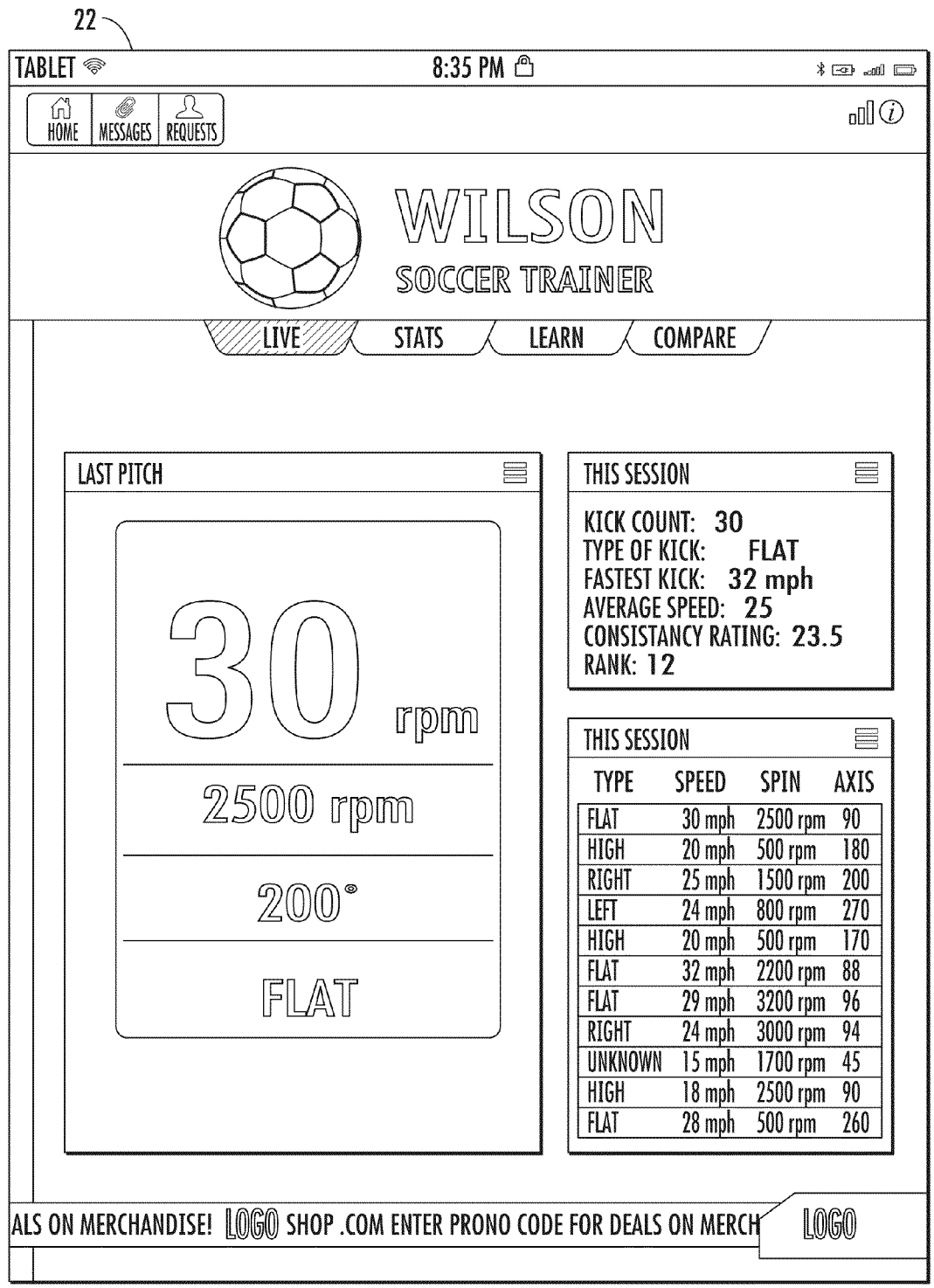
FIGS. 65 and 66 are diagrams of example screenshots presented by the system of FIG. 4 for use with a soccer ball including aspects of a soccer trainer system.
Figure 66:
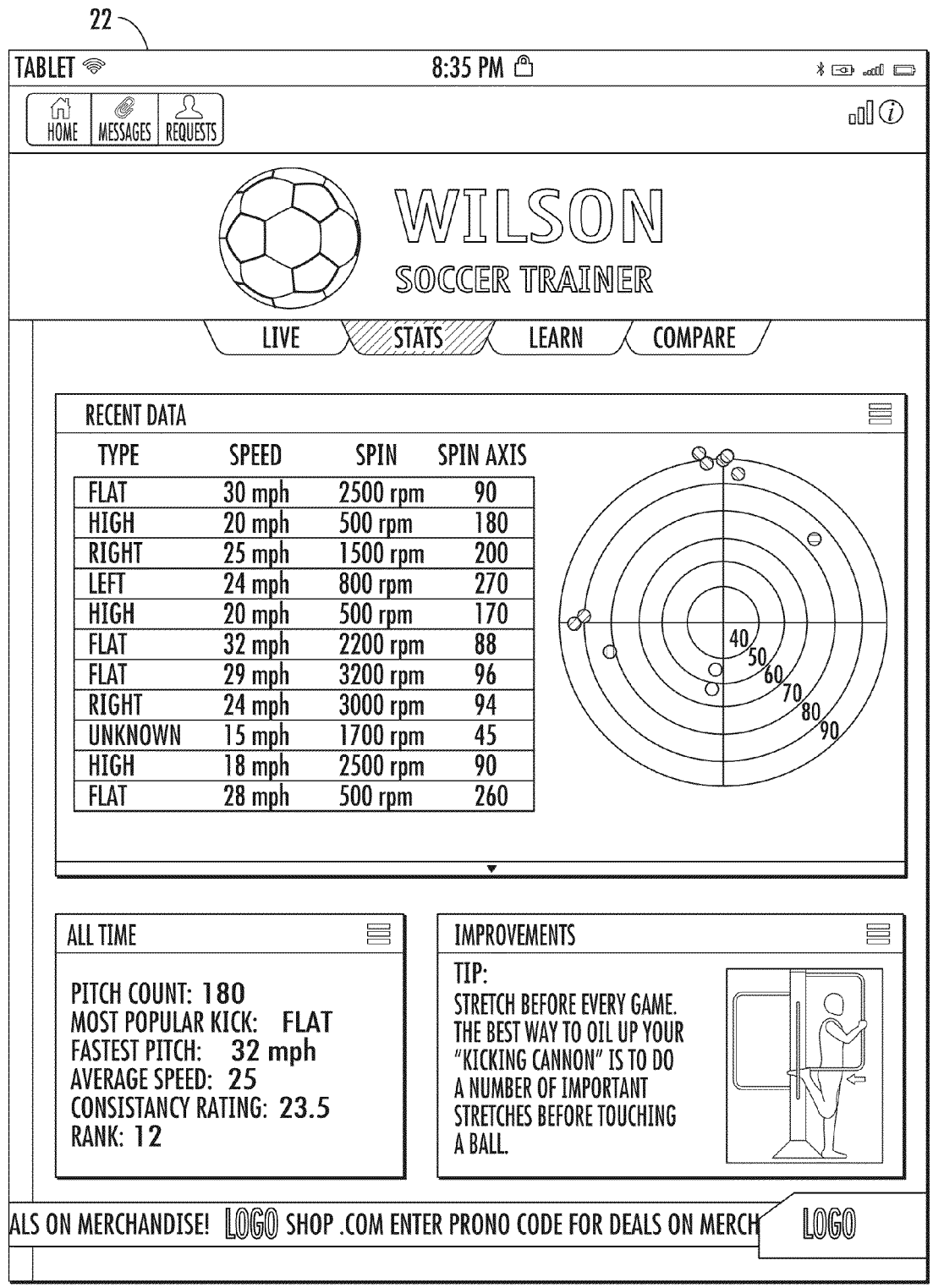
Figure 67:
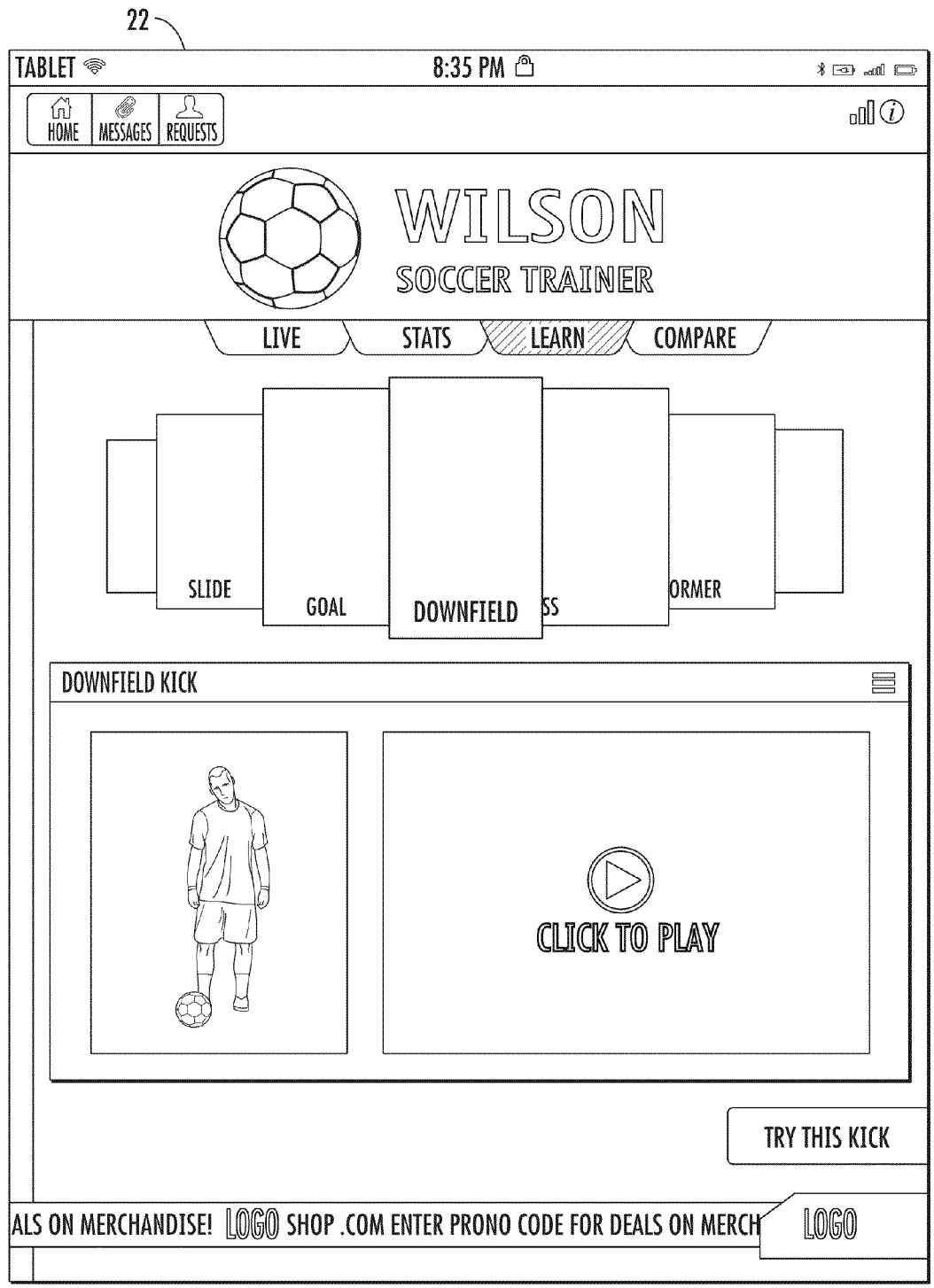
FIG. 67 illustrates an example screenshot of an example implementation of the sport performance system of FIG. 4 in which the learn tab option for kicking a downfield soccer kick is selected.
Figure 68:
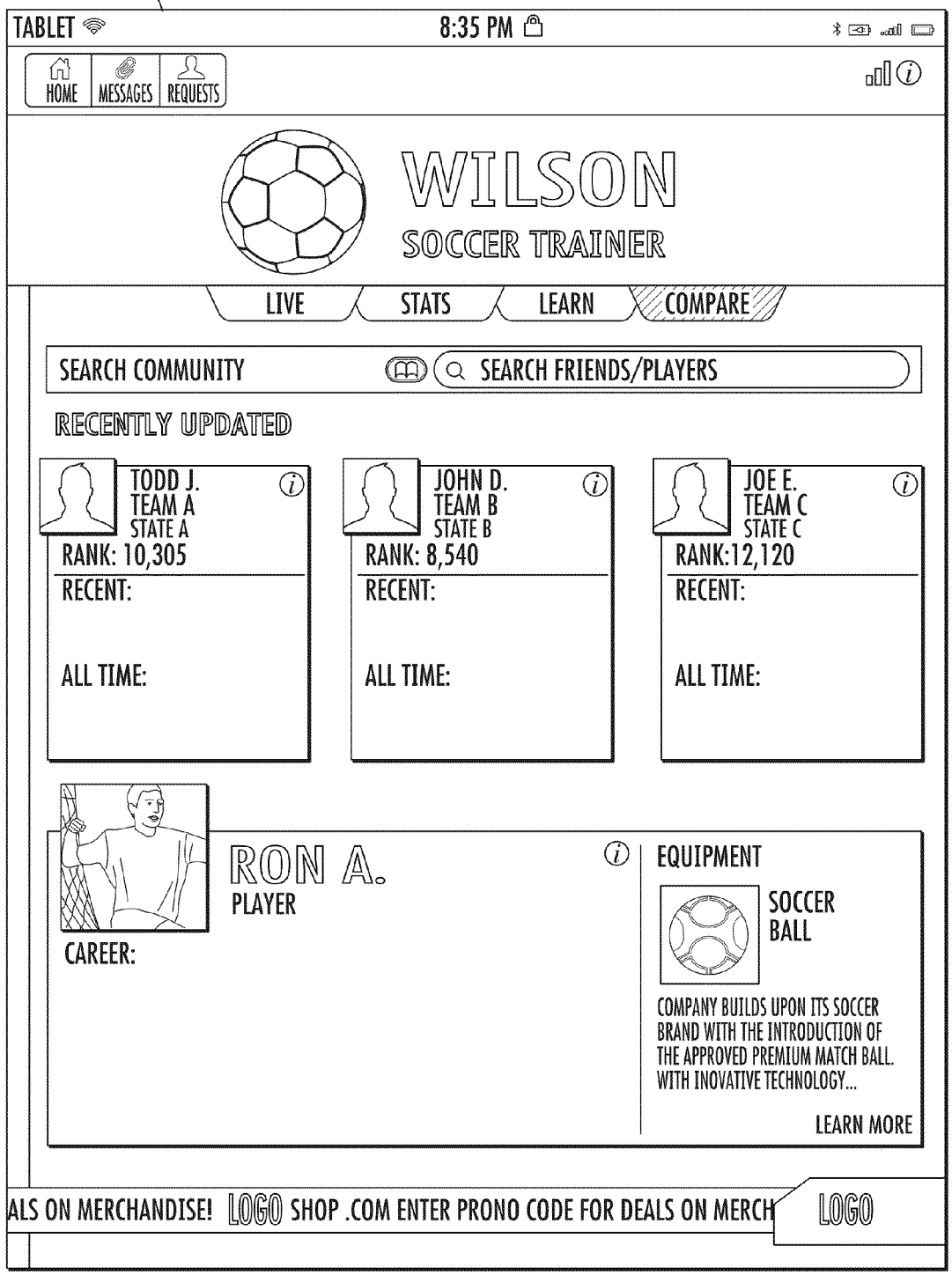
FIG. 68 illustrates an example screenshot of an example implementation of the sport performance system of FIG. 4 including comparing a user's soccer ball kicking information to other users.

FIG. 65 illustrates an example screenshot presented on display 22 by system 320 of FIG. 4 in which ball 250 specifically comprises a soccer ball. In other implementations, sports performance system 420 of FIG. 5 may present the screenshots of FIGS. 5-68 except that instead of receiving signals from a one of more sensors carried by football, sports performance system 420 is configured to receive signals from one or more sensors carried by a soccer ball and to analyze and present information regarding movement of the soccer ball. As shown by FIGS. 65-66, processor 26 of sports performance system 320 displays data regarding different kicks by a soccer player. The information presented by processor 26 comprises the type of kick, ball rotation, ball velocity and kick location accuracy results. As shown by FIG. 67, processor 26 displays various selectable training videos or instruction for different types of kicks. As shown by FIG. 68, processor 26 facilitates comparisons with other pitchers or baseball players. In the example shown in FIG. 64, the user is presented with ranking information and all-time high scores for a particular kicking results such as location accuracy (or for other ball travel parameters) with respect to other users. Such users may be a select group of friends or those in a league. As a result, system 420 may facilitate remote competitions. In one implementation, such accuracy or ball travel parameter values may also be compared to accuracies or ball travel parameters of celebrities Referring to FIGS. 69-76 in other example embodiments, aspects of a player, coach, team, group performance tracking system, apparatus and method are disclosed. As shown by FIGS. 69-76, in one implementation, sports performance system 320 (or sports performance system 420) may sense and track different types of balls from multiple sports such that sports performances 320 may also track the overall sport experience of an individual in all the sports in which he or she is participating. As a result, system 320 tracks the highlights of a person in all the sports he or she is participating. System 320 further tracks any progress or success the various teams or events/tournaments in which the person is involved. System 420 further allows the player to offer and authorize Internet access of such data to others ("fans"), allowing the other fans to see the player's progress and overall athletic progress. The "fans" may comprise family, coaches, trainers and the like. For example, in one implementation, data may be automatically uploaded to a remote website which is accessible by authorized "fans" for viewing of such data. In some implementations, the player may control what particular data is available to different individuals such that different individuals may have access to different types of information. For example, a football coach may be provided access to only football data whereas a parent may be provided access to all data for the player or athlete.

Figure 69:
FIGS. 69-70 are diagrams of example screenshots presented by the system of FIG. 4 for tracking an athlete in multiple sports.
Figure 70:
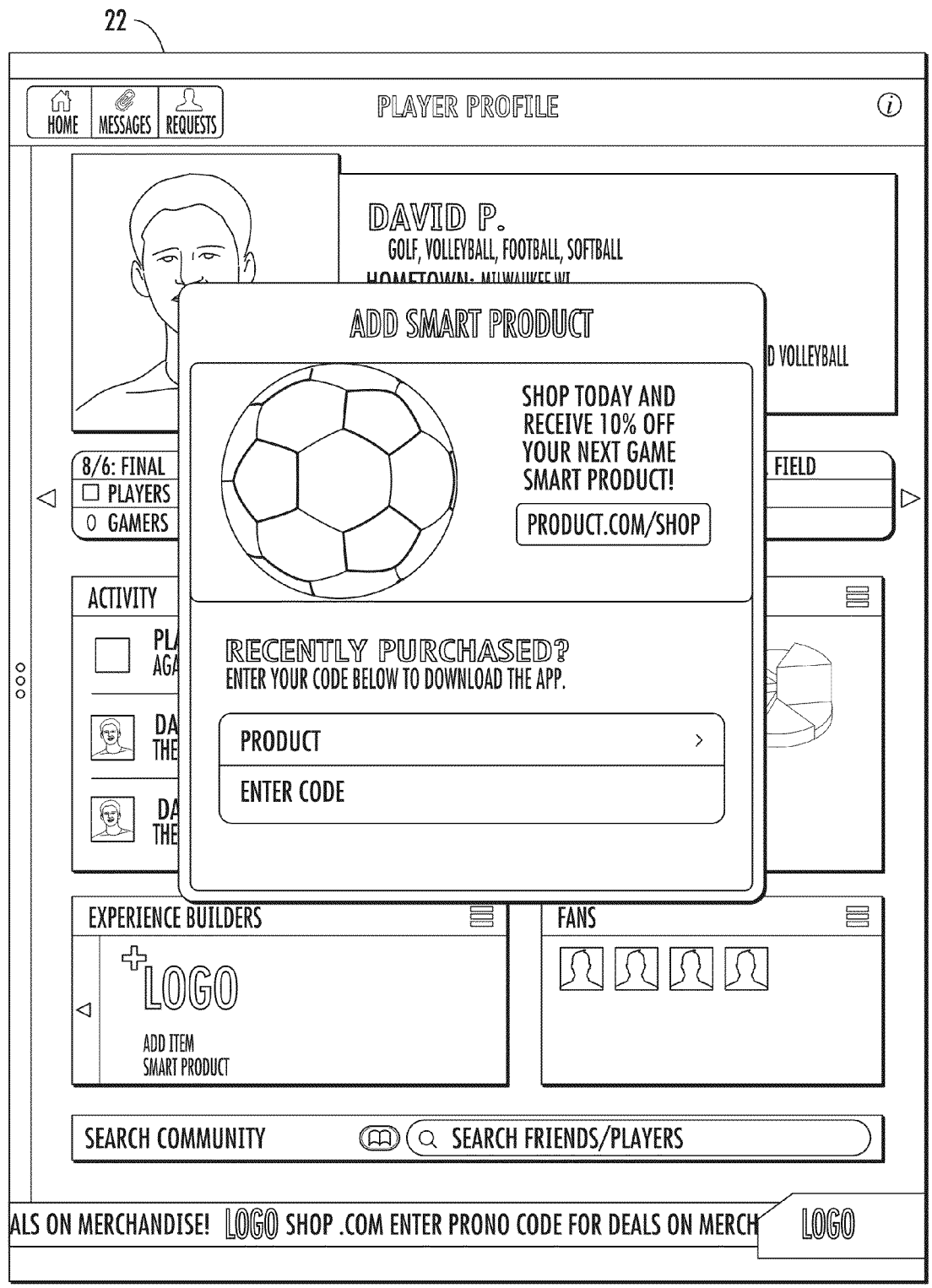

As shown by FIGS. 69 and 70, in one implementation, the tracking for a particular ball in a particular sport may be automatically activated or automatically downloaded from a remote Internet website in response to the purchase of an authorized in tracking capable ball in the particular sport. The triggering of such activation or downloading is achieved by entering the product name and product code in one implementation.

Figure 71:
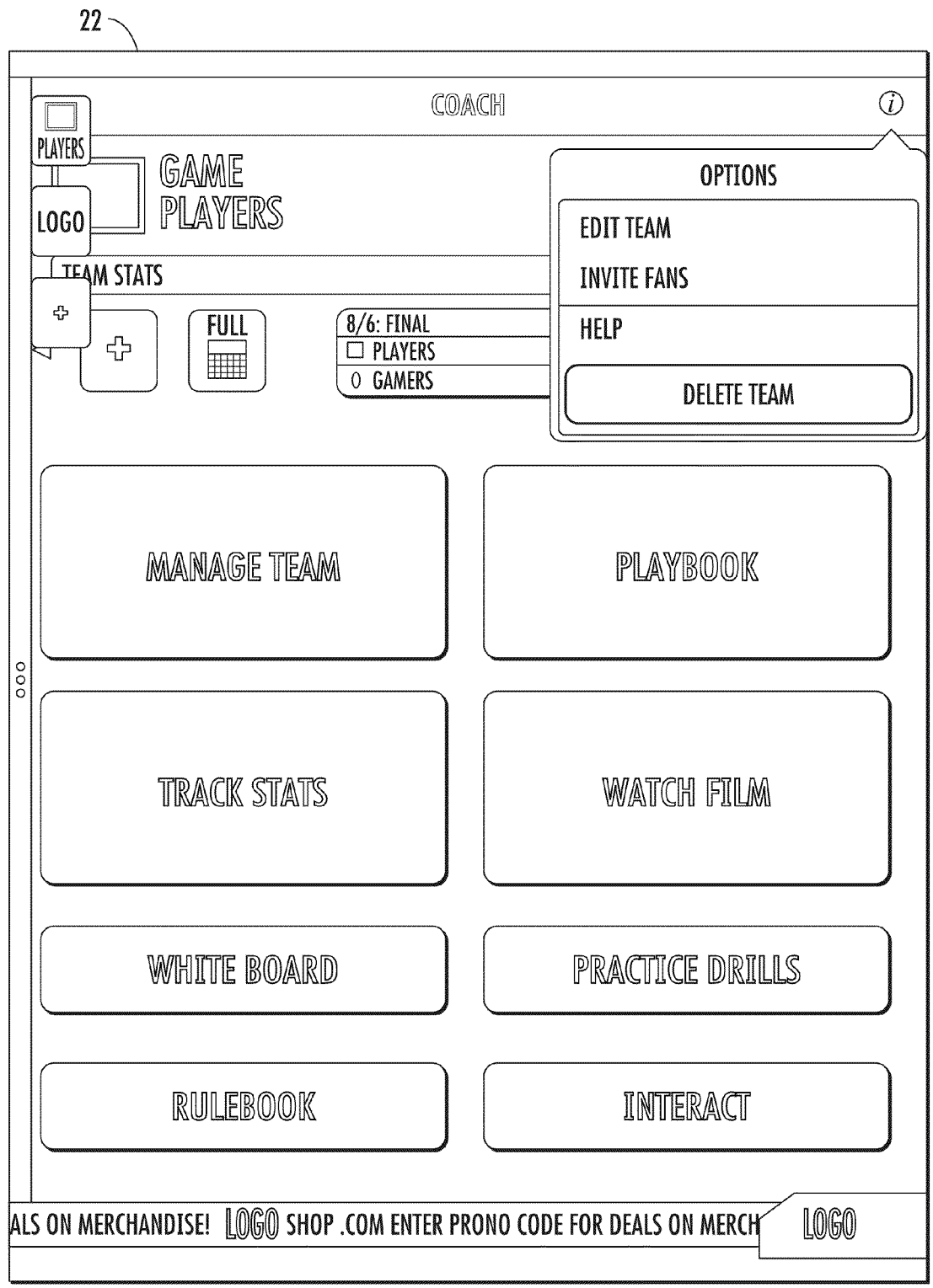
Figure 72:
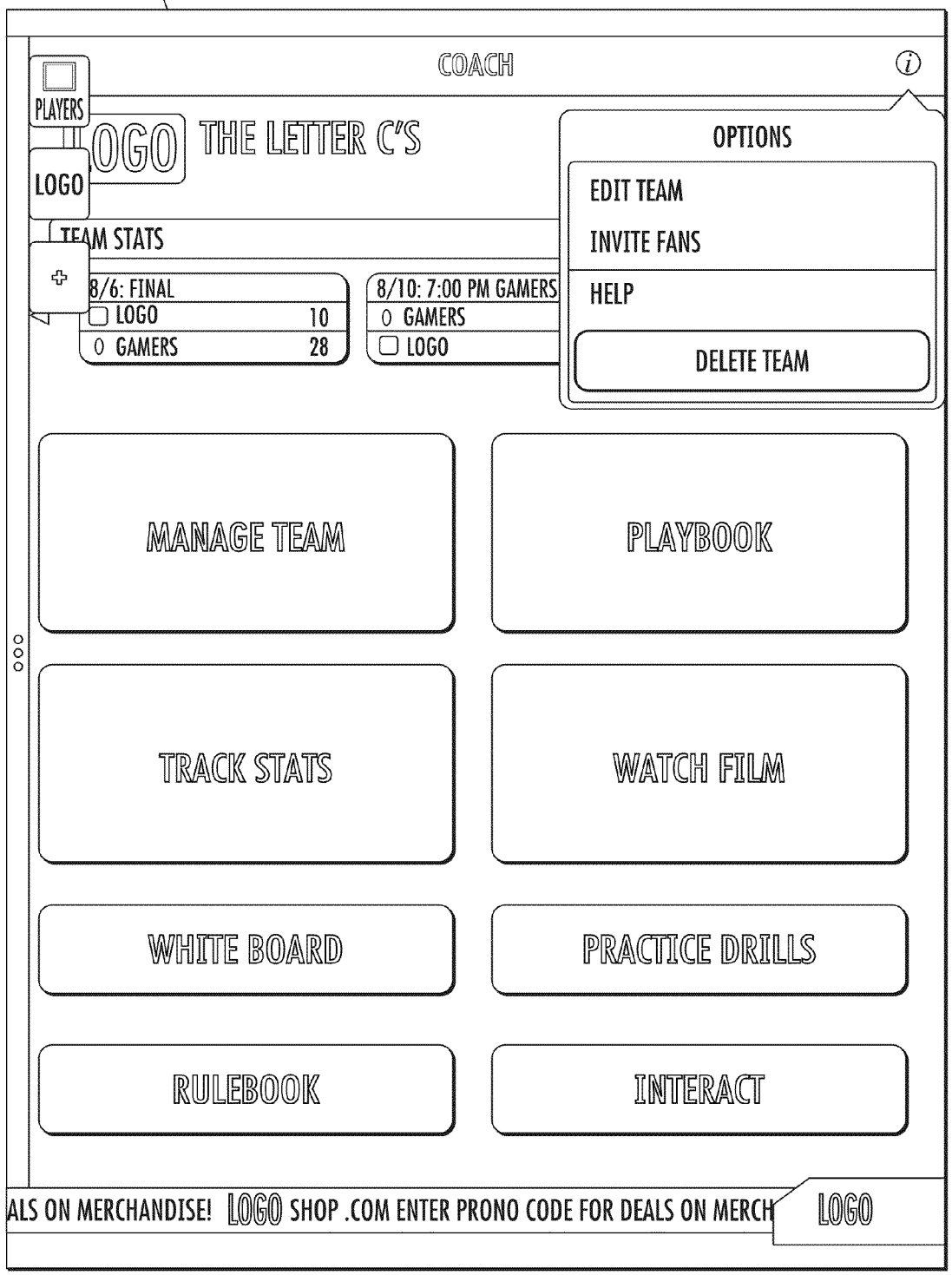
Figure 73:
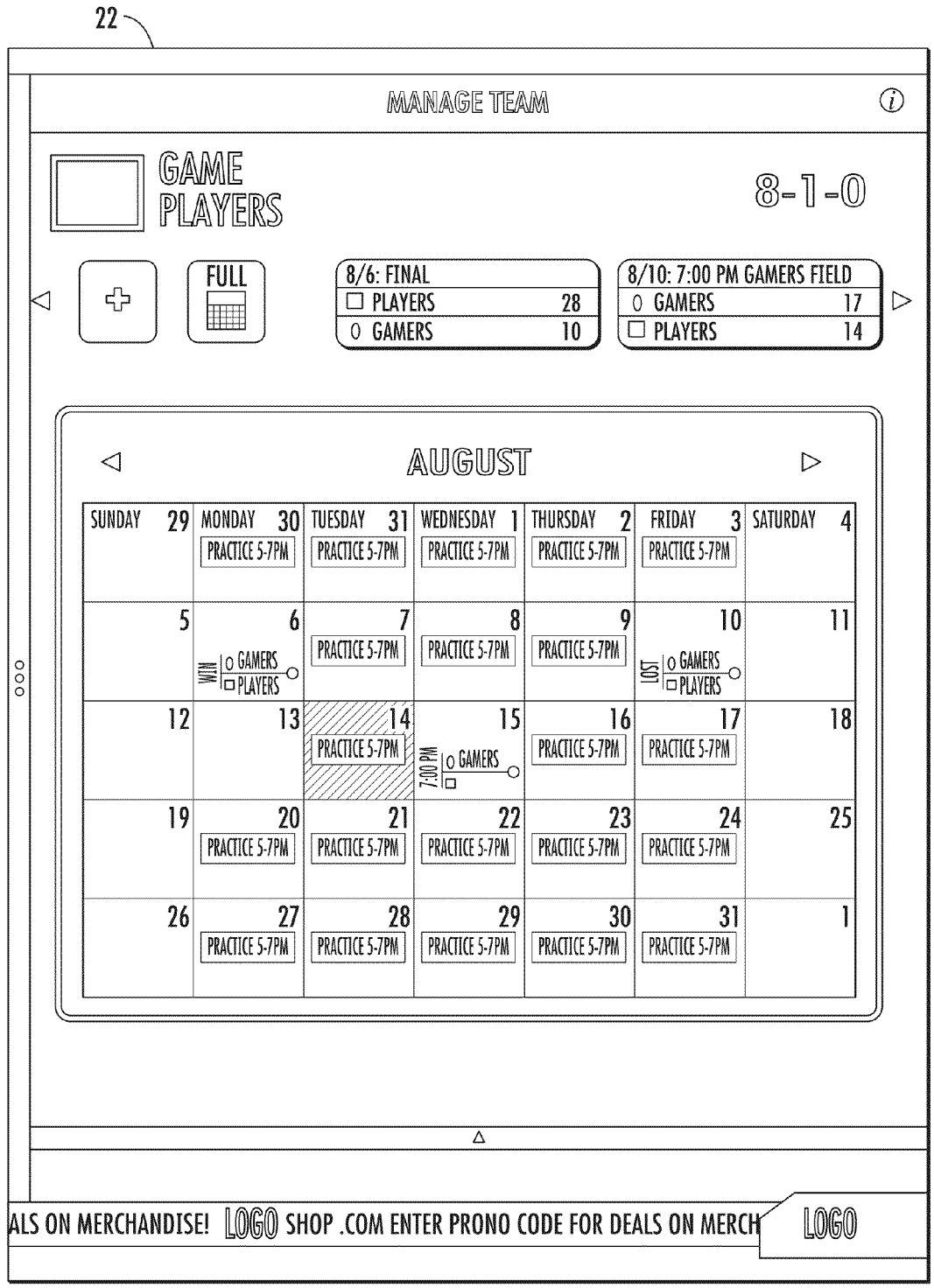
Figure 74:
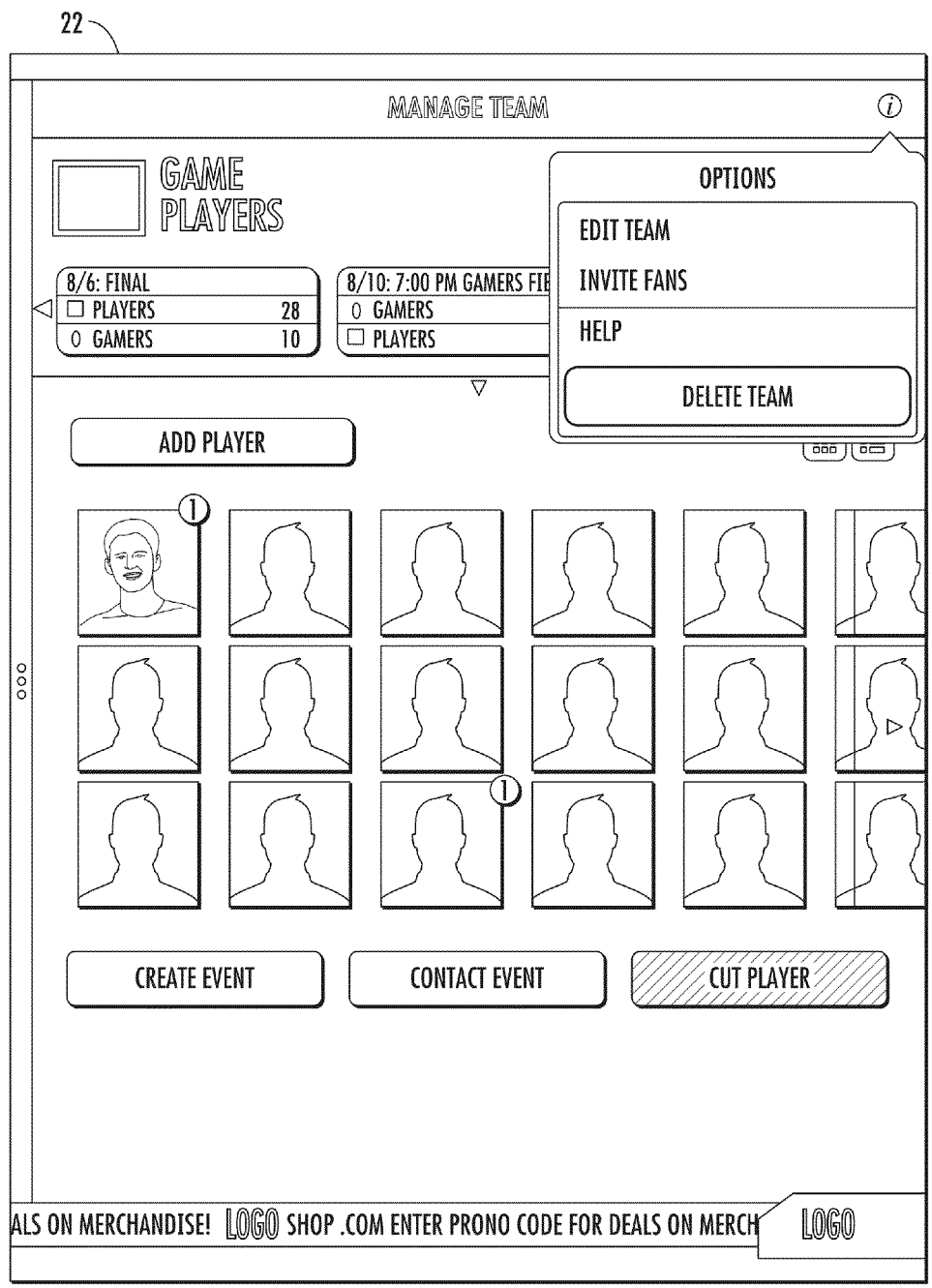
Figure 75:
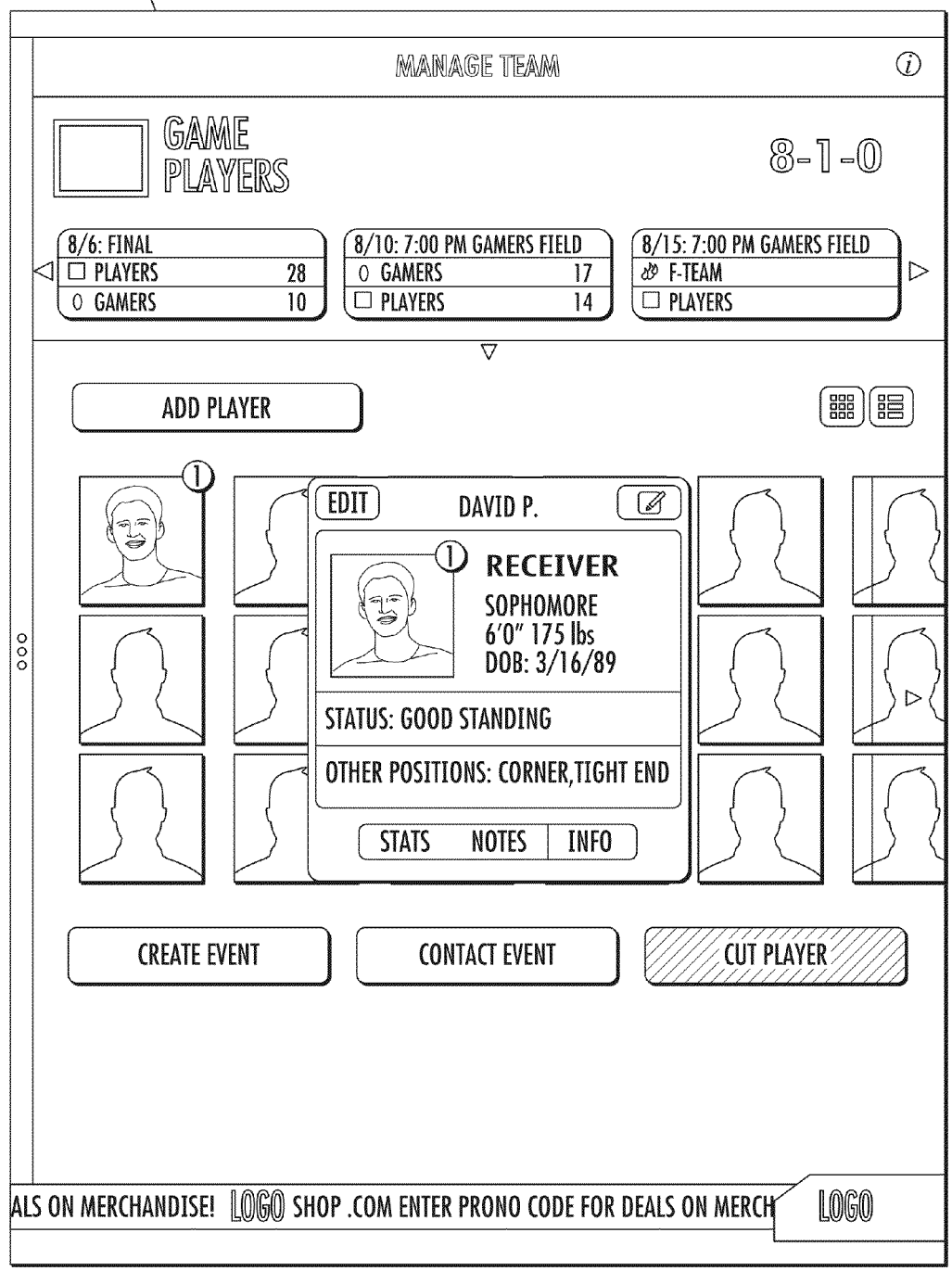

As shown by FIGS. 71-76, system 320 is also configured to assist in managing or coaching a sporting team. As shown by FIGS. 71 and 72, processor 26 tracks data and stores video for the team. FIGS. 71 and 72 illustrate two example screenshots presented by processor 26 under a team coaching or managing mode of system 320 (or system 420). In the example illustrated, system 320 provides various selectable graphical user interfaces for such options as managing the team (see FIG. 74), presenting playbook information, displaying team statistics, retrieving stored video of prior games, matches or events, a whiteboard for team meetings, a database of various practice drills and practice drill results/statistics, rules of the particular sport and chat or interaction with other coaches or individual players in a wireless fashion from one portable electronic device to another portable electronic device such as between smart phones, flash drive players (IPODs) and the like. In addition, processor 26 of system 320 presents graphical user interfaces for allowing a coach or manager to quickly access a team schedule (see FIG. 73) or to view individual player profiles and positions (see FIG. 75-76). The calendar of team activity shown in FIG. 73 itself comprises a graphical user interface, allowing a coach or manager to click on a particular date to view either past result of the practice (such as practice notes, player participants, etc.) or to plan an upcoming practice. If the date comprises a sporting event, game or match, selection of the date cause the processor 26 automatically retrieve and display statistics and results for the prior game or match or to retrieve and present information regarding the upcoming opponent, a map to the location of the sporting event and any additional miscellaneous information regarding the upcoming game, match, tournament or sporting event.

Although the claims of the present disclosure are generally directed to an American football training system, the present disclosure is additionally directed to the features set forth in the following definitions.

Group I:

1. An apparatus comprising:
a non-transient computer-readable medium containing code to direct a processor to:
receive input pertaining to travel of a ball of a sport;
retrieve data pertaining to travel of the ball by a celebrity in the spoil; and
display a comparison of the input to the retrieved data.

2. An apparatus comprising:
a non-transient computer-readable medium containing code to direct a processor to:
receive input pertaining to travel of a physical ball from a sensor;
determine a target accuracy based on the input; and
display the determined target accuracy.

3. The apparatus of claim 2 further comprising:
supplying the input to a video game;
altering a display of the video game based on the supplied input.

4. The apparatus of claim 2 further comprising:
supplying the determined target accuracy to a video game; and
altering a display of the video game based on the supplied determined target accuracy.

5. An apparatus comprising:
a non-transient computer-readable medium containing code to direct a processor to:
receive signals pertaining to travel of a football from a sensor;
derive a football travel parameter based on the signals; and
display the football travel parameter.

6. The apparatus of claim 5, wherein receiving the signals comprises receiving signals while the football is moving.

7. The apparatus of claim 6, wherein the signals are received from the sensor while the sensors are attached to the football.

8. The apparatus of claim 5, wherein the signals received from the sensor while the sensors attached to the football.

9. The apparatus of claim 5, wherein the code is further configured to direct the processor to:
retrieve data pertaining to the football travel parameter by a celebrity; and
display a comparison of the football travel parameter to the retrieved data.

10. The apparatus of claim 5, wherein the code is configured to further direct the processor to:
determine a target accuracy based on the football travel parameter; and
display the determined target accuracy.

11. The apparatus of claim 10, wherein the target accuracy is further based upon at least one environmental parameter.

12. The apparatus of claim 11, wherein the at least one environmental parameter selected from a group of environmental parameters consisting of: air temperature, wind speed, wind direction, barometric pressure.

13. The apparatus of claim 12, wherein the at least one environmental parameter is a hypothetical input.

14. The apparatus of claim 12, wherein the at least one environmental parameter is sensed.

15. The apparatus of claim 10, wherein the target accuracy comprises accuracy of a field-goal.

16. The apparatus of claim 15, wherein the target accuracy is based upon an input hash mark location.

17. The apparatus of claim 10 further comprising:
supplying the determined target accuracy to a video game; and
altering a display of the video game based on the supplied determined target accuracy.

18. The apparatus of claim 5 further comprising:
supplying the football travel parameter to a video game;
altering a display of the video game based on the supplied football travel parameter.

19. The apparatus of claim 5, wherein the code is further configured to direct the processing unit to generate control signals for an auditory source such that the auditory source produces sound based upon the control signals.

20. The apparatus of claim 19, wherein the control signals causing auditory source to produce an alert sound a predefined time following signals indicating a snap of the football.

21. The apparatus of claim 5, wherein the football travel parameter is selected from a group of football travel parameters consisting of: kicking launch angle, speed, spin, direction, rotation, trajectory, spiral efficiency, passing release time, and distance.

22. The apparatus of claim 21, wherein the code is further configured to direct a processor to:
store each determined football travel parameter; and
present a graph of the stored football travel parameters.
The apparatus of claim 5, wherein the code is further configured to direct a processor to:
compare the determined football travel parameter to a predefined threshold value; and
present a suggestion based upon the comparison.

23. The apparatus of claim 22, wherein the presenting of the suggestion based upon the comparison comprises displaying a video.

24. The apparatus of claim 5, wherein the code is further configured to direct the processor to assign a score based upon the determined football travel parameter.

25. The apparatus of claim 5, wherein the code is further configured to determine a consistency value based upon a plurality of the determined football travel parameters.

26. An apparatus comprising:
a non-transient computer-readable medium containing code to direct a processor to;
receive signals pertaining to travel of a physical ball from a sensor while the sensor is attached to the physical ball;
determine a target accuracy based on the signals; and
display the determined target accuracy.

27. The apparatus of claim 26, wherein the code is further configured to direct the processor to:
supply the signals to a video game, wherein a display of the video game is altered based on the signals.

28. The apparatus of claim 26, wherein the code is further configured to direct a processor to:
supply the determined target accuracy to a video game, wherein a display of the video game is altered based on the supplied determined target accuracy.

29. The apparatus of claim 26, wherein the physical ball comprises a football and wherein the target accuracy comprises accuracy for a field-goal.

30. The apparatus of claim 26, wherein the physical ball comprises a golf ball and wherein the target accuracy comprises accuracy for a holed ball.

31. The apparatus of claim 26, wherein the physical ball comprises a basketball and wherein the target accuracy comprises accuracy for a made basket.

32. The apparatus of claim 26, wherein the code is further configured to direct the processor to:
store a value comprising at least one of the signals and the determined target accuracy;
transmit the stored value to a videogame in response to a selection input during play of the videogame.

33. The apparatus of claim 32, wherein the stored value transmitted to the videogame is randomly chosen in response to the selection input.

34. The apparatus of claim 32, wherein the stored value transmitted to the videogame is selected by the selection input.

35. A method comprising:
receiving input pertaining to travel of a ball of a sport;
retrieving data pertaining to travel of the ball by a celebrity in the sport; and
displaying a comparison of the input to the retrieved data.

36. A method comprising:
receiving input pertaining to travel of a physical ball from a sensor;
determining a target accuracy based on the input; and
displaying the determined target accuracy.

37. The method of claim 36 further comprising:
supplying the input to a video game;
altering a display of the video game based on the supplied input.

38. The method of claim 36 further comprising:
supplying the determined target accuracy to a video game; and
altering a display of the video game based on the supplied determined target accuracy.

39. A method comprising:
receiving signals pertaining to travel of a football from a sensor;
deriving a football travel parameter based on the signals; and
displaying the football travel parameter.

40. The method of claim 39, wherein receiving the signals comprises receiving signals while the football is moving.

41. The method of claim 40, wherein the signals are received from the sensor while the sensors are attached to the football.

42. The method of claim 39, wherein the signals received from the sensor while the sensors attached to the football.

43. The method of claim 39 further comprising:
retrieving data pertaining to the football travel parameter by a celebrity; and
displaying a comparison of the football travel parameter to the retrieved data.

44. The method of claim 39 further comprising:
determining a target accuracy based on the football travel parameter; and
displaying the determined target accuracy.

45. The method of claim 44, wherein the target accuracy is further based upon at least one environmental parameter.

46. The method of claim 45, wherein the at least one environmental parameter selected from a group of environmental parameters consisting of air temperature, wind speed, wind direction, barometric pressure.

47. The method of claim 46, wherein the at least one environmental parameter is a hypothetical input.

48. The method of claim 46, wherein the at least one environmental parameter is sensed.

49. The method of claim 44, wherein the target accuracy comprises accuracy of a field-goal.

50. The method of claim 49, wherein the target accuracy is based upon an input hash mark location.

51. The method of claim 44 further comprising:
supplying the determined target accuracy to a video game; and
altering a display of the video game based on the supplied determined target accuracy.

52. The method of claim 44 further comprising:
supplying the football travel parameter to a video game; and
altering a display of the video game based on the supplied football travel parameter.

53. The method of claim 44 further comprising producing sound based upon the control signals.

54. The method of claim 53, wherein producing sound comprises producing an alert sound a predefined time following signals indicating a snap of the football.

55. The method of claim 39, wherein the football travel parameter is selected from a group of football travel parameters consisting of: kicking launch angle, speed, spin, direction, rotation, trajectory, spiral efficiency, passing release time, and distance.

56. The method of claim 39 further comprising:
storing each determined football travel parameter; and
presenting a graph of the stored football travel parameters.

57. The method of claim 39 further comprising:
compare the determined football travel parameter to a predefined threshold value; and
present a suggestion based upon the comparison.

58. The method of claim 57, wherein the presenting of the suggestion based upon the comparison comprises displaying a video.

59. The method of claim 39 further comprising assigning a score based upon the determined football travel parameter.

60. The method of claim 39 further comprising determining a consistency value based upon a plurality of the determined football travel parameters.

61. An apparatus comprising:
a non-transient computer-readable medium containing code to direct a processor to:
receive input pertaining to an orientation of a football on a tee;
receive input pertaining to travel the football from the tee; and
display trajectory of travel of football off of the tee.

62. The apparatus of claim 61 further comprising sensing the orientation of the football on the tee.

63. The apparatus of claim 62 further comprising sensing travel of the football from the tee.

64. Your to do a redo adjacent The apparatus of claim 63 further comprising sensing impact on the football.

65. An apparatus comprising:
a non-transient computer-readable medium containing code to direct a processor to:
receive input pertaining to a sensed impact upon a football;
generate control signals causing a display to display a travel parameter of the football associated with the sensed impact.

66. The apparatus of claim 23, wherein the target region of the football field is for a football action selected from a group of football actions consisting of: a pass of the football; a punt of the football; and a kickoff of the football.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus for use with a portable performance system including a processor, a memory and a display, the training apparatus comprising:
an American-style football;
at least one sensor carried by the football to sense at least one attribute of the football;
at least one transmitter coupled to the football and operably coupled to the sensor; and
a non-transient computer-readable medium containing code to direct the processor to:
determine at least one football event by comparing the at least one attribute of the football to one or more predetermined signature characteristics of different football events; and
an output device to present output to a person based on the determination of the at least one football event.

2. The apparatus of claim 1, wherein the at least one football event is selected from a group of football events consisting of: an under center snap of the football; a shotgun/quick snap of the football; a multi-step drop back with the football; a handoff of the football; a pass release of the football; pass flight of the football; a catch of the football; a drop of the football; an initiation of a pass of the football; a run with the football; a punt of the football; initial ground impact of the football; a kickoff of the football; and an onside kick of the football.

3. The apparatus of claim 1, wherein the memory comprises instructions to direct the processing unit to identify one or more predetermined signature characteristics of a football event based upon signals received from the at least one sensor carried by the football during at least one calibration football event.

4. The apparatus of claim 1, wherein the at least one football event is a caught football and wherein the one or more predetermined signature characteristics comprises a sensed vibration of the football corresponding to impact of the football with a person's hands followed by a predetermined amount of time before any sensed vibration of the football corresponding to impact of the football with ground.

5. The apparatus of claim 1, wherein non-transient computer-readable medium contains code configured to direct the processor to track timing of the at least one determined football event.

6. The apparatus of claim 5, wherein the non-transient computer-readable medium contains code configured to direct the processor to identify a first football event comprising a snap of the football and to determine an elapsed time for a second football event from the snap of the football.

7. The apparatus of claim 6, wherein the second football event comprises a pass release of the football.

8. The apparatus of claim 6, wherein the second football event comprises initiation of a pass of the football.

9. The apparatus of claim 6, wherein the second football event comprises a punt of the football.

10. The apparatus of claim 6, wherein the second football event comprises a field goal kick of the football.

11. The apparatus of claim 5, wherein the non-transient computer-readable medium contains code configured to direct the processor to determine multiple football events which are part of a continuous series of football events and to track timing of the multiple football events of the continuous series, the series selected from a group of series consisting of: (1) snap, 3 step drop, pass release; (2) snap, 3 step drop, pass release, catch; (3) snap, 3 step drop, pass release, drop; (4) snap, 5 step drop, pass release; (5) snap, 5 step drop, pass release, catch; (6) snap, 5 step drop, pass release, drop; (7) snap, 5 step drop, pass release; (8) snap, 7 step drop, pass release, catch; (9) snap, 7 step drop, pass release, drop; (10) shotgun/quick snap, pass release; (11) shotgun/quick snap, pass release, catch; (12) shotgun/quick snap, pass release, drop; (13) pass release, catch; (14) pass release, drop; and (15) pass release, impact with ground.

12. The apparatus of claim 5, wherein the non-transient computer-readable medium contains code configured to direct the processor to identify a first football event comprising an initiation of a pass of the football and to determine an elapsed time for a second football event from the initiation of the passing of the football.

13. The apparatus of claim 5, wherein the non-transient computer-readable medium contains code configured to direct the processor to identify a first football event comprising a punt of the football and to determine an elapsed time for a second football event from the initiation of the punt of the football, the second football event comprising a catch of the football or an impact of the football with ground.

14. The apparatus of claim 1, wherein the non-transient computer-readable medium contains code configured to direct the processor to display a timing route having a distance component and an elapsed time from snap component, wherein the non-transient computer-readable medium contains code configured to direct the processor to identify a first football event comprising a snap of the football, to determine an elapsed time from the snap of the football to a pass of the football satisfying the distance component.

15. The apparatus of claim 14, where the timing route being displayed has a target location and wherein the non-transient computer-readable medium contains code configured to direct the processor to determine whether motion of the football satisfies the target location based upon the input.

16. The apparatus of claim 1, wherein the non-transient computer-readable medium contains code configured to direct the processor to identify a first football event comprising an initiation of a pass of the football and to determine a second location of the football at a second football event.

17. The apparatus of claim 1, wherein the non-transient computer-readable medium contains code configured to direct the processor to determine a plurality of football events and to display the plurality of football event with at least one of timing and football position for each event.

18. The apparatus of claim 1, wherein the non-transient computer-readable medium contains code configured to direct the processor to identify a first football event comprising initial ground impact of the football following one of a punt and a kickoff and to determine a motion distance of the football following the determined initial ground impact.

19. The apparatus of claim 1, wherein the non-transient computer-readable medium contains code configured to direct the processor to associate a location of the football for each of the at least one determined football event.

20. An apparatus for use with a portable performance system including a processor, a memory and a display, the training apparatus comprising:
an American-style football;
at least one sensor carried by the football to sense at least one attribute of the football;
at least one transmitter coupled to the football and operably coupled to the sensor; and
a non-transient computer-readable medium containing code to direct the processor to:
display a target distance for motion of the football; and
determine an accuracy of the football satisfying the target distance based upon input from the at least one sensor.

21. The apparatus of claim 20, wherein the non-transient computer-readable medium contains code to direct the processor to display a target time for the football satisfying the target distance and to determine an accuracy the football satisfying the target time based upon input from the at least one sensor.

22. The apparatus of claim 21, wherein the target distance and the target time are for a football action selected from a group of football actions consisting of: a pass of the football; a punt of the football; and a kickoff of the football.

23. The apparatus of claim 21, wherein the non-transient computer-readable medium contains code to direct the processor to display a target region of the football field and to determine an accuracy the football satisfying the target region based upon input from the at least one sensor.

24. The apparatus of claim 23, wherein the target region of the football field is for a football action selected from a group of football actions consisting of: a pass of the football; a punt of the football; and a kickoff of the football.

* * * * *